(12) United States Patent
Sitz

(10) Patent No.: US 12,228,216 B2
(45) Date of Patent: Feb. 18, 2025

(54) FLOAT-OPERATED VALVE SYSTEM

(71) Applicant: Justin C. Sitz, Bryan, TX (US)

(72) Inventor: Justin C. Sitz, Bryan, TX (US)

( * ) Notice: Subject to any disclaimer, the term of this patent is extended or adjusted under 35 U.S.C. 154(b) by 0 days.

(21) Appl. No.: 18/474,181

(22) Filed: Sep. 25, 2023

(65) Prior Publication Data

US 2024/0102570 A1 Mar. 28, 2024

Related U.S. Application Data

(60) Provisional application No. 63/487,080, filed on Feb. 27, 2023, provisional application No. 63/409,782, filed on Sep. 25, 2022.

(51) Int. Cl.
| | | |
|---|---|---|
| *F16K 31/08* | (2006.01) | |
| *F16K 24/04* | (2006.01) | |
| *F16K 31/06* | (2006.01) | |
| *F16K 31/18* | (2006.01) | |
| *F16K 31/38* | (2006.01) | |
| *F16K 31/385* | (2006.01) | |

(52) U.S. Cl.
CPC .......... *F16K 24/042* (2013.01); *F16K 24/048* (2013.01); *F16K 31/0644* (2013.01); *F16K 31/082* (2013.01); *F16K 31/086* (2013.01); *F16K 31/088* (2013.01); *F16K 31/18* (2013.01); *F16K 31/084* (2013.01); *F16K 31/38* (2013.01); *F16K 31/385* (2013.01)

(58) Field of Classification Search
CPC ...... F16K 24/042; F16K 24/048; F16K 31/88; F16K 31/86; F16K 31/84; F16K 31/82; F16K 31/38; F16K 31/18; F16K 31/0644; F16K 31/34; F16K 31/20; F16K 31/24
See application file for complete search history.

(56) References Cited

U.S. PATENT DOCUMENTS

| | | | | |
|---|---|---|---|---|
| 1,997,879 | A * | 4/1935 | Watry | .................. F16K 24/048 137/543.13 |
| 2,062,755 | A | 12/1936 | Lyons et al. | |
| 2,084,005 | A | 6/1937 | Richards | |
| 2,198,150 | A | 4/1940 | Barnhart | |

(Continued)

FOREIGN PATENT DOCUMENTS

| | | |
|---|---|---|
| AU | 659356 | 9/1994 |
| CN | 102144524 | 8/2011 |

(Continued)

OTHER PUBLICATIONS

Phene, et al., "Low Pressure Drip Irrigation—Concept and Description", Paper #1060, pp. 1-9.

(Continued)

*Primary Examiner* — Umashankar Venkatesan
(74) *Attorney, Agent, or Firm* — Kunzler Bean & Adamson

(57) ABSTRACT

Apparatuses, systems, and methods are disclosed for a valve. An apparatus includes a valve that includes an actuator and a first magnetic material. The apparatus includes a container that includes an inlet and a float assembly. The actuator is actuated to one of open the valve at a first position and close the valve at a second position responsive to a magnetic force between a second magnetic material and a first magnetic material based on a position of the float assembly within the container.

20 Claims, 53 Drawing Sheets

(56) References Cited

U.S. PATENT DOCUMENTS

| | | | |
|---|---|---|---|
| 2,278,002 A * | 3/1942 | Thompson | F16K 31/34 |
| | | | 137/430 |
| 2,437,764 A | 3/1948 | Spence | |
| 2,509,605 A | 5/1950 | Mcintyre | |
| 2,598,706 A * | 6/1952 | Manning | F16K 24/042 |
| | | | 137/179 |
| 2,818,877 A | 1/1958 | Swanson | |
| 2,838,765 A | 6/1958 | Hosking | |
| 3,055,387 A | 9/1962 | Eager | |
| 3,079,125 A * | 2/1963 | Tischler | F16K 31/20 |
| | | | 137/391 |
| 3,083,724 A | 4/1963 | Johnson | |
| 3,154,091 A * | 10/1964 | Richards | F16K 31/18 |
| | | | 137/202 |
| 3,168,797 A | 2/1965 | Patassy | |
| 3,385,316 A | 5/1968 | Couffer | |
| 3,408,818 A | 11/1968 | Hemphill | |
| 3,656,506 A | 4/1972 | Jackson et al. | |
| 3,778,928 A | 12/1973 | Green | |
| 4,065,926 A | 1/1978 | Brandt | |
| 4,083,147 A | 4/1978 | Garrick | |
| 4,106,825 A * | 8/1978 | Ruyak | F16J 15/50 |
| | | | 384/226 |
| 4,202,366 A | 5/1980 | Kamvachirapitag | |
| 4,281,625 A | 8/1981 | Kasai | |
| 4,381,928 A * | 5/1983 | Roffelsen | F16K 24/048 |
| | | | 137/429 |
| 4,533,802 A | 8/1985 | Spalding | |
| 4,561,290 A | 12/1985 | Jewell | |
| 4,562,855 A | 1/1986 | Cummings et al. | |
| 4,590,960 A | 5/1986 | Koble, Jr. | |
| 4,606,373 A | 8/1986 | Noland | |
| 4,685,827 A | 8/1987 | Sibbel | |
| 4,779,640 A | 10/1988 | Cummings et al. | |
| 4,864,771 A | 9/1989 | Fah | |
| 4,967,789 A | 11/1990 | Kypris | |
| 4,977,923 A | 12/1990 | Cho | |
| 5,014,735 A | 5/1991 | Cummings | |
| 5,080,126 A * | 1/1992 | De Rycke | F16T 1/24 |
| | | | 137/445 |
| 5,169,117 A | 12/1992 | Huang | |
| 5,192,426 A | 3/1993 | DeCoster et al. | |
| 5,282,496 A | 2/1994 | Kerger | |
| 5,462,075 A | 10/1995 | Persson | |
| 5,533,545 A * | 7/1996 | Robinson | F16K 31/088 |
| | | | 137/448 |
| 5,853,125 A | 12/1998 | Murray | |
| 5,944,444 A | 8/1999 | Motz et al. | |
| 5,983,919 A | 11/1999 | Ottinger et al. | |
| 6,155,291 A | 12/2000 | Powell | |
| 6,178,984 B1 | 1/2001 | Amsellem | |
| 6,378,779 B1 | 4/2002 | Taylor | |
| 6,679,286 B2 * | 1/2004 | Kato | F16K 21/185 |
| | | | 137/429 |
| 7,082,959 B1 | 8/2006 | Franklin | |
| 7,284,567 B2 * | 10/2007 | Chan | F16K 21/18 |
| | | | 137/413 |
| 7,730,665 B2 | 6/2010 | Tran | |
| 7,874,312 B1 | 1/2011 | Gibbs | |
| 8,127,491 B1 | 3/2012 | Voigt, III et al. | |
| 8,726,568 B2 | 5/2014 | Wilson et al. | |
| 8,783,644 B2 | 7/2014 | Sun et al. | |
| 9,681,612 B2 | 6/2017 | Li | |
| 10,183,575 B2 * | 1/2019 | Madoux | B60K 15/03519 |
| 11,144,076 B2 * | 10/2021 | Sitz | A01G 25/16 |
| 11,162,607 B2 * | 11/2021 | Harel | F16K 31/18 |
| 11,268,627 B1 | 3/2022 | Sarno | |
| 11,415,228 B2 * | 8/2022 | Huang | F16K 31/26 |
| 11,921,528 B2 * | 3/2024 | Sitz | F16K 31/34 |
| 2004/0139650 A1 | 7/2004 | Haq | |
| 2006/0000051 A1 | 1/2006 | Cipolla et al. | |
| 2007/0267515 A1 | 11/2007 | Sargent | |
| 2010/0024295 A1 | 2/2010 | Murray | |
| 2011/0016781 A1 | 1/2011 | Richardson | |
| 2015/0053282 A1 | 2/2015 | Joos | |
| 2015/0359185 A1 | 12/2015 | Guy | |
| 2017/0009905 A1 * | 1/2017 | Arnold | F16K 31/34 |
| 2017/0042101 A1 | 2/2017 | Soltani | |
| 2017/0052547 A1 | 2/2017 | Thomson | |
| 2017/0265406 A1 | 9/2017 | Carvalho | |
| 2018/0155916 A1 | 6/2018 | Coscarella | |
| 2019/0116744 A1 | 4/2019 | Balet | |
| 2020/0201366 A1 | 6/2020 | Sitz | |
| 2022/0026934 A1 * | 1/2022 | Sitz | G05D 7/0146 |
| 2023/0130299 A1 * | 4/2023 | Sitz | G05D 7/0166 |
| | | | 222/1 |

FOREIGN PATENT DOCUMENTS

| | | |
|---|---|---|
| CN | 105145286 | 12/2015 |
| GB | 2074295 | 10/1981 |
| GB | 2357687 | 7/2001 |
| JP | 2014187985 | 10/2014 |
| KR | 20120082753 | 7/2012 |

OTHER PUBLICATIONS

Baseline Inc., "Watering With Soil Moisture Sensors", 2011, pp. 1-28.

PCT Application PCT/US23/75062 International Search Report, May 28, 2024.

* cited by examiner

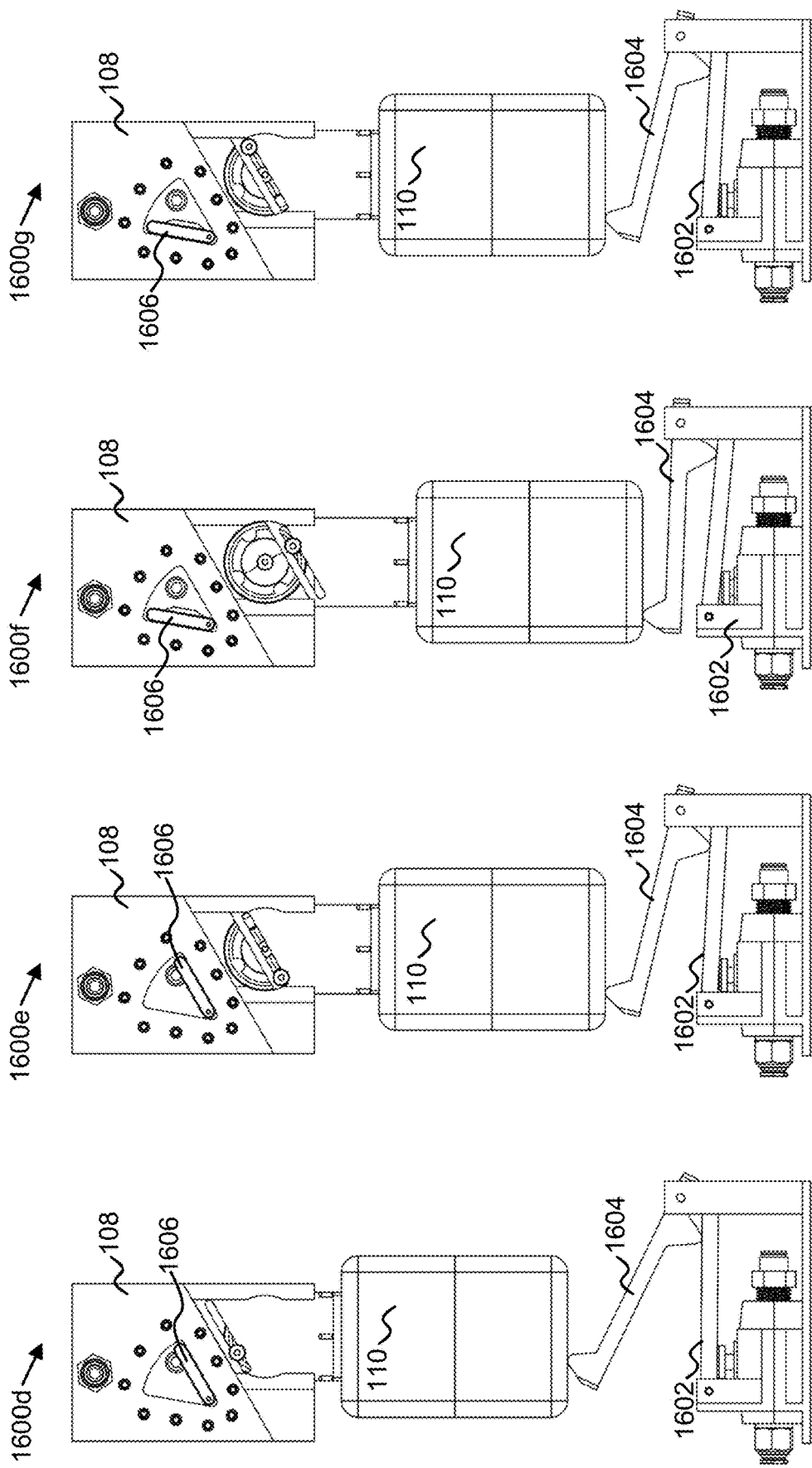

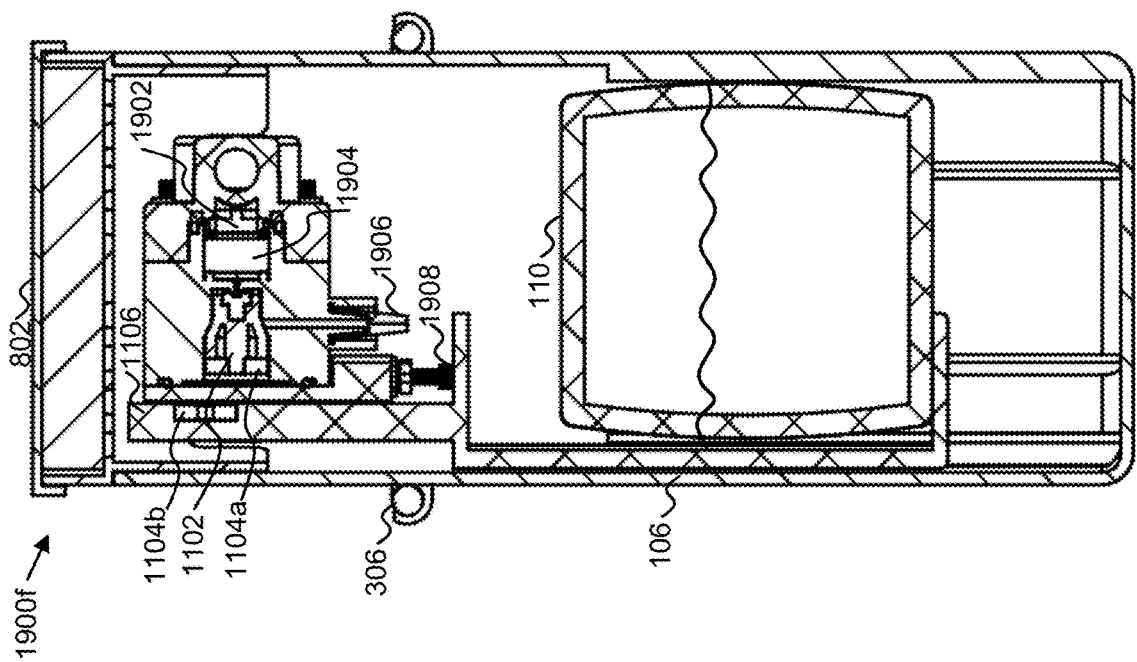
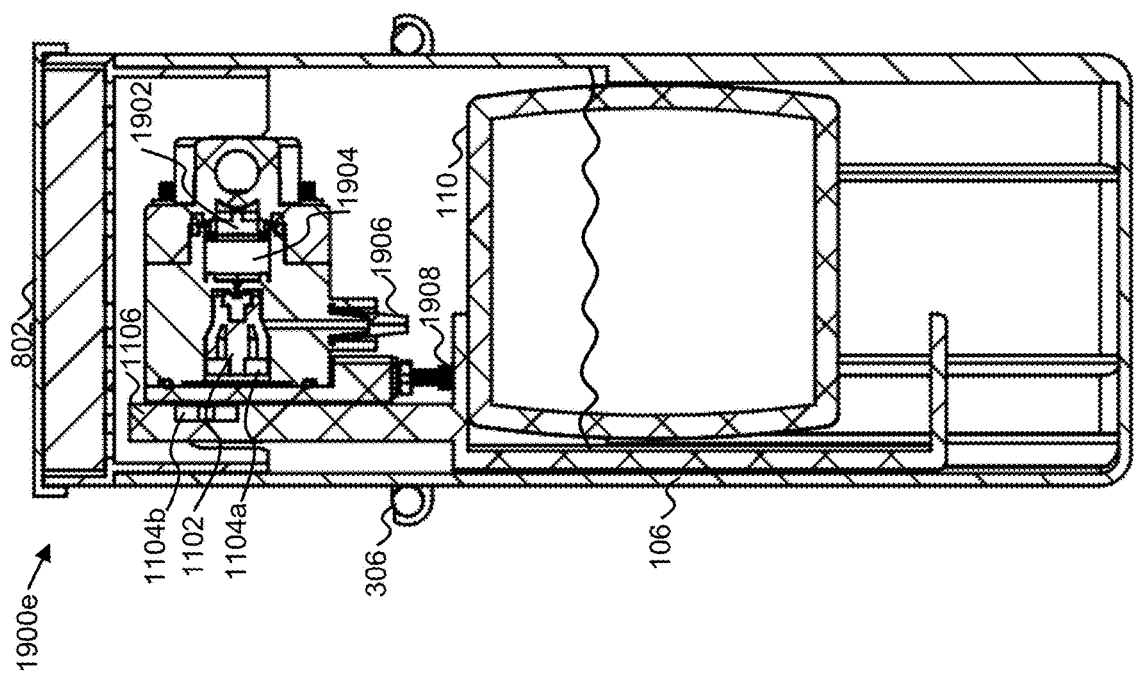

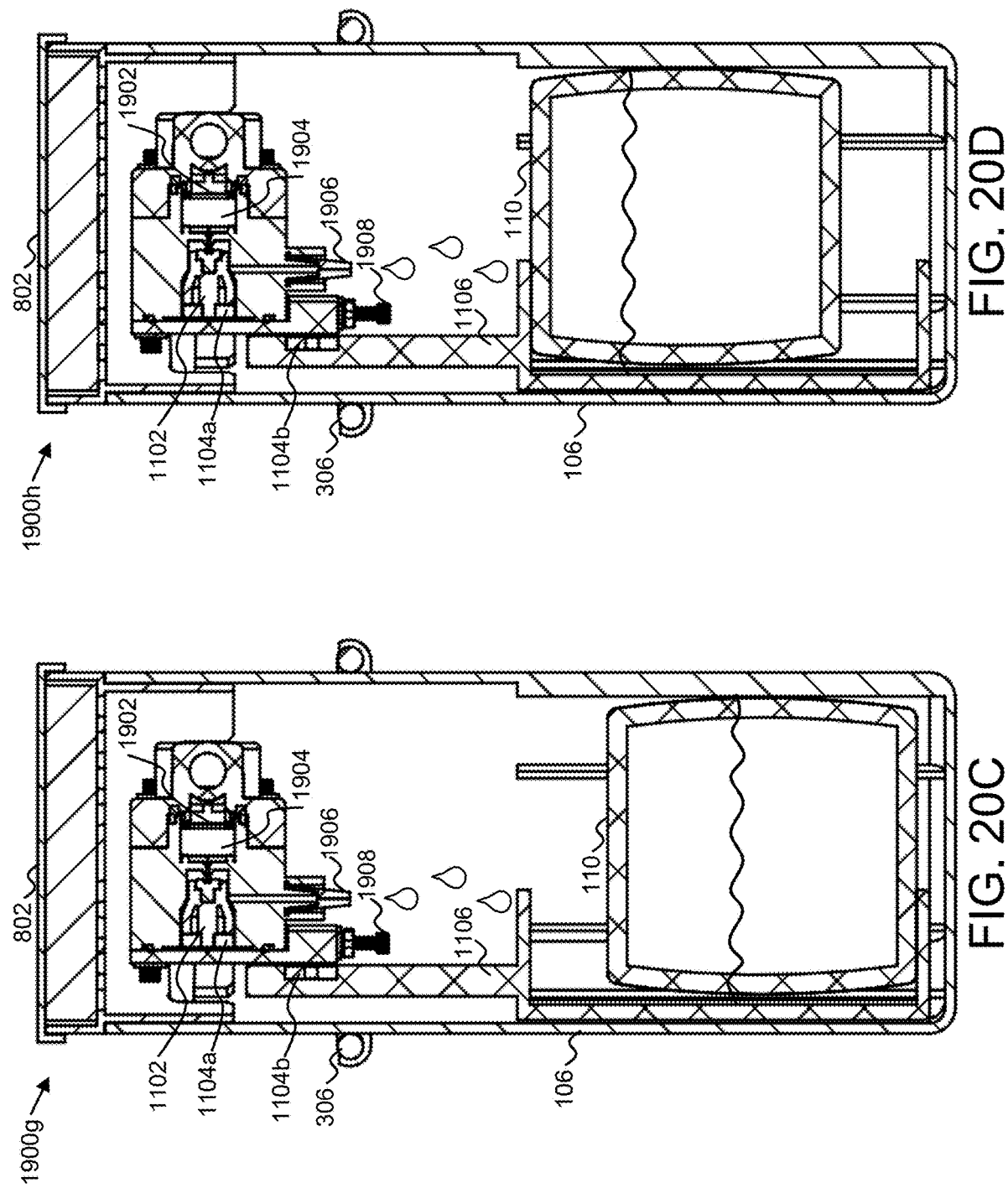

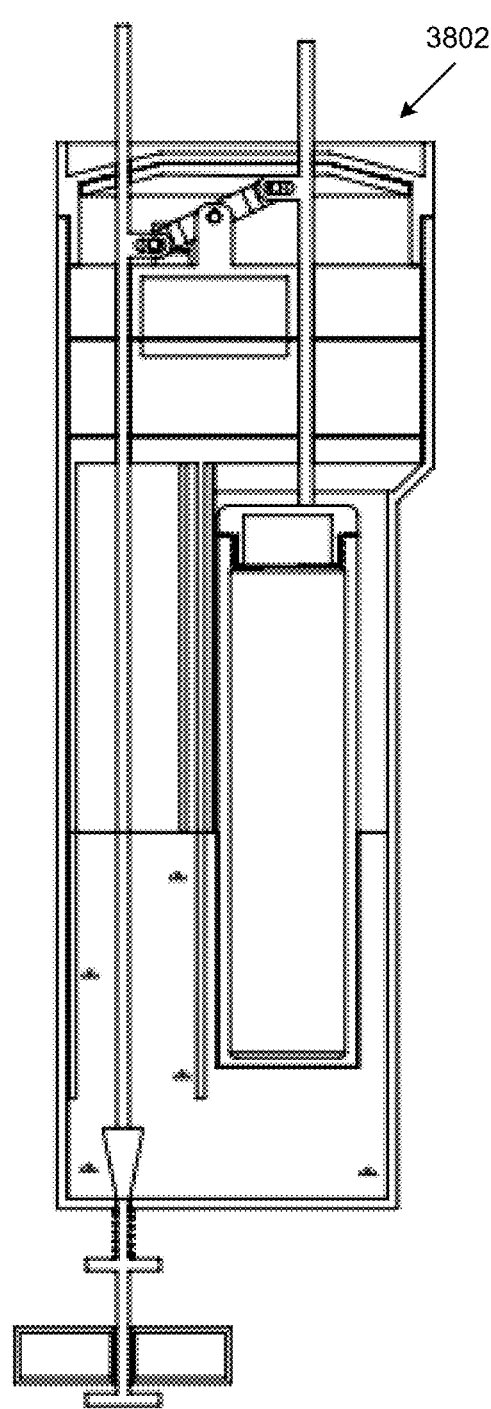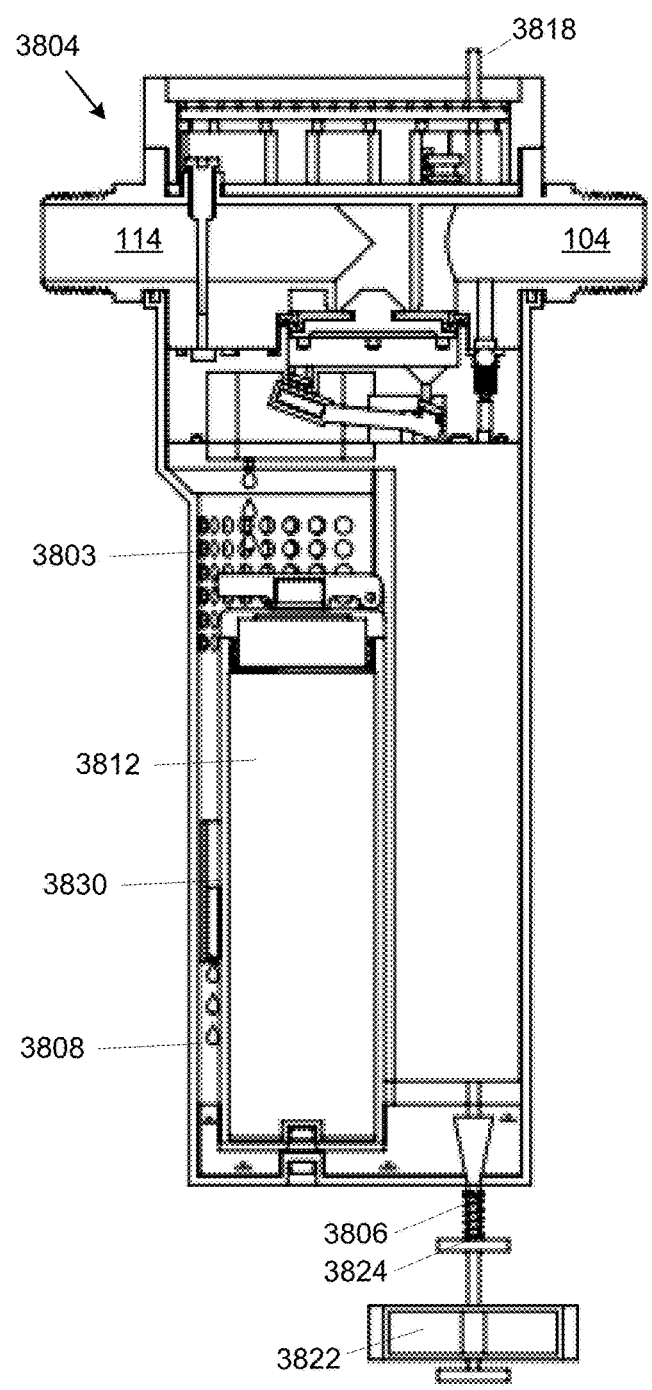
FIG. 38C
FIG. 38D

FLOAT-OPERATED VALVE SYSTEM

CROSS-REFERENCE TO RELATED APPLICATIONS

This application claims the benefit of U.S. Provisional Patent Application No. 63/409,782 entitled "VALVE" and filed on Sep. 25, 2022, for Justin Sitz, and U.S. Provisional Patent Application No. 63/487,080 entitled "VALVE" and filed on Feb. 27, 2023, for Justin Sitz, which are incorporated herein by reference.

FIELD

This invention relates to fluid flow control and more particularly relates to a valve for fluid flow control.

BACKGROUND

Valves control fluid flow for a variety of applications, such as for irrigation, or for filling or topping up livestock tanks, ponds, pools, industrial fluid tanks, or the like. However, some valves may slowly transition between an open state and a closed state, allowing a varying amount of fluid through the valve during the transition time period.

SUMMARY

Apparatuses, systems, and methods are disclosed for a valve. An apparatus, in one embodiment, includes a valve that includes an actuator and a first magnetic material. The actuator, in one embodiment, is actionable to control the flow of a fluid through the valve. In one embodiment, the first magnetic material is disposed on the actuator and is operable to control the position of the actuator. The apparatus, in one embodiment, includes a container that includes an inlet and a float assembly. In one embodiment, the inlet is configured to allow fluid into the container. In some embodiments, the float assembly is positioned within the container according to the level of the fluid within the container. The float assembly may include a second magnetic material. The actuator, in one embodiment, is actuated to one of open the valve at a first position and close the valve at a second position responsive to a magnetic force between the second magnetic material and the first magnetic material based on a position of the float assembly within the container.

In one embodiment, the valve further comprises a third magnetic material disposed opposite the first magnetic material, the third magnetic material configured to actuate the actuator to an opposite one of the first and second positions associated with the float assembly responsive to a magnetic force between the first magnetic material and the third magnetic material.

In one embodiment, the float assembly is positioned to create a magnetic force between the first magnetic material and the second magnetic material at a first fluid level within the container and break the magnetic force between the first magnetic material and the second magnetic material at a second fluid level within the container.

In one embodiment, the first fluid level is a higher fluid level within the container than the second fluid level.

In one embodiment, the actuator comprises a lever assembly, the first magnetic material disposed within the lever assembly.

In one embodiment, the float assembly further comprises a lever assembly comprising the second magnetic material, the lever assembly configured to provide a smooth transition for the float assembly in response the float assembly being positioned toward a bottom of the container.

In one embodiment, the float assembly further comprises a fourth magnetic material on the float assembly that is configured to secure the float assembly to position near a bottom of the container in response to a magnetic force between the fourth magnetic material and a fifth magnetic material on the bottom of the container.

In one embodiment, the fifth magnetic material is configurable to adjust a strength of the magnetic force between the fourth and fifth magnetic materials.

In one embodiment, the fourth magnetic material comprises magnets that are positioned around the float, around an inner surface of the container, or a combination thereof, each magnet being positioned higher than a previous magnet and positioned further in a stepwise spiral configuration.

In one embodiment, a buoyancy of the float is configurable by adding or removing weight to or from the float.

In one embodiment, the float assembly further comprises a float chamber for holding fluid such that the float assembly comprises a variable weight float assembly based on a fluid level in the float chamber, the float chamber comprising one or more ports for allowing fluid to exit the float chamber.

In one embodiment, the apparatus includes a flow adjustment control that is manually operable to control the flow of fluid out of the valve.

In one embodiment, the apparatus includes an activation control for manually opening and closing the valve regardless of the position of the float.

In one embodiment, the activation control is configured to relieve pressure from under a diaphragm within the valve.

In one embodiment, the container comprises at least one chamber that is configurable to adjust a volume fluid that the container can hold.

In one embodiment, the apparatus includes a fill rate control for adjusting a rate in which fluid enters the container.

In one embodiment, the fill rate control is removable from the valve.

In one embodiment, the apparatus includes a manually-operable control comprising a magnetic material, wherein the magnetic material is configured to provide magnetic force to the first magnetic material to actuate the actuator responsive to the magnetic material being positioned relative to the first magnetic material.

In one embodiment, the manually-operable control comprises a knob, a slider, or a combination thereof.

In one embodiment, the actuator is actuated by activating an electromagnet that interacts with the first magnetic material.

In one embodiment, the apparatus includes an impeller assembly disposed at an inlet or an outlet of the valve, the impeller assembly configured to magnetically actuate the actuator in response to a predetermined amount of fluid crossing through the impeller assembly.

In one embodiment, the impeller assembly magnetically actuates the actuator by activating an electromagnet that interacts with the first magnetic material.

In one embodiment, the apparatus includes a key that is used to position a magnetic material to interact with the first magnetic material to manually actuate the actuator.

In one embodiment, the apparatus includes a wick material that allows fluid within the container to enter and exit the container.

In one embodiment, the apparatus includes a foam material for filtering debris from fluid that enters the container.

In one embodiment, an apparatus includes a valve that includes an actuator, a first magnetic material, a first diaphragm configured to control fluid flow in a first direction through the valve, and a second diaphragm configured to control fluid flow in a second direction through the valve. The actuator, in one embodiment, is actionable to control the flow of a fluid through the valve. In one embodiment, the first magnetic material is disposed on the actuator and is operable to control the position of the actuator. The apparatus, in one embodiment, includes a container that includes an inlet and a float assembly. In one embodiment, the inlet is configured to allow fluid into the container. In some embodiments, the float assembly is positioned within the container according to the level of the fluid within the container. The float assembly may include a second magnetic material. The actuator, in one embodiment, is actuated to open one of the first diaphragm and the second diaphragm according to positions of the first and second magnetic materials relative to one another based on a position of the float assembly within the container.

In one embodiment, a system includes a first valve assembly comprising a first valve that is configured to control a main fluid flow. In one embodiment, the system includes a plurality of second valve assemblies, each comprising a second valve and a container coupled to the second valve, the container configured to receive a fluid and comprising a float assembly, the float assembly configured to actuate the second valve based on a fluid level in the container. In one embodiment, the plurality of second valve assemblies is fluidly connected in series with the first valve assembly and one another such that fluid flows from the first valve assembly, through the plurality of second valve assemblies, and back to the first valve assembly, wherein each float assembly of the second valve assemblies is configured to actuate the second valve to control the fluid flow through the series based on the fluid level in the container.

In one embodiment, at least one of the plurality of second valve assemblies comprises an outlet.

In one embodiment, at least one of the plurality of second valve assemblies comprises a physical indicator that the container is full, the physical indicator manually operable to override a closed second valve to allow fluid flow through the series.

In one embodiment, at least one of the plurality of second valve assemblies comprises a plurality of ports on a top surface of the second valve assemblies, the plurality of ports configured to allow fluid to enter and exit the container.

In one embodiment, at least one of the plurality of second valve assemblies comprises a perforated container that is configured to absorb fluid from a bottom of the container.

In one embodiment, the container comprises an absorbent material, and the valve is closed in response to the absorbent material expanding to a predetermined level.

In one embodiment, in response to the absorbent material absorbing a threshold amount of fluid, a latch mechanism is triggered to rapidly deploy magnetic material to close the valve.

In one embodiment, the container comprises a water soluble material that is configured to prevent a magnetic material from moving into an upward position until the water soluble material dissolves.

In one embodiment, at least one of the plurality of second valve assemblies further comprises a secondary float assembly for configuring a fluid level in the container by controlling an outlet of the container.

In one embodiment, at least one of the plurality of second valve assemblies comprises a plurality of ports on a top surface of the second valve assemblies, the plurality of ports configured to allow fluid to enter and exit the container.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 18A is a side view illustrating another embodiment of an apparatus for fluid flow control;

FIG. 18B is a side view illustrating another embodiment of an apparatus for fluid flow control;

FIG. 18C is a side view illustrating another embodiment of an apparatus for fluid flow control;

FIG. 18D is a side view illustrating another embodiment of an apparatus for fluid flow control;

FIG. 20A is a side view illustrating another embodiment of an apparatus for fluid flow control;

FIG. 20B is a side view illustrating another embodiment of an apparatus for fluid flow control;

FIG. 20C is a side view illustrating another embodiment of an apparatus for fluid flow control;

FIG. 20D is a side view illustrating another embodiment of an apparatus for fluid flow control;

FIG. 38C depicts a sectional view illustrating another embodiment of an apparatus for fluid flow control; and FIG. 38D depicts a sectional view illustrating another embodiment of an apparatus for fluid flow control.

DETAILED DESCRIPTION

Figure 1:
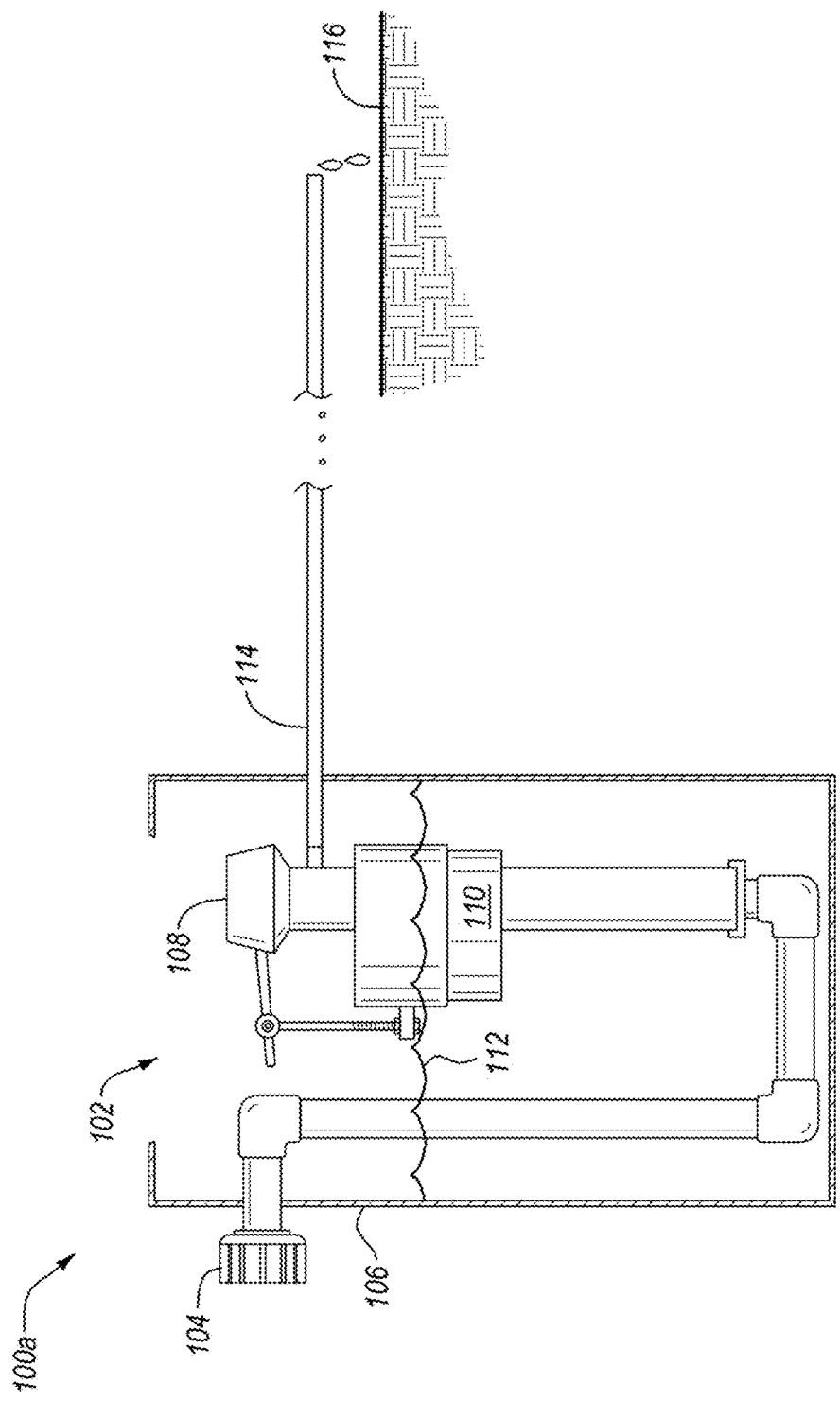
FIG. 1 is a side view illustrating one embodiment of an apparatus for fluid flow control.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are included to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

FIG. 1 depicts one embodiment of an apparatus 100*a* for fluid flow control. In the depicted embodiment, the apparatus 100*a* includes a container 106, a valve 108, and an output line 114, which are described below.

In various embodiments, an apparatus 100 for fluid flow control, such as the apparatuses 100*a-f* of FIGS. 1-6, may use a valve 108 to control a fluid flow based on a liquid level 112 in a container 106. The container 106 may receive a liquid and may include an outlet 102 allowing the liquid to exit the container 106. An output line 114 may convey the fluid flow to a location 116 that is outside the container 106, and that does not receive liquid directly from the outlet 102.

In some embodiments, using an apparatus 100 that controls fluid flow to a location 116 based on a liquid level 112 in a container 106 may avoid time-consuming or burdensome manual valve control. For example, if the valve 108 controls a flow of water, for irrigation, for filling up a livestock tank, for filling a pool, or the like, evaporation of water in the container 106 may lower the liquid level 112 so that the valve 108 turns the flow of water on. Subsequently, water entering the container 106 from precipitation, from sprinklers, or from a return line (not shown in FIG. 1) may raise the liquid level 112 so that the valve 108 turns the flow of water off. Such an apparatus 100 may turn the water flow on more frequently or for longer durations when evaporation through the outlet 102 is faster, on dry warm, and/or windy days, and may turn the water flow on less frequently or for shorter durations in cooler, wetter, or less windy weather, without a user manually adjusting the flow of water to compensate for changing circumstances.

Additionally, in some embodiments, using an apparatus 100 that controls fluid flow to a location 116 based on a liquid level 112 in a container 106 may provide flow control without using electricity, and may be usable in circumstances where electrically controlled valves are not usable. For example, in some embodiments, the valve 108 is mechanically actuated based on the liquid level 112 (e.g., mechanically coupled to the liquid level 112 via a float 110, a pressure sensing diaphragm, or the like), so that the apparatus 100 does not use electricity. Such an apparatus 100 may be usable where electric power is not available. For example, an apparatus 100 may be used to control water delivery to sprinklers when landscaping for a building has been put in before an electrical permit has been issued. In some other embodiments, however, apparatuses 100 that controls fluid flow to a location 116 based on a liquid level 112 in a container 106 may use electricity, and may include electrically operated valves 108, liquid level sensors, or the like.

The container 106, in various embodiments, is shaped to receive a liquid. A level 112 for the liquid in the container 106 is depicted in FIGS. 1-6. A container 106 may be a vessel, a receptacle, an enclosure, or the like. A container 106 shaped to receive liquid may partially or fully enclose an interior volume, so that liquid remains in the interior volume for a period of time (e.g., until it exits the container 106 via the outlet 102). For example, a container 106 may include a bottom, which may be flat, convex, concave, or a more complex shape, so that liquid received in the container 106 does not fall downward out of the container 106 and may include walls which extend up from the bottom of the container 106, so that liquid received in the container 106 does not run out the sides of the container 106. A container 106 shaped to receive liquid may or may not include a top. A container 106 may include one or more openings where liquid may enter or exit the container 106 and may still be referred to as being shaped to receive liquid.

Containers 106, in various embodiments, may be made of various materials, such as metal, polymers (e.g., thermoplastic or thermoset polymers), ceramic, glass or the like. In some embodiments, a container 106 may be formed of a material selected to receive and contain the liquid. For example, if the container 106 is to be used to receive water, the container 106 may be made of a material that is impervious, or substantially impervious to water, such as a polymer. In some embodiments, a container 106 may include a material that allows a liquid to exit the container 106. For example, one portion of a container 106 may include a membrane permeable to water (e.g., as an outlet 102, as described below), and may still be referred to as being shaped to receive water. In various embodiments, a container 106 may be a can, a jar, a bottle, a pipe with an end cap, or the like. Various other or further types of containers 106 shaped to receive liquid may be included in an apparatus 100.

In FIGS. 1-6, the container 106 is depicted in cross section, for convenience in showing components of the apparatus 100 that are disposed within the container 106, and the full shape of the container 106 is not shown. Although the walls of the container 106 are depicted only in cross section, they may be curved walls of a cylindrical container 106, flat walls of a rectilinear or box-shaped container 106, sloping walls of a tapered container 106, or the like.

When the apparatus 100 is used, the container 106 may receive or contain a liquid. The liquid, in some embodiments, is water. For example, where the apparatus 100 is used to control a fluid flow based on outdoor conditions, the liquid may be water from precipitation, groundwater, water from an irrigation system, or the like. In some other embodiments, the liquid is a liquid other than water, or is a mixture or solution including water and one or more other substances. For example, if the apparatus 100 is used to control a fluid flow based on conditions in a chemical plant, the liquid may be a chemical affected by the relevant conditions.

In some embodiments, the liquid may enter the container 106 via an outlet 102, which is described in further detail below with reference to liquid exiting the container 106. In some other embodiments, the liquid may enter the container 106 other than by the outlet 102. For example, liquid may enter the container 106 via a return line described below with reference to FIG. 2.

In various embodiments, the container 106 includes an outlet 102 configured to allow the liquid to exit the container 106. Liquid may be referred to as "exiting" the container 106 if any portion of the liquid is no longer in the container 106. For example, liquid entering the container 106 may raise the liquid level 112, and liquid exiting the container 106 may lower the liquid level 112. In some embodiments, liquid may simultaneously enter and exit the container 106 (e.g., precipitation and evaporation may occur simultaneously) so that the liquid level 112 rises or falls depending on whether the rate of liquid entering the container 106 is greater or less than the rate at which liquid exits the container 106. In certain embodiments, the liquid level 112 falling (or rising less quickly) may be referred to as liquid "exiting" the container 106, regardless of whether the substance that is in liquid form in the container 106 leaves the container 106 in liquid form or otherwise. For example, water leaving the container 106 by being drained from the container 106 in liquid form or by evaporating out of the container 106 in gaseous form may both be referred to as a liquid exiting the container 106.

An outlet 102 may be referred to as "configured" to allow a liquid to exit the container 106, if the shape, position, or any other attribute of the outlet 102 permit the liquid to exit the container 106. For example, in the depicted embodiment, the outlet 102 is an opening in the top of the container 106, allowing liquid to exit the container 106 by evaporation. In another embodiment, an outlet 102 may be positioned in the side of the container 106, in the bottom of the container 106, or the like, and may allow liquid to exit by draining from the container 106. In some embodiments a size and/or shape of the outlet 102 may affect a rate at which liquid exits from the container 106. For example, the size of an evaporation outlet 102 may affect an evaporation rate. Similarly, if the outlet 102 is an opening that allows liquid to exit by draining from the container 106, a smaller outlet 102 may result in liquid exiting in slow drips, while a larger outlet 102 may result in liquid exiting faster.

In some embodiments, an outlet 102 may be an opening, and may allow anything that fits through the opening to enter or exit the container 106 In certain embodiments, an outlet 102 may include a covering to provide a selective effect, such as a mesh, membrane, or other permeable material that prevents dirt or debris from entering the container 106 while still permitting liquid to exit (or enter) the container 106, a top covering with open sides (e.g., similar to a chimney cap) to permit evaporation but exclude precipitation, or the like. In some embodiments, an outlet 102 may include a plurality of openings such as a top evaporation opening and a lower drain opening but may still be referred to as an "outlet" regardless of the number of openings. Various other or further sizes, shapes, configurations, and types of outlets 102 for allowing liquid to exit a container 106 may be included in an apparatus 100.

The valve 108, in the depicted embodiment, is configured to control a fluid flow based on the liquid level 112 in the container 106. A valve 108, in various embodiments, may be any device that controls or regulates a fluid flow. In the depicted embodiment, the valve 108 controls a fluid flow through the valve 108, from an inlet 104 through the output line 114. The inlet 104, in the depicted embodiment, is configured to connect to a hose, pipe, or other threaded connector so that the valve 108 controls a flow of water. In another embodiment, an inlet 104 may be a fitting or connection that couples the apparatus 100 to a fluid source such as a storage tank, a pipe, or the like. Controlling a fluid flow may include permitting or turning on a fluid flow (e.g., when the valve 108 opens), and/or blocking or turning off a fluid flow (e.g., when the valve 108 closes). In some embodiments, controlling a fluid flow may include permitting a limited or restricted fluid flow. For example, some valves 108 may have one or more "partially on" positions or states between the on position and the off position that permit less fluid to flow than when the valves 108 are fully open.

Various types of valves 108 may control a fluid flow in various ways. For example, a valve 108 may include a movable component such as a plunger, a diaphragm, a ball, or the like and may turn a fluid flow on or off based on the position of the movable component. Various other or further types of valves 108 for controlling a fluid flow may be included in an apparatus 100.

In various embodiments, a valve 108 configured to control a fluid flow based on a liquid level 112 may be any valve 108 that is coupled to the liquid level 112 so that the state of the valve 108 (e.g., on, off, partially on, or the like) depends on the liquid level 112. In some embodiments, a valve 108 configured to control a fluid flow based on a liquid level 112 may include or may be coupled to one or more parts configured to move, change state, or the like, based on the liquid level 112, to actuate the valve 108 (e.g., turn the fluid flow on or off) based on the liquid level 112. For example, in the depicted embodiment, the valve 108 includes a float 110 that floats in the container 106 at the liquid level 112, so that the valve 108 turns on when the float 110 falls (e.g., below a threshold liquid level 112 for turning the valve 108 on) and turns off when the float 110 rises (e.g., above a threshold liquid level 112 for turning the valve 108 off). In another embodiment, a valve 108 configured to control a fluid flow based on a liquid level 112 may include a diaphragm or pressure sensor to be submerged in the liquid so that the pressure on the diaphragm or pressure sensor corresponds to the liquid level 112 (e.g., at or near the bottom of the container 106). Such a valve 108 may turn on or off based on the pressure.

In some embodiments, a valve 108 configured to control a fluid flow based on a liquid level 112 may be a commercially available tank-filling valve. For example, tank-filling valves may be used for livestock watering, evaporative cooling, filling toilet cisterns, or the like. Such valves 108 may also be suitable for use in an apparatus 100.

In the depicted embodiment, the valve 108 is disposed in the container 106. Disposing a valve 108 in the container 106 may, in certain embodiment, provide a compact apparatus 100. In another embodiment, a valve 108 may be disposed at least partially outside the container 106 but may include or be coupled to an actuator such as a float 110 or diaphragm inside the container 106.

A fluid flow controlled by the valve 108, in various embodiments, may be the flow, movement, or current, of a fluid through the valve 108 (e.g., from the inlet 104 though the output line 114). The fluid for which the valve 108 controls a flow, in some embodiments, may be the same as the liquid in the container 106. For example, for irrigation, the liquid in the container 106 may be water, and the fluid flow controlled by the valve 108 may be a flow of water. In some other embodiments, the fluid for which the valve 108 controls a flow may be different from the liquid in the container 106. For example, a valve 108 may control treated water that includes a fertilizer or herbicide for irrigation, chlorine for pool filling, or the like, while the liquid in the container 106 may be untreated or diluted. In certain embodiments, the valve 108 or the fluid flow controlled by the valve 108 may be coupled to a container or tank for storing an additive, a device that adds an additive into the fluid flow, or the like.

The output line 114, in the depicted embodiment, is coupled to the valve 108, and configured to convey the fluid flow from the valve 108 to a location 116 outside the container 106. An output line 114, in various embodiments, may be any tube, hose, pipe, channel, or the like, capable of conveying a fluid. For example, in one embodiment, an output line 114 may be flexible irrigation tubing. In another embodiment, an output line 114 may be a rigid pipe. An output line 114 coupled to the valve 108 may receive fluid from the valve 108 (e.g., when the valve 108 is open), and may convey the fluid to the location 116. In one embodiment, an output line 114 may be detachably coupled to the valve 108. For example, a tube or hose as an output line 114 may be coupled to or detached from the valve 108 via a fitting or connector. In another embodiment, an output line 114 may be non-detachably coupled to the valve 108, integrally formed as part of the valve 108, or the like.

In one embodiment, an output line 114 may be referred to as "configured" to convey a fluid flow from the valve 108 to a location 116 outside a container 106 if the output line 114 is actually disposed with one end at the valve 108 and another end at the location 116. In another embodiment, an output line 114 may not yet be disposed between the valve 108 and the location 116 (e.g., when the apparatus 100 is being stored, transported, set up, or is otherwise not in use), but may nevertheless be referred to as "configured" to convey a fluid flow from the valve 108 to a location 116 outside a container 106 if the output line 114 is long enough to reach a location 116 outside the container 106 when the apparatus 100 is in use, is shaped to reach a location 116 outside the container 106 when the apparatus 100 is in use, or the like.

A location 116 outside the container 106, in various embodiments, may be any place, region, or area that is not within the container 106. For example, where an apparatus 100 is used for irrigation, a location 116 outside the container 106 may be a location where one or more plants are to be watered. Similarly, where an apparatus 100 is used for filling a tank or pool, the location 116 may be the tank or pool.

Additionally, in various embodiments, the location 116 outside the container 106 does not receive the liquid that exits the container 106 directly from the outlet 102. A location 116 that does not receive liquid directly from the outlet 102 of a container 106 may, in some embodiments, be disposed some distance away from the container 106 and/or the outlet 102 so that liquid leaving the container 106 (or, at least most of the liquid leaving the container 106) via the outlet 102 does not arrive at the location 116. For example, a location 116 that does not receive liquid directly from the outlet 102 of a container 106 may be a location that is not substantially in fluid communication with the outlet 102. However, in certain embodiments, a location 116 that does not receive liquid directly from the outlet 102 may still receive some amount of liquid indirectly from the outlet 102. For example, some small fraction of a liquid that exits an outlet 102 via evaporation may eventually condense at the location 116. Similarly, if an outlet 102 allows liquid from the container 106 to drain into the ground, the location 116 may be ground (e.g., a garden plot, a bed, or the like) disposed away from the outlet 102, and some small fraction of the liquid discharged from the outlet 102 may eventually reach the location 116 as groundwater. However, such a location 116 may still be referred to as not receiving liquid directly from the outlet 102 because the outlet 102 is not configured to discharge liquid directly at the location 116.

In certain embodiments, controlling a fluid flow to a location 116 outside a container 106 based on a liquid level 112 inside the container 106 may allow an apparatus 100 to be compact. For example, in some embodiments the liquid in the container 106 may be for control only (so that liquid leaving via the outlet 102 affects the liquid level 112 and the valve 108), and not for use at the location 116. In further embodiments, with liquid in the container 106 used for control only, an apparatus 100 may include a small container 106 where the amount of liquid in the container 106 is much less than (e.g., less than 50% of, less than 20% of, less than 10% of, less than 5% of, or even less than 1% of) an amount of fluid delivered to the location 116 when the valve 108 turns on.

By contrast, where float valves are used for tank filling in other contexts, the tank may be where the water is ultimately used (e.g., livestock may drink from the tank), or may be a reservoir with an outlet carrying water to where it is ultimately used (e.g., an evaporative cooler may pump water from the tank to evaporative pads above the tank). In either case, the tank may be large to hold the amount of water that is actually to be used and may require a float valve to be permanently or durably installed. Conversely, in various embodiments, an apparatus 100 that uses a liquid level 112 in a container 106 for control of a valve 108 only may be small and portable, because it does not need to hold a large amount of the fluid that the valve 108 and the output line 114 deliver to a location 116 outside the container 106.

Figure 2:
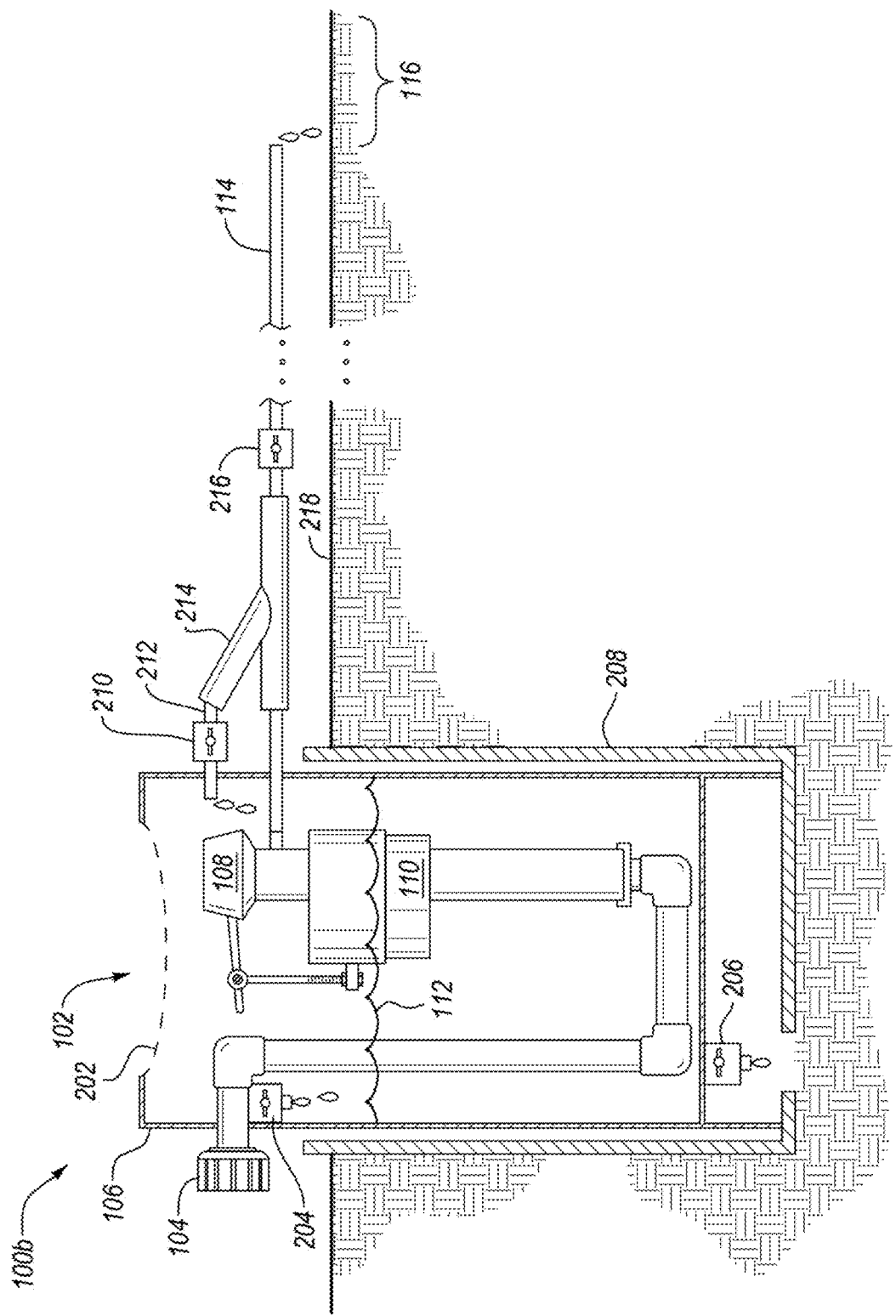
FIG. 2 is a side view illustrating another embodiment of an apparatus for fluid flow control.

FIG. 2 depicts another embodiment of an apparatus 100*b* for fluid flow control. In the depicted embodiment, the apparatus 100*b* is substantially similar to the apparatus 100*a* described above with reference to FIG. 1, including a container 106, a valve 108 and an output line 114, substantially as described above. In the depicted embodiment, the apparatus 100*b* includes a mesh 202, a fill valve 204, a drain valve 206, a sleeve 208, a return line 212, a branch connector 214, a return flow control device 210, and an output flow control device 216, which are described below.

The sleeve 208, in the depicted embodiment, is shaped to receive the container 106, and is configured to be disposed in the ground 218. A sleeve 208 shaped to receive the container 106, in various embodiments, may be a similar shape to the container 106, and may have one or more inner dimensions that are at least as large as corresponding outer dimensions of the container 106, to admit the container 106. For example, if the container 106 is cylindrical, the sleeve 208 may be cylindrical with an inner diameter at least as large as an outer diameter of the container 106. Similarly, if the container 106 is rectilinear or box-shaped, the sleeve 208 may have an inner length and width at least as large as the outer length and width of the container 106.

Ground 218, in various embodiments, may be an area of land, dirt, soil, or the like, and may include an area of land where dirt is naturally present on the surface of the earth, such as in a field or garden, or may include a human-created area or region of dirt in a raised bed, a plant pot, or the like. The location 116 that receives fluid from the output line 114, in certain embodiments, may also be a region of ground 218, separate from where the container 106 is disposed. In some embodiments, the apparatus 100b is configured to be disposed in the ground 218 (e.g., either directly or in a sleeve 208). An apparatus 100, container 106, or sleeve 208 configured to be disposed in the ground 218, in various embodiments, may have a shape, a material, and/or other attributes that exclude dirt or other substances from the inside of the apparatus 100, container 106, or sleeve 208. For example, in certain embodiments, a sleeve 208 configured to be disposed in the ground 218 may include rigid walls made of metal, plastic, or the like. With a sleeve 208 disposed in the ground 218, a user may place the container 106 in the sleeve 208 or remove the container 106 from the sleeve 208.

In some embodiments, a user may bury the sleeve 208 in the ground 218, with an upper opening of the sleeve 208 uncovered. The user may dispose the container 106 in the sleeve 208 when the apparatus 100b is in use. In certain embodiments, disposing the apparatus 100b in the ground 218 (e.g., in a sleeve 208) may leave the outlet 102 of the container 106 exposed to permit evaporation, but may protect the buried portion of the container 106 from damage (e.g., from lawn mowers, people stepping on the container 106, or the like). In another embodiment, the container 106 may be disposed directly in the ground 218, without a sleeve 208. However, the sleeve 208, in certain embodiments, may facilitate repeated insertion and removal of the container 106 from the same location in the ground 218. For example, a user may remove the container 106 from the sleeve 208 to maintain or adjust the apparatus 100b, then may replace the apparatus 100b in the sleeve 208.

In the depicted embodiment, the outlet 102 includes an opening configured to allow the liquid to exit the container 106 via evaporation. In certain embodiments, an outlet 102 at or near the top of the container 106 may permit evaporation and may also allow falling water from precipitation or from sprinklers to enter the container 106. However, with the apparatus 100b disposed in the ground 218, an evaporation outlet 102 may also allow dirt or debris to fall into the container 106. Accordingly, in the depicted embodiment, the outlet 102 includes a mesh 202 covering the outlet 102.

A mesh 202, in various embodiments, may be a material with small holes so that liquid can enter and/or exit the container 106 via the holes (e.g., via precipitation or evaporation), but so that solids larger than the holes are excluded from the container 106. For example, in various embodiments a mesh 202 may be a wire grid, a plastic webbing or netting, a fabric, a material made or sold for window screens, or the like. In some embodiments, holes may be sized to exclude solids such as dirt, debris, insects, or the like from the container 106.

The return line 212, in the depicted embodiment, is coupled to the output line 114, and is configured to divert a portion of the fluid flow controlled by the valve 108 from the output line 114 into the container 106. In various embodiments, a return line 212, like the output line 114, may be any tube, hose, pipe, channel, or the like, capable of conveying a fluid, such as flexible irrigation tubing, a rigid pipe, or the like. The return line 212 may be detachably or non-detachably coupled to the output line 114. In certain embodiments, the return line 212 may be coupled to the output line 114 outside the container 106. In further embodiments, a return line 212 configured to divert a portion of the fluid flow from the output line 114 may be coupled in fluid communication with the output line 114, so that a portion of the fluid flow from the valve 108 is diverted into the return line 212. The remainder of the fluid flow in the output line 114 may still be delivered to the location 116, as described above.

In certain embodiments, using a return line 212 to divert a portion of the fluid flow from the output line 114 into the container 106 may affect a run time for the apparatus 100b. A run time, in various embodiments, may be a time during which the valve 108 is open, delivering fluid to the location 116. For example, a run time may start when the liquid level 112 falls to a point that the valve 108 turns on and may end when the liquid level 112 rises to a point that the valve 108 turns off.

In certain embodiments, where the apparatus 100 is used for irrigation, evaporation of liquid from the container 106 may lower the liquid level 112, turning the valve 108 on, causing the output line 114 to deliver water to one or more sprinklers at the location 116 outside the container 106. The valve 108, in one embodiment, may be placed after a sprinkler valve (e.g., a solenoid or other electrically controlled sprinkler valve), which may be on a timer or the like. For example, the valve 108 may receive a fluid flow from a sprinkler valve and have one or more sprinklers coupled to the output line, in order to prevent overwatering by the one or more sprinklers, to act as a moisture monitoring system, or the like (e.g., based on the liquid level 112 within the container 106).

In this manner, in some embodiments, even if a sprinkler system is set to turn on (e.g., for a preset time period, for preset days/times, or the like) based on one or more other factors such as wind, shade, sun orientation, temperature, precipitation, or the like, watering may not be necessary, and the valve 108 may ensure that little or no water is used until the liquid level 112 has dropped to a predefined level (e.g., through evaporation, wicking, or the like), indicating that watering is needed and/or otherwise desirable. In such embodiments, the apparatus 100 may be disposed underground, in an irrigation box or other container, or the like.

In some embodiments, water entering the container 106 may raise the liquid level 112, turning the valve 108 (and the sprinklers) off. Thus, the amount of water delivered to the location 116 may depend on how fast water enters the container 106 to raise the liquid level 112. Similarly, when the apparatus 100 is used other than for irrigation, the rate at which fluid/liquid enters the container 106 may determine how long the valve 108 remains on. Thus, in various embodiments, using a return line 212 to divert a portion of the fluid flow from the output line 114 into the container 106 may affect or determine the run time. The flow rate for fluid entering the container 106 from the return line 212 may determine the rate at which the liquid level 112 rises, thus determining how soon the valve 108 turns off.

In contrast, devices that rely on a liquid level falling to turn a fluid flow on, but that do not include a return line 212 to raise the liquid level and turn the fluid flow off, may rely on more complex ways of turning a valve off. For example, a system may include electronic valve timers to turn a valve off. Conversely, an apparatus 100 including a return line 212 may turn a valve 108 on and off based on the liquid level 112, without relying on more complex electronics. In another embodiment, however, an apparatus 100 may be configured to raise the liquid level 112 when the valve 108 is on, without using a return line 212. For example, the apparatus 100 may be disposed downhill from the location 116, or may include an opening allowing groundwater to enter, so that some irrigation water delivered to the location 116 runs back into the container 106.

In the depicted embodiment, a branch connector 214 couples the return line 212 to the output line 114. In certain embodiments, a branch connector 214 may be disposed along the output line 114, between the valve 108 and the location 116 outside the container 106. A branch connector 214, in various embodiments, may be any connector or fitting that permits a fluid from an inlet to flow to at least two different outlets or branches. The output line 114 may be coupled to the inlet of the branch connector 214 and to a first outlet, to convey fluid to the location 116, and the return line 212 may be coupled to a second outlet of the branch connector 214, so that a portion of the fluid flow arriving at the inlet of the branch connector 214 is diverted to the return line 212 to convey fluid to the container 106. In various embodiments, a branch connector 214 may be a "Y" connector, a "T" connector, or the like.

In the depicted embodiment, the apparatus 100b includes a return flow control device 210 and an output flow control device 216. Although both a return flow control device 210 and an output flow control device 216 are present in the depicted embodiment, another embodiment of an apparatus 100 may include a return flow control device 210 without an output flow control device 216, or an output flow control device 216 without a return flow control device 210. In another embodiment, an apparatus 100 may omit both the return flow control device 210 and an output flow control device 216.

A flow control device 210, 216, in various embodiments, such as a return flow control device 210 and/or an output flow control device 216, may be any device that controls a flow rate. In one embodiment, a flow control device 210, 216 may be a valve that is adjustable by a user to increase or decrease a flow rate, such as a ball valve, a butterfly valve, a plug valve, or the like. In another embodiment, a flow control device 210, 216 may be a non-adjustable device that controls or limits a flow rate. For example, the branch connector 214 may include a narrower bore in one outlet than in another outlet to limit the fluid flow in that outlet relative to the other outlet.

The return flow control device 210, in the depicted embodiment, is disposed in fluid communication with the return line 212 to control a fill rate for the container 106. As described above, the fill rate for the container 106 may determine the run time for delivering fluid to the location 116. Thus, using a return flow control device 210 to limit or decrease the fill rate may increase the run time. Conversely, omitting a return flow control device 210 or adjusting a return flow control device 210 to increase the fill rate may decrease the run time.

The output flow control device 216, in the depicted embodiment, is disposed in fluid communication with the output line 114 to control an output rate for delivering fluid to the location 116. An output rate, in various embodiments, may be the rate at which fluid is delivered to the location 116. In the depicted embodiment, the output flow control device 216 is downstream of the branch connector 214 and controls the output rate directly. In another embodiment, the output flow control device 216 may be upstream from the branch connector 214 and/or the return flow control device 210 and may control the total flow through the branch connector 214, thus indirectly controlling the output rate, with the return flow control device 210 further controlling the fill rate for the container 106.

In some embodiments, an apparatus 100 may include a manual override. A manual override, in various embodiments, may be any device that allows a user to manually turn the valve 108 on by lowering the liquid level 112, and/or to manually turn the valve 108 off by raising the liquid level 112. In some embodiments, a manual override may include a drain valve 206 and/or a fill valve 204. In the depicted embodiment, a manual override includes both a drain valve 206 and a fill valve 204.

The fill valve 204, in one embodiment, is operable by a user to fill the container 106. For example, in the depicted embodiment, the fill valve 204 is coupled to the inlet 104 upstream from the valve 108. In another embodiment, a fill valve 204 may be coupled to a source of water (or of another liquid) separate from the inlet 104. A user may fill the container 106 using the fill valve 204 to shorten the run-time of the apparatus 100, or to prevent the valve 108 from turning on. For example, if the apparatus 100 for irrigation, the user may fill the container 106 using the fill valve 204 on a day when rain is predicted, to prevent the valve 108 from turning on, or to turn the valve 108 off if it is already on.

The drain valve 206, in one embodiment, is operable by a user to drain the container 106. For example, the container 106 may include a drain opening at the bottom of the container 106, and a drain valve 206 may be closed to prevent liquid from exiting the container 106 via the drain opening or may be opened to drain the container 106. In further embodiments, a user may open the drain valve 206 to drain the container 106, thus turning the valve 108 on, and may then close the drain valve 206, allowing the container 106 to re-fill (e.g., via the return line 212) so that the valve 108 turn off after some period of time. In one embodiment, a user may access the drain valve 206 by temporarily removing the container 106 from the sleeve 208. In another embodiment, the apparatus 100 may include a linkage connecting an above-ground control to the drain valve 206, so that a user can operate the drain valve 206 without removing the container 106 from the sleeve 208.

Additionally, in certain embodiments, an outlet 102 configured to allow liquid to exit the container 106 may include a drain, such as the drain valve 206. In various embodiments, a drain may be an opening permitting liquid to drain out of the container 106 and may be a permanent opening such as a drain hole or an adjustable opening such as a drain valve 206. In the depicted embodiment, the outlet 102 includes both a top evaporation opening and a drain valve 206 allowing liquid to exit the container 106. In another embodiment, an outlet 102 may include a drain or drain valve 206 without an evaporation opening. For example, the container 106 may have a closed top. In another embodiment, an outlet 102 may include an evaporation opening without a drain or drain valve 206.

In certain embodiments, a drain rate for liquid exiting the container 106 via a drain may control how often the valve 108 turns on or may increase a run time by effectively decreasing a fill rate. For example, in some embodiments, a user may adjust the drain valve 206 to drain liquid from the container 106 at a slow drip. Evaporation may cause liquid to exit the container 106 more quickly on hot or dry days, or less quickly on cool or wet days, thus turning the valve 108 on more or less often, but liquid slowly dripping out of the container 106 via the drain valve 206 may cause the valve 108 to turn on at some minimum frequency. In one embodiment, a minimum frequency for turning the valve 108 on, corresponding to a drain rate, may be adjusted by adjusting a drain valve 206. In another embodiment, a minimum frequency for turning the valve 108 on, corresponding to a drain rate, may be preset in an apparatus 100 with a fixed-size or non-adjustable drain opening.

Figure 3:
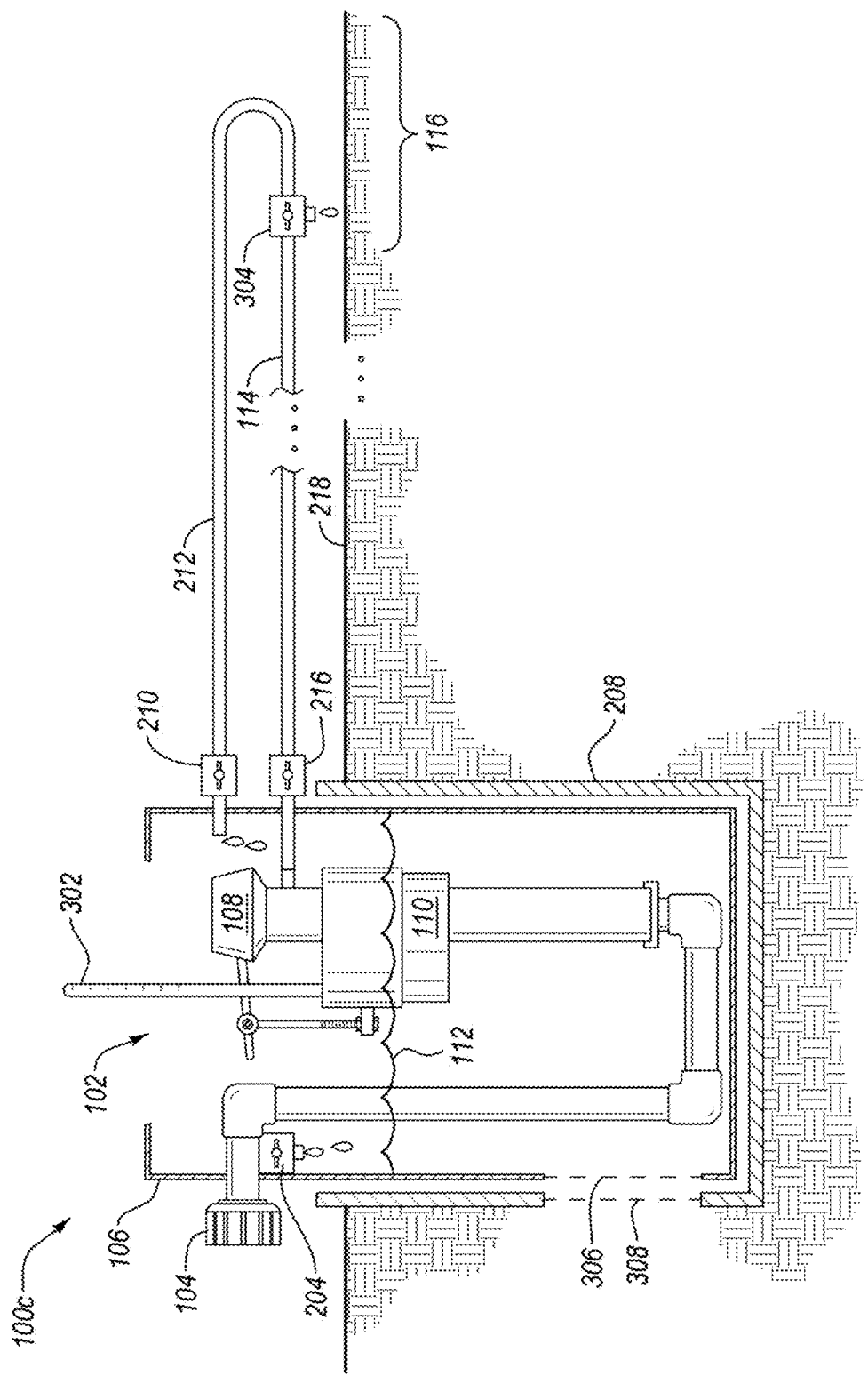
FIG. 3 is a side view illustrating another embodiment of an apparatus for fluid flow control.

FIG. 3 depicts another embodiment of an apparatus 100c for fluid flow control. In the depicted embodiment, the apparatus 100c is substantially similar to the apparatuses 100a-b described above with reference to FIGS. 1-2, including a container 106, a valve 108, an output line 114, a fill valve 204, a sleeve 208, a return line 212, a return flow control device 210, and an output flow control device 216, substantially as described above. In the depicted embodiment, the apparatus 100c includes a liquid level indicator 302, one or more sprinklers 304, and one or more permeable materials 306, 308.

A liquid level indicator 302, in various embodiments, may indicate the liquid level 112 in the container 106. In certain embodiments, it may be difficult for a user to directly perceive the liquid level 112 in the container 106. For example, if the container 106 is partially buried in the ground 218, covered by a mesh 202, or the like, it may be difficult for a user to see the liquid level 112. Thus, in certain embodiments, a liquid level indicator 302 may be any device that indicates or shows the liquid level 112 to a user, either directly or indirectly. For example, in one embodiment, if the container 106 is not buried, a liquid level indicator 302 may be a transparent window in the side of the container 106, permitting observation of the liquid level 112 through the window. In the depicted embodiment, the liquid level indicator 302 is a rod coupled to the float 110 for the valve 108, so that the extent to which the rod extends out of the container 106 indicates the liquid level 112 in the container 106. In another embodiment, a liquid level indicator 302 may be coupled to a float separate from the valve 108. In some embodiments, a liquid level indicator 302 may be another component that moves based on the liquid level 112, such as a rotating needle that rotates between empty and full positions based on a position of a float 110. Various other or further types of liquid level indicators 302 may be included in an apparatus 100.

In the depicted embodiment, the apparatus 100c includes one or more sprinklers 304. A sprinkler 304, in various embodiments, may include any irrigation device that sprinkles, sprays, and/or drips water on or around one or more plants. For example, in the depicted embodiment, a sprinkler 304 is a drip irrigation head. In another embodiment, a sprinkler 304 may be an impact sprinkler, a rotating sprinkler, a stationary spray sprinkler, head, a linear device such as a perforated sprinkler hose or soaker hose, or the like. Sprinklers 304 may be portable devices in some embodiments or may be permanently installed devices in some other embodiments. Various other or further types of sprinkler 304 may be included in an apparatus 100.

In the depicted embodiment, the return line 212 is coupled to the output line 114 after the location 116 outside the container 106 (e.g., the location 116 to which fluid from the valve 108 is delivered). Accordingly, fluid not used at the location 116 is returned to the container 106 by the return line 212. In certain embodiments, using a branch connector 214 to divert fluid into the return line 212 before the location 116 may provide a short return line 212 if the branch connector 214 is disposed close to the container 106. In the depicted embodiment, using a return line 212 to divert fluid that is not used at the location 116 back to the container 106 may involve a longer return line 212, but may avoid pressure drops at the location 116 that might occur if fluid is diverted into the return line 212 before the location 116.

Additionally, although one sprinkler 304 is depicted in FIG. 3, multiple sprinklers 304 may be coupled to the output line 114, resulting in decreased pressure at the later sprinklers 304. Similarly, if the apparatus 100 is used to deliver fluid to a location 116 without using sprinklers, an output line 114 may include a single outlet delivering liquid to the location 116, or multiple outlets delivering fluid to the location 116. If a user adds more sprinklers 304 or outlets to the apparatus 100c of FIG. 3, with the return line 212 looping back to the container 106 after the location 116, the pressure will decrease at the last sprinkler 304 or outlet, and in the return line 212, thus decreasing the fill rate for the container 106, and thereby increasing the run time for the apparatus 100c. Thus, an apparatus 100c with a return line 212 coupled to the output line 114 after the location 116 may provide a short run time if fluid consumption at the location 116 is low (e.g., if there are few sprinklers 304, or if a flow rate at the location 116 is otherwise configured to be small), and may provide a longer run time if fluid consumption at the location 116 is high (e.g., if there are more sprinklers 304, or if a flow rate at the location 116 is otherwise configured to be large).

Additionally, in certain embodiments, the apparatus 100c is configured to be disposed in the ground 218 (e.g., either directly or in a sleeve 208). In the depicted embodiment, a permeable material 306, 308 is configured to allow liquid to pass between the container 106 and the ground 218. Liquid passing between the container 106 and the ground 218 may include liquid exiting the container 106 into the ground 218, and/or liquid entering the container 106 from the ground 218, As described above, an outlet 102 may include a drain opening. In a further embodiment, a drain opening may include the permeable material 306, 308.

A permeable material 306, 308, in various embodiments, may be a substance that allows water or other liquids to pass through the permeable material 306, 308, and that blocks solids (or solids above a certain size) from passing through the permeable material 306, 308. In various embodiments, a permeable material 306, 308 may include a mesh, a membrane, a wicking material, or the like. A mesh, as described above, may include small holes allowing liquid to pass while excluding larger particles such as dirt, debris, insects, or the like. A membrane, similarly, may be a porous substance allowing liquid to pass while excluding larger particles from passing through pores in the substance. A wicking material may include a material through which liquid may move by capillary action.

In the depicted embodiment, the container 106 includes a permeable material 306 covering a drain opening, and the sleeve 208 includes a permeable material 308 covering a corresponding opening. Thus, liquid may exit the container 106 into the ground 218 through the permeable materials 306, 308. In certain embodiments that omit a sleeve 208, a permeable material 306 may allow water and/or another liquid to exit the container 106 directly into the ground. Additionally, in certain embodiments, one or more permeable materials 306, 308 may permit groundwater and/or another liquid to enter the container 106. Although the permeable material 306, 308 is depicted as a covering for the drain opening in FIG. 3, a permeable material 306, 308 in another embodiment may extend into the container 106 and/or into the ground 218. For example, a container 106 without a sleeve 208 may be buried in the ground, and a permeable material 306 may be a wicking material that extends into the container 106 and into the ground 218 to facilitate a liquid exiting the container 106 into the ground 218. As further examples, a permeable material that extends into the container 106 and into the ground 218 may be threaded through a hole in a sleeve 208 when the container 108 is disposed in the sleeve 208 or may be formed in two parts as a permeable material 308 extending from the sleeve 208 into the ground 218, in fluid communication with a permeable material 306 extending from the drain opening into the container.

In certain embodiments, allowing liquid to exit the container 106 into the ground 218, or allowing groundwater and/or another liquid to enter the container 106, may provide a run time that depends on ground moisture for the apparatus 100. For example, if the ground 218 is dry, liquid may exit the container 106 quickly, thus turning on the valve 108 more often and/or providing longer run times as the container 106 fills less quickly. If the ground 218 is less dry, liquid may exit the container 106 slowly, thus turning on the valve 108 less often and/or for shorter run times. If the ground 218 is saturated or very wet, groundwater entering the container 106 may prevent the valve 108 from turning on. Accordingly, if an apparatus 100c is used for irrigation, providing a permeable material 306, 308 so that liquid can exit or enter the container 106 to or from the ground 218 may provide more irrigation when the ground 218 is dry and less irrigation when the ground 218 is wet.

Furthermore, in some embodiments, an apparatus 100c with a permeable material 306, 308 that allows liquid to exit the container 106 into the ground 218 may be buried with the container 106 fully in the ground 218. Such an apparatus may have a closed top, may allow a liquid to enter or exit the container 106 via an outlet 102 in the form of a drain opening with a permeable material 306, 308 (rather than by evaporation), and may omit a liquid level indicator 302, or may be buried with the container 106 under the ground and a liquid level indicator 302 extending above the ground. Burying a container 106 fully, rather than partially, in the ground may, in certain embodiments, protect the apparatus 100 from being damaged by surface-level items, direct sunlight, or the like.

Figure 4:
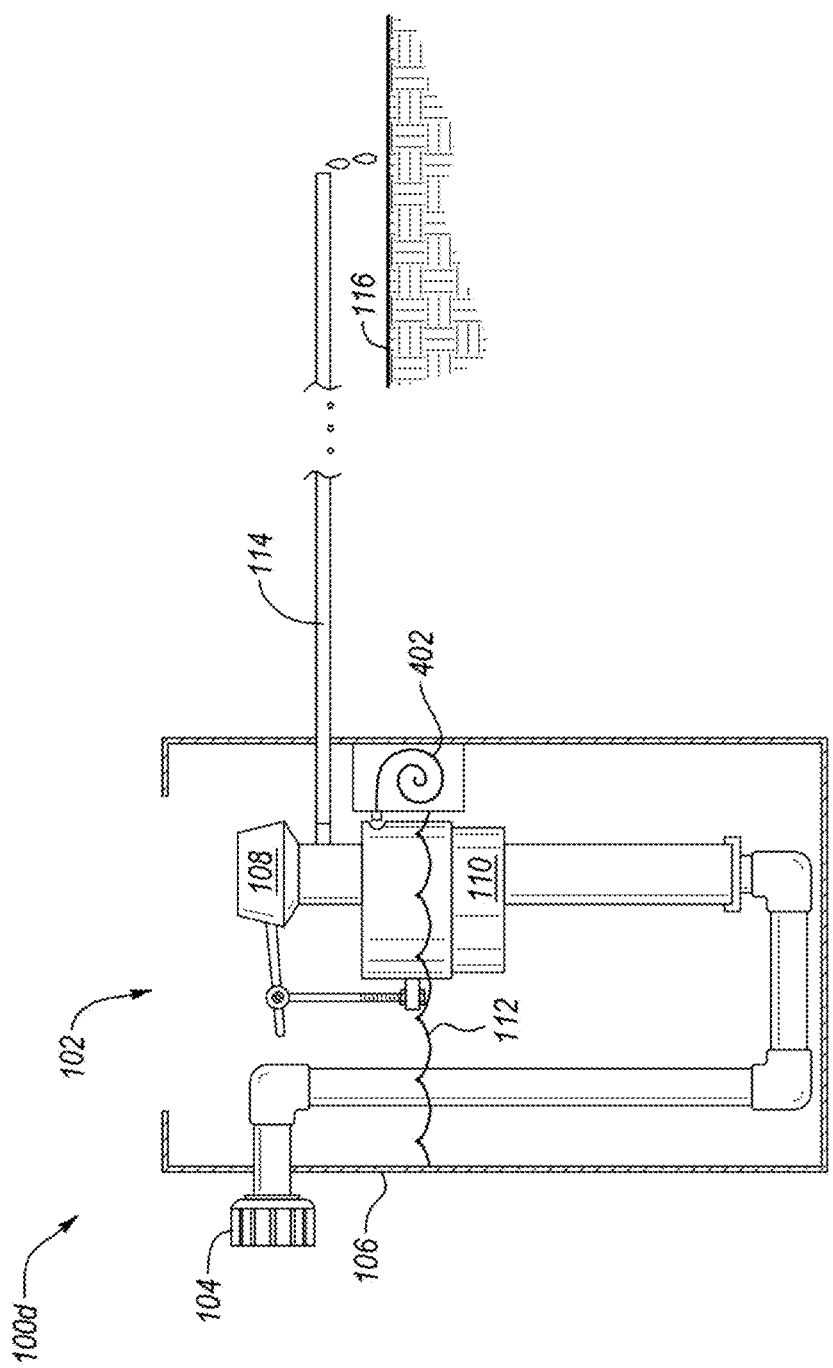
FIG. 4 is a side view illustrating another embodiment of an apparatus for fluid flow control.

FIG. 4 depicts another embodiment of an apparatus 100d for fluid flow control. In the depicted embodiment, the apparatus 100d is substantially similar to the apparatuses 100a-c described above with reference to FIGS. 1-3, including a container 106, a valve 108 and an output line 114, substantially as described above. In the depicted embodiment, the apparatus 100d includes a valve latch 402.

A valve latch 402, in various embodiments, may be any device configured to delay or temporarily prevent the valve 108 from opening. In certain embodiments, a liquid level 112 in the container 106 may drop to a point at which the valve 108 turns the fluid flow to the location 116 on, but at a time when fluid delivery may be undesirable or inefficient. For example, if an apparatus 100 is used for watering, the liquid level 112 may fall due to evaporation in the afternoon, but it may not be efficient to deliver water to the location 116 while high-evaporation conditions exist. In further embodiments, it may be more efficient to delay watering (or other fluid delivery) for some amount of time. For, example, it may be more efficient to delay watering until evening. Thus, in various embodiments, a valve latch 402 may delay the valve 108 from opening.

In one embodiment, a valve latch 402 may be manually operated by a user. For example, a user may move a valve latch 402 to a first position to prevent the valve 108 from opening and may subsequently move the valve latch 402 to a second position to allow the valve 108 to open. In some embodiments, a valve latch 402 may be electrically or mechanically operated. For example, a valve latch 402 may include an electrical (e.g., line-powered or battery-operated) or mechanical timer that permits the valve 108 to open after a preset or user-defined time period. In certain embodiments, a valve latch 402 may be heat activated.

A heat activated valve latch 402, in various embodiments, may be any device that is activated by heat (e.g., in response to a temperature exceeding a threshold), to prevent the valve 108 from opening. In the depicted embodiment, the float 110 includes a notch, and the heat activated valve latch 402 includes a bimetallic strip that expands in response to heat to engage the notch, thus preventing the float 110 from falling, and the valve 108 from turning on when the heat activated valve latch 402 is activated, even if the liquid level 112 in the container 106 falls. In another embodiment, a heat activated valve latch 402 may include an electronic temperature sensor (e.g., a thermocouple) and an electrical actuator, a wax actuator that expands or contracts based on heat, or any other substance or components capable of responding to heat to expand, contract, or otherwise prevent a valve 108 from opening. Similarly, although the heat activated valve latch 402 in the depicted embodiment engages a notch in a float 110, a heat activated valve latch 402 in another embodiment may engage another portion of a valve 108 (e.g., if the valve 108 is pressure actuated rather than float actuated).

In certain embodiments, where an apparatus 100 is used for watering, for outdoor tank filling or for other purposes where water use may be more effective at low temperatures, water in the container 106 may evaporate when the temperature is high, causing the liquid level 112 to drop to a point at which the valve 108 would normally turn on. However, the heat activated valve latch 402 may also activate in response to the high temperature, preventing the valve 108 from turning on. When the temperature falls below the activation threshold, the heat activated valve latch 402 may de-activate or disengage, allowing the valve 108 to turn on. Thus, an apparatus 100 including a heat activated valve latch 402 may delay the fluid flow controlled by the valve 108 until a temperature has fallen below a threshold. For example, an apparatus 100d used for watering may provide water to sprinklers 304 during a cool evening, when the heat activated valve latch 402 has disengaged, in response to liquid evaporating from the container 106 during a hot afternoon. Delayed watering (or other fluid delivery) when a temperature is below a threshold may, in certain embodiments, be more efficient than immediate watering (or other fluid delivery) when a temperature is above a threshold.

Figure 5:
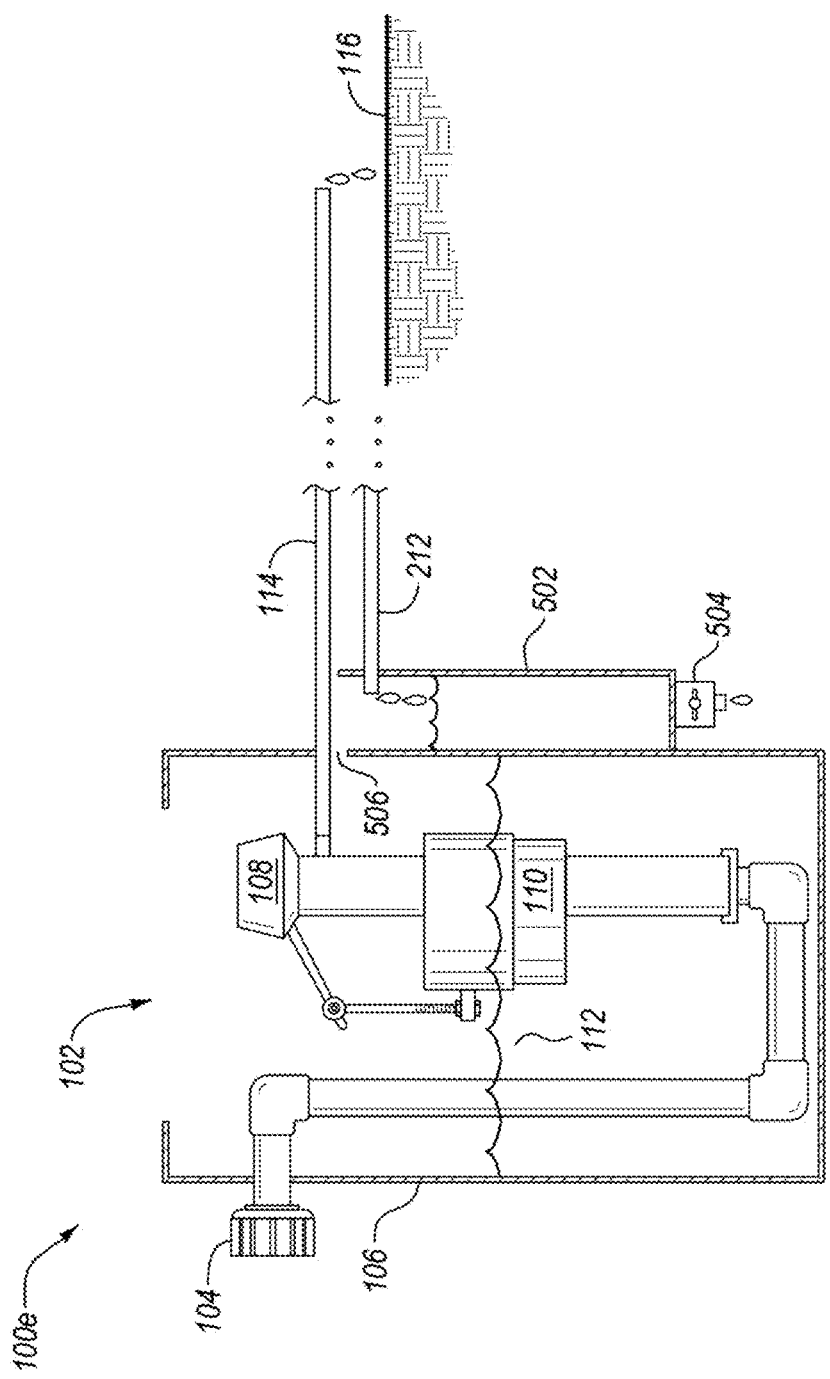
FIG. 5 is a side view illustrating another embodiment of an apparatus for fluid flow control.
Figure 6:
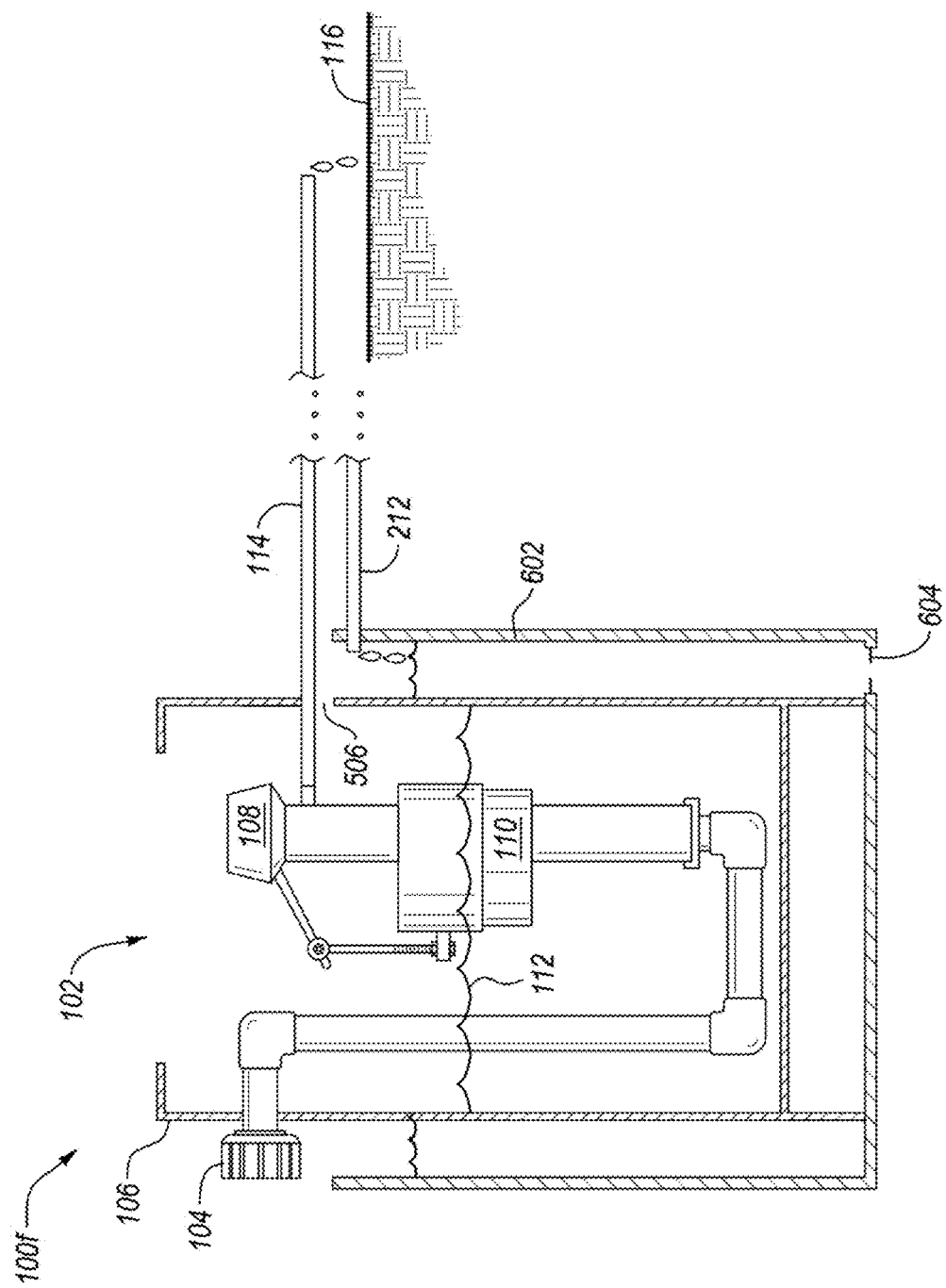
FIG. 6 is a side view illustrating another embodiment of an apparatus for fluid flow control.

FIGS. 5 and 6 depict further embodiments of an apparatus 100e, 100f (respectively), for fluid flow control. In the depicted embodiment, the apparatus 100 is substantially similar to the apparatuses 100a-d described above with reference to FIGS. 1-4, including a container 106, a valve 108, an output line 114, and a return line 212 substantially as described above. In the depicted embodiment, the container 106 includes a primary tank and a secondary tank 502, 602. The primary tank in FIGS. 5 and 6, is where the valve 108 is disposed, and the liquid level 112 is the level in the primary tank.

The secondary tank 502, 602, in the depicted embodiment, is in fluid communication with the primary tank. In certain embodiments, the secondary tank 502, 602 receives the portion of the fluid flow that is diverted from the output line 114, via the return line 212 (e.g., via a branch connector 214 as in FIG. 2 or a looped return line 212 as in FIG. 3). In the depicted embodiment, the primary tank and the secondary tank 502, 602 are open topped. In another embodiment, the primary tank and/or the secondary tank 502/602 may be covered on top by a mesh (e.g., the mesh 202 of FIG. 2) to exclude dirt, debris, insects, or the like, or may be closed on top (e.g., if the outlet 106 allows water to leave the container 106 other than by evaporation).

In a further embodiment, the secondary tank 502, 602 includes a drain port 504, 604. The drain port 504, 604, may be an opening, valve, or the like, that allows liquid to drain from the secondary tank 502, 602. For example, in FIG. 5, the drain port 504 is a user-adjustable drain valve, similar to the drain valve 206 described above with reference to FIG. 2. In FIG. 6, the drain port 604 is a small opening configured to allow liquid to drip out of the secondary tank 602, which may include a permeable material similar to the permeable material 306 described above with reference to FIG. 3. In various embodiments, the primary tank, the secondary tank 502, 602, or both tanks may include a drain port 504, 604.

In various embodiments, a valve 108 may be configured with various amounts of travel or throw between an on position and an off position. For example, a valve 108 may turn on when the liquid level 112 falls below a first threshold level and may turn off when the liquid level 112 rises to a second threshold level, which may be one inch above the first threshold level, two inches above the first threshold level, or the like. Space in the container 106 below the lowest level to which the float 110 travels (or otherwise below both the threshold levels for turning the valve 108 on and off) may not affect the valve 108 turning on or off. In certain embodiments, commercially available valves 108 may have a fixed amount of travel or throw between on and off positions. Thus, increasing or decreasing the run time for an apparatus 100 with such a valve 108 may involve increasing or decreasing the width of the container 106 so that the liquid level 112 rises more slowly or more quickly, which may also affect the off time for an apparatus 100 (e.g., the time from when the valve 108 turns off to when it turns on again). Alternatively, increasing or decreasing the run time for an apparatus 100 may involve adjusting the fill rate of the container 106 via a return flow control device 210 along the return line 212.

Accordingly, in certain embodiments, a secondary tank 502, 602 may determine the run time for the apparatus 100 independently of the off time for the apparatus 100. When the valve 108 is off, liquid may drain through the drain port 504, 604, so that the secondary tank 502, 602 is empty (e.g., if the ground 218 is dry). When the valve 108 is on, liquid may enter the secondary tank 502, 602 from the return line 212 and may simultaneously exit the secondary tank 502, 602 via the drain port 504, 604. The drain port 504, 604, may be configured with a drain rate less than the flow rate in the return line 212, so that the secondary tank 502, 602 fills slowly (compared to a similar tank without a drain port 504, 604).

When the secondary tank 502, 602 fills to the level of a spillway 506, liquid in the secondary tank 502, 602 may enter the primary tank via the spillway 506. Thus, in certain embodiments, the secondary tank 502, 602 increases run time for the apparatus 100, so that the run time includes the time to initially fill the secondary tank 502, 602. Additionally, in some embodiments, the fill rate for the primary tank may be decreased based on the drain rate through the drain port 504, 604. In certain embodiments, the increased run time based on the secondary tank 502, 602, is independent of the off time, which is based on the liquid level 112 falling in the primary tank. Additionally, if the ground 218 is wet or saturated, the secondary tank 502, 602 may be incompletely drained (or may be full of groundwater) when the valve 108 turns on, thus decreasing run time in already wet conditions.

In FIG. 5, the secondary tank 502 is disposed to the side of the primary tank. In certain embodiments, a secondary tank 502 to the side of the primary tank may be convenient to maintain. For example, in a portable, above-ground apparatus 100, the drain port 504 for the secondary tank 502 may be easily adjustable by a user.

In FIG. 6, the secondary tank 602 is disposed surrounding the primary tank. As described above, in a container 106 without a secondary tank 602, the volume of the container 106 below the threshold for turning the valve 108 on may not affect the run time of the apparatus 100, while the width of the container 106 may affect both the run time and the off time. A secondary tank 602 may extend below the primary tank, so that the volume underneath the primary tank can be used to provide an extended run time independent of the off time. By contrast, widening the container 106 to extend the run time may also extend the off time, and may increase the footprint of the apparatus 100.

Thus, in certain embodiments, an apparatus 100 with a secondary tank 602 surrounding the primary tank may be significantly narrower than an apparatus 100 that provides a comparable run time without a secondary tank 602, for a valve 108 with the same travel or throw between on and off positions. For example, in some embodiments, a single-container apparatus 100 may be eighteen inches in diameter to provide a desired run time, but a similar apparatus 100 with a secondary tank 602 may provide the same run-time with a taller secondary tank 602 and an overall diameter of six inches. A narrower apparatus 100 using a secondary tank 602 may be unobtrusive, or conveniently concealed among landscaping.

Figure 7:
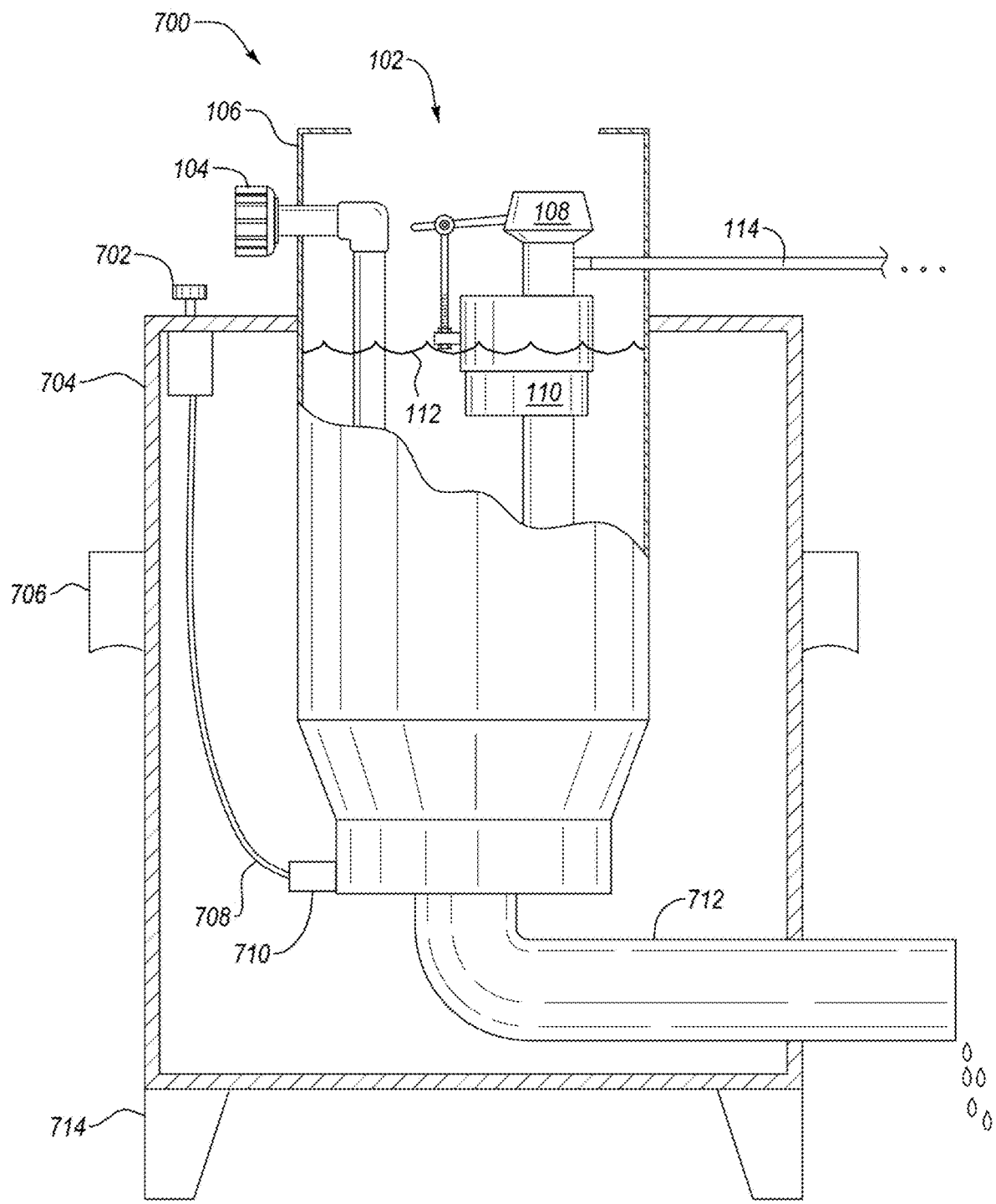
FIG. 7 is a side view illustrating one embodiment of a system for fluid flow control.

FIG. 7 depicts one embodiment of a system 700 for fluid flow control. The system 700, in certain embodiments, may include a container 106, a valve 108 and an output line 114, substantially as described above with regard to the apparatus 100. Additionally, in the depicted embodiment, the system 700 includes a portable receptacle 704.

In some embodiments, the apparatus 100 described above may be installed in the ground 218 for long-term fluid flow control. In certain embodiments, a portable, above-ground system 700 may be used for temporary fluid flow control. For example, a sprinkler system for a building may include electronic valve controls, but the electronic valve controls may not be operable if an electric permit has not yet been granted for the building. Accordingly, in some embodiments, a portable system 700 may be used to irrigate landscaping before electricity is available, and without burdensome manual control to adjust sprinkler on and off times to different circumstances or weather conditions.

A portable receptacle 704 in various embodiments, may be a box, a canister, a bucket, or the like, for carrying the container 106 and valve 108. In certain embodiments, the container 106 and the valve 108 may be disposed in the portable receptacle 704. The output line 114, in further embodiments, may be coupled to the valve 108 in the portable receptacle 704, and may convey fluid flow from the valve 108 to a location 116 outside the container 106, which may also be outside the portable receptacle 704. In further embodiments, a portable receptacle 704 may include carry handles 706, and/or legs 714 allowing the system 700 to be set up on landscaping without crushing an area of a lawn, or other plants.

In certain embodiments, a system 700 may include a manual override, as described above. In the depicted embodiment, the manual override includes a drain 710, operable to drain liquid from the container 106. Liquid exiting the drain 710 is conveyed out of the portable receptacle 704 by a drain pipe 712. In another embodiment, liquid may drain from the container 106 directly underneath portable receptacle 704. In the depicted embodiment, the drain 710 is operable by a user via a button or plunger 702 and a linkage 708 coupling the button or plunger 702 to the drain 710. In another embodiment, a drain 710 may be operable by a user reaching into the portable receptacle 704, without a linkage 708 for a button or plunger 702 exterior to the portable receptacle 704.

Figure 8:
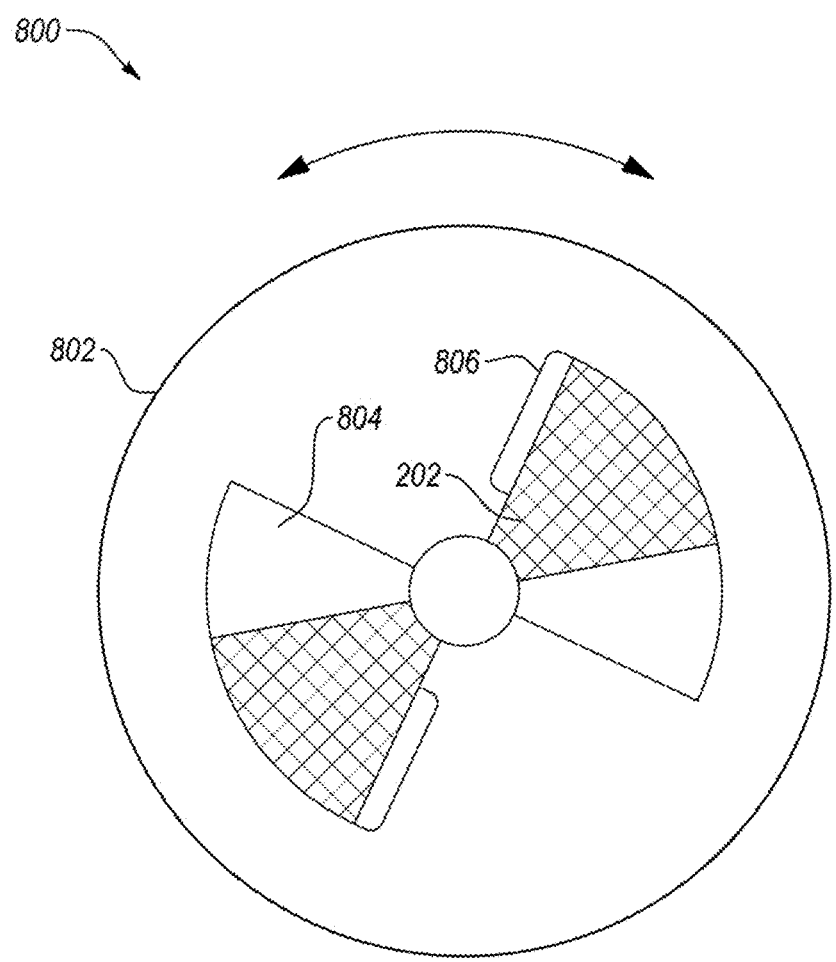
FIG. 8 is a top view illustrating one embodiment of a user-adjustable aperture.

FIG. 8 depicts one embodiment of a user-adjustable aperture 800. A user-adjustable aperture 800, in certain embodiments, may be used with an apparatus 100 or system 700 as described above. In certain embodiments, an outlet 102 allowing liquid to exit a container 106 may allow the liquid to exit via evaporation and may include a mesh 202 as described above with regard to FIG. 2, and/or a user-adjustable aperture 800.

A user-adjustable aperture 800, in various embodiments, may be an aperture or opening for which the size is adjustable by a user to adjust an evaporation rate through the outlet 102. In the depicted embodiment, the user-adjustable aperture 800 includes a lower plate 804 with openings, through which the mesh 202 is seen. In another embodiment, a user-adjustable aperture 800 may be used without mesh 202.

In the depicted embodiment, the user-adjustable aperture 800 further includes an upper plate 802 with openings corresponding to openings in the lower plate 804. The upper plate 802 is rotatably connected to the lower plate 804 at a central pivot point. A user may use tabs 806, protrusions, or handles to rotate the upper plate 802 relative to the lower plate 804. (Directions of rotation are indicated by a double-headed arrow). In a fully open position, the openings in the upper plate 802 are fully aligned with openings in the lower plate 804, allowing liquid to evaporate through the openings. In a fully closed position, the openings in the upper plate 802 are aligned with non-open portions of the lower plate 804, and liquid is blocked from evaporating through the user-adjustable aperture 800. In a partially open position, the openings in the upper plate 802 are partially aligned with non-open portions of the lower plate 804, which may permit evaporation, but at a lower rate than when the user-adjustable aperture 800 is in a fully open position.

A user may, in certain embodiments, rotate the upper plate 802 to a position at or between the fully open and fully closed positions, to control the effective size of the outlet 102, thereby controlling the rate at which liquid evaporates from the container 106. Controlling the rate at which liquid evaporates from the container 106, may in turn, control controlling the off time for the valve 108.

Figure 9:
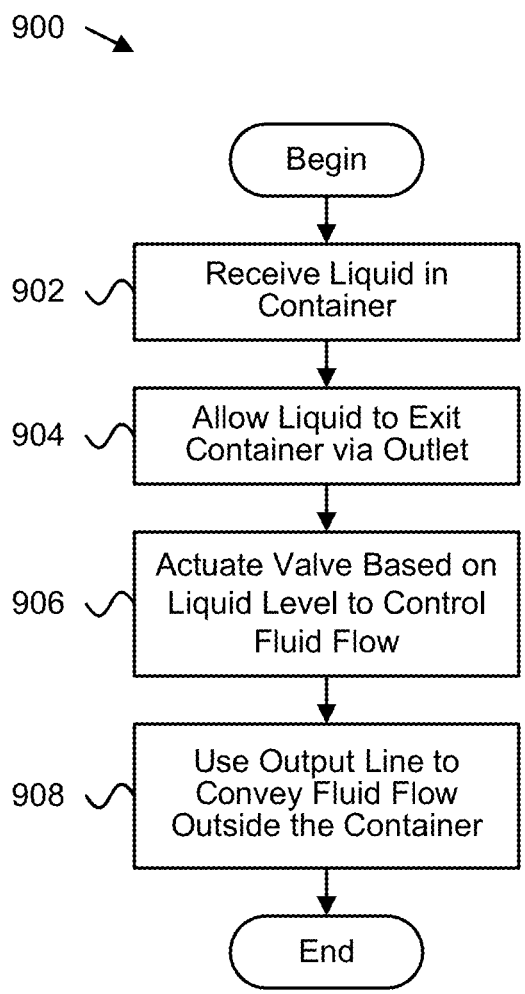
FIG. 9 is a schematic flow chart diagram illustrating one embodiment of a method for fluid flow control.

FIG. 9 is a flow chart diagram illustrating one embodiment of a method 900 for fluid flow control. The method 900 begins, and a container 106 receives 902 liquid. The container 106 includes an outlet 102. The outlet 102 allows 904 the liquid to exit the container 106. A valve 108 actuates 906 based on a liquid level 112 in the container 106, to control a fluid flow (e.g., opening at a first liquid level, closing at a different liquid level, or the like). An output line 114 coupled to the valve 108 conveys 908 the fluid flow from the valve 108 to a location 116 outside the container 106, and the method 900 ends. The location 116 outside the container 106 does not receive the liquid directly from the outlet 102.

Figure 10:
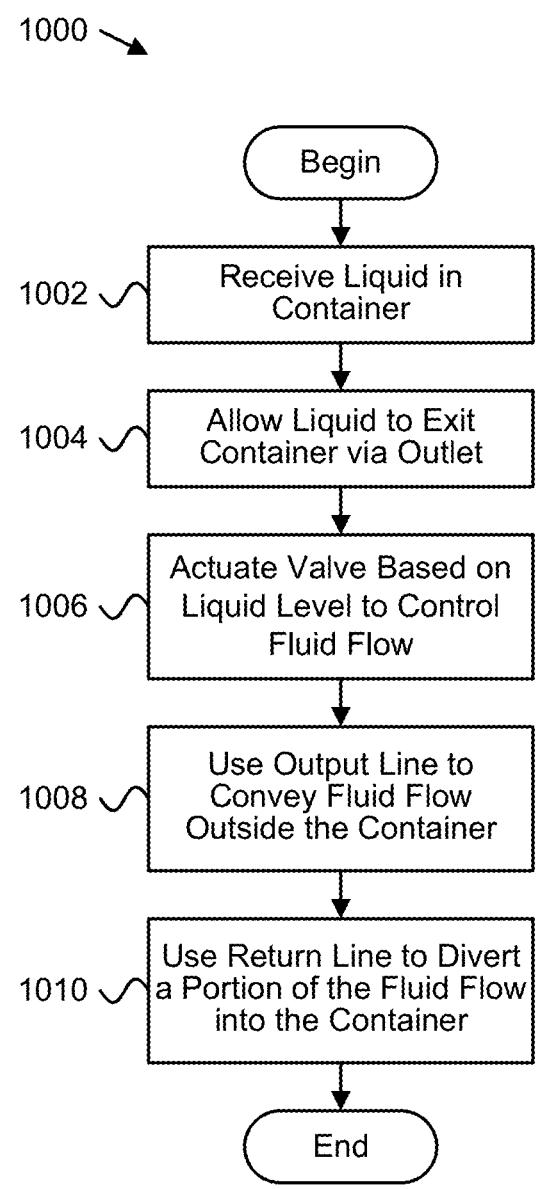
FIG. 10 is a schematic flow chart diagram illustrating another embodiment of a method for fluid flow control.

FIG. 10 is a schematic flow chart diagram illustrating another embodiment of a method 1000 for fluid flow control. The method 1000 begins, and a container 106 receives 1002 liquid. The container 106 includes an outlet 102. The outlet 102 allows 1004 the liquid to exit the container 106. A valve 108 actuates 1006 based on a liquid level 112 in the container 106, to control a fluid flow (e.g., opening at a first liquid level, closing at a different liquid level, or the like). An output line 114 coupled to the valve 108 conveys 1008 the fluid flow from the valve 108 to a location 116 outside the container 106. The location 116 outside the container 106 does not receive the liquid directly from the outlet 102. A return line 212 coupled to the output line 114, a bleed-off outlet 1906 coupled to the valve 108, or the like diverts 1010 a liquid (e.g., a portion of the fluid flow from the output line 114, a portion of liquid form the piston chamber 1904, or the like) into the container 106, and the method 1000 ends.

FIGS. 11, 12, 13A, and 13B depict further embodiments of an apparatus 1100*a-d* for fluid flow control. A valve 108 controls fluid flow from an inlet 104 to an outlet 114. As described with reference to previous Figures, the valve 108 may be coupled to a float 110 in the container 106 underneath, so that the valve 108 controls the fluid flow based on the liquid level in the container 106. As shown in FIGS. 20A-20D, the valve 108 may be a diaphragm valve 108, where a diaphragm 1902 can move within a chamber 1904. The inlet 104 and the outlet 114 connect to one side of the chamber 1904, so that when the diaphragm 1902 is seated against that side, fluid flow from the inlet 104 to the outlet 114 is blocked. The other side of the chamber 1904, on the opposite side of the diaphragm 1902, may be pressurized to seat the diaphragm 1902 and block fluid flow, or de-pressurized to unseat the diaphragm 1902 and allow fluid flow. In some examples of a diaphragm valve 108, pressure to this side of the chamber 1904 is provided from the inlet (e.g., through a small hole in the diaphragm), and controlled by blocking or opening a port (e.g., a weep hole or port) in the chamber wall.

Thus, when the port is blocked, the chamber pressure equalizes with the inlet pressure, and any flow from the outlet causes a pressure decrease on the outlet side, so that the pressure difference seats the diaphragm 1902 and closes the valve 108. Conversely, when the port is open, chamber pressure dissipates, so that pressure from the inlet side unseats the diaphragm 1902 and opens the valve 108. In some float valves, the float 110 may be coupled to the valve 108 to block or unblock the port depending on the water level, thus turning the valve 108 on or off. However, in such an arrangement, water (or whatever fluid is being controlled) comes out the port when the valve 108 is on. This flow of water out the port instead of out the outlet 114 may be unproblematic if the float valve 108 is used to refill a container 106 such as a livestock watering tank, as any water exiting the port also fills the container 106. However, in the present embodiment, where the valve 108 is used to control fluid flow to a location outside the container 106, fluid flow out the port instead of out the outlet 114 may be wasteful or may refill the container 106 undesirably quickly.

Additionally, some float valves 108 may turn on and off at a single water level, which is the water level where the float 110 blocks or unblocks the hole. Such float valves 108 begin to fill a container 106 as soon as the fluid level drops below a preset fill level. In various applications, it may be desirable for a valve 108 to stay closed while the water level drops to a significantly lower level than the fill level, before opening to refill the container 106 back up to the fill level. As one example, to control fluid flow to sprinklers, drip irrigation heads, or the like, where the water level in the container 106 is affected by rainfall, evaporation, soil moisture, or the like, it may be desirable for the valve 108 to open when the liquid level in the container 106 is at a first level (e.g., when the water level in the container is low due to evaporation or wicking), and remain open until the container 106 has refilled to a different, higher liquid level. Using a valve 108 that opens and closes at a single level may result in undesirably rapid cycling between the on and off positions. A float valve 108 that opens at a first, lower liquid level and closes at a different, higher liquid level may also be useful in many other fields outside irrigation.

The depicted embodiments solve these problems as described below. In certain embodiments, the valve 108 works, substantially similarly as described above on the same principle of allowing a liquid to exit the container 106, until the float 108 drops, but may utilize magnets or another mechanism to open and close the valve 108 based on the liquid level. In some embodiments, a wicking material 306 and/or another permeable material 306 may be used as a method of liquid movement in and out of the container 106. As described above, in some embodiments, the valve 108 is actuated when enough liquid exits the container 106 (e.g., into the surrounding soil or the like). The use of magnets 1104a-d to open and close the valve 108 allows the valve 108 to be isolated from the container 106 so that water and/or another liquid flowing out the valve 108 port does not refill the container 106. Additionally, the float 110 and the magnets 1104a-d may be configured so that the valve 108 does not immediately open when the liquid falls from its highest level, thus allowing a preset amount of liquid out before the valve 108 opens.

A piston and/or plunger 1102 opens or closes the port in the diaphragm 1902 valve 108, thus controlling the backpressure that opens or closes the main diaphragm 1902. The piston 1102, in the depicted embodiment, has one or more magnets 1104a in the base (e.g., coupled to the piston 1102) which are repelled and forced upward when the magnet 1104b coupled to a rod 1106 (e.g., in or toward a center of a disc coupled to the rod 1106, or the like) is raised upward within the container 106. The disc and/or magnet 1104b is coupled to the float 110 as further described below (e.g., slidably coupled to the rod 1106 with a stop 1108, or the like). Thus, when the piston 1102 is raised, the valve 108 port and the diaphragm 1902 valve 108 are closed. When the disc and/or magnet 1104b falls, the piston 1102 falls, opening the valve 108 port and the valve 108. Although a piston 1102 is disclosed herein for controlling a diaphragm 1902 valve 108, an apparatus in another embodiment may include another type of valve 108 coupled to a piston 1102 so that the valve 108 opens or closes according to the position of the piston 1102. The piston 1102, in the depicted embodiment, is isolated to a small chamber 1904, so that a liquid flowing out the port in the valve 104 is not introduced into the main holding container 106. When the piston 1102 is in the down position (e.g., so that the valve is open) liquid from the port of the valve 108 flows into the chamber 1904 surrounding it and out a dedicated port and line 1202. This line 1202 connects to the main outflow line 114, so that a liquid flowing out the port in the valve 108 goes to a location such as a sprinkler or drip irrigation head without being wasted, instead of into the container 106.

The line 1202 that drains the isolated chamber 1904 or piston 1102 compartment 1904 to the outlet line 114 does not apply the liquid back into the main holding container 106, but allows the flow to exit the piston compartment 1904 or other chamber 1904 so that opening the valve 108 port can effectively depressurize one side of the diaphragm 1902 and turn the valve 108 on. Additionally, this line 1202 may be used to add an alternative liquid into the main feedline 114 while isolating it from the container 106 liquid. For example, a small amount of concentrated fertilizer could be added into the plunger relief line 1202 upon activation of the valve 108, or the like.

The disc and/or magnet 1104b, above the float 110, in the depicted embodiments, repels a corresponding magnet 1104a coupled to the piston 1102 to close the valve 108. Magnets 1104c in the side of the disc attract to magnets 1104d, in the depicted embodiment, in a surrounding tube. The force exerted by these magnets 1104c, 1104d to keep the disc in place may be stronger than the force exerted by the repelling magnets 1104a, 1104b in the center and in the base of the piston 1102. So, until the magnetic hold between the disc and the surrounding tube is broken, the piston 1102 is forced to remain upward, closing off the valve 108. One or more floats 110 are coupled to the disc by a rod 1106 with a stop 1108 at the bottom. The floats 110 are slidably coupled to the rod 1106, so that as the liquid level falls, the floats 110 slide down the rod 1106 without moving the magnet 1104b, until reaching the stop 1106 at the bottom. Once the floats 110 reach the stop 1106, the weight of the floats 110 is transferred to the magnet 1104b by the rod 1106, thus breaking the magnetic hold between the disc and the surrounding tube, so that the magnet 1104b is lowered, the piston 1102 falls, and the valve 108 opens. The floats 110 may include or be coupled to weights 1110 to provide sufficient downward force. In other embodiments, instead of or in addition to weights 1110, a mechanical lever may counterbalance and/or otherwise mechanically advantage a float 110 (e.g., mechanically lifting the float 110 so that a smaller float 110 may be used, or the like). Some variations may include a mechanical latch to hold the disk in place until the floats 110 fall to the level of the stop 1108, rather than magnets 1104c-d to hold the magnet 1104b in place relative to the surrounding tube, or the like.

Figure 11:
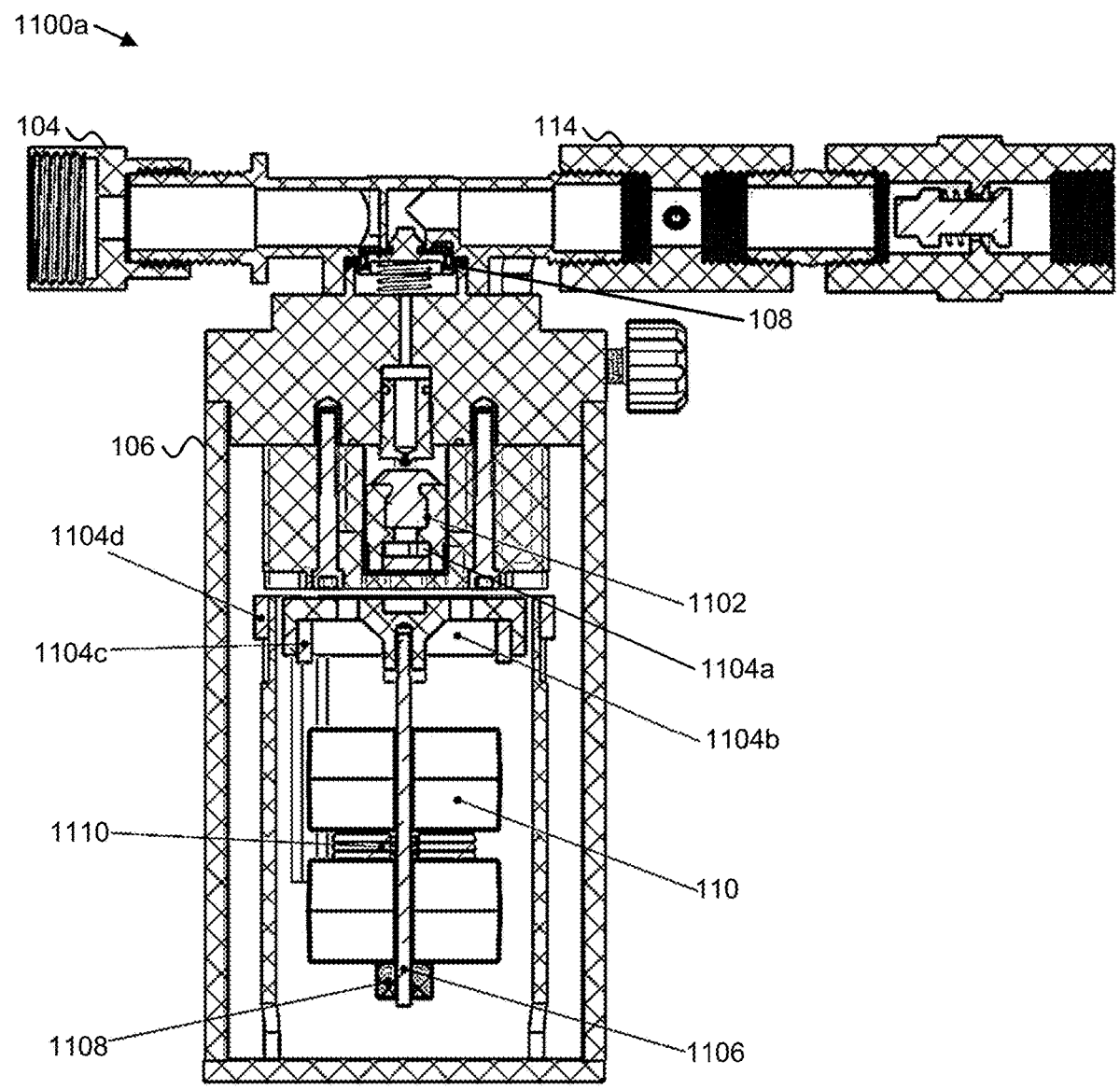
FIG. 11 is a side view illustrating another embodiment of an apparatus for fluid flow control.

Thus, holding the valve 108 magnetically closed while the floats 110 slide along the rod 1106 to the stop 1108 allows for a set amount of liquid to flow out of the container 106 prior to the valve 108 activating. Conversely, as the container 106 refills, the disc and/or magnet 1104b may raise gradually and/or the floats 110 may slide back up the rod 1106, until the disc and/or magnet 1104b reaches a level where the magnets 1104c-d once again hold the disc and/or magnet 1104b in place so that the piston 1102 is raised to close the valve 108. The difference in liquid levels between the low level that opens the valve 108 and the higher level that closes the valve 108 may be adjusted, in some embodiments, by adjusting the stop 1108 up or down on the rod 1106 to control the amount of travel for the floats 110. As seen in FIG. 11, in certain embodiments, a check valve in the outlet line 114 may be provided to prevent the built-up pressure in a connected dripline, or the like, from feeding back into the container 106 once the flow of liquid has stopped.

In one embodiment, an opening or openings in the top and/or lid 802 of the container 106 is covered by opaque foam or spongy material 202. This material 202 allows liquid to flow into and/or out of the top of the container 106, while keeping sunlight out, to prevent algae growth that might otherwise occur in liquid exposed to the sun. Under this foam 202, material ports or openings in the top and/or lid 802 allow water or another liquid to easily enter and/or exit the container 106, so that the liquid level in the container 106 is affected by factors such as evaporation and/or rainfall. The foam 202 or other material 202 also keeps unwanted materials out of the container 106.

Figure 12:
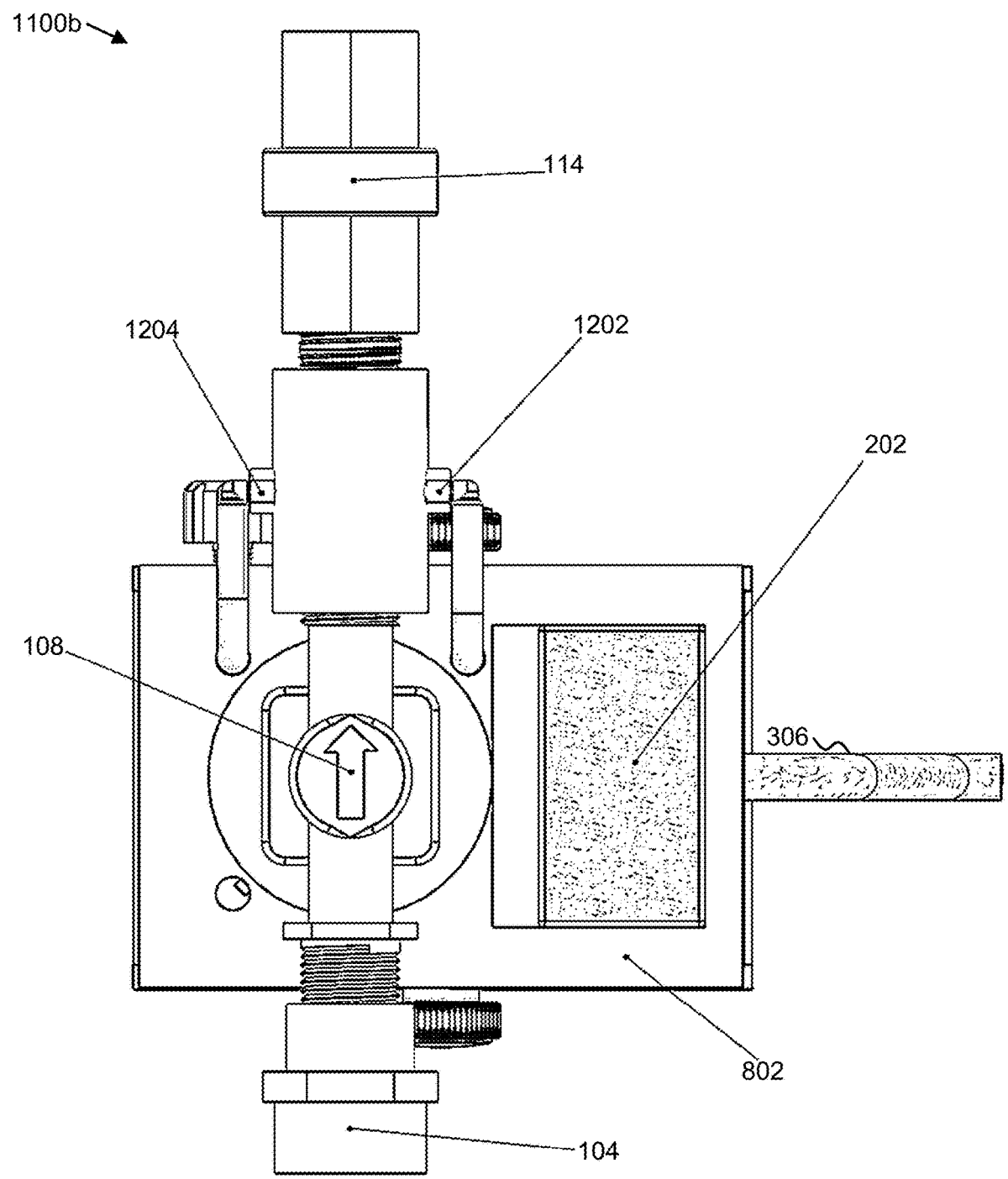
FIG. 12 is a top view illustrating one embodiment of an apparatus for fluid flow control.

A wicking material 306, extending to the right in FIG. 12, extends from an interior of the container 106 to an exterior (e.g., into the soil, the surrounding environment, or the like). This wicking material 306 allows a liquid to exit the container 106 at a higher rate when the soil is dry than when the soil is wet, so that the valve 108 self-adjusts as the soil conditions change. The liquid in the holding container 106 turns the valve 108 on at one level and off at another, different level as described above, thus triggering liquid flow when enough liquid has exited the container 106 via evaporation and/or the wicking material 306. Soil evaporation rates may vary throughout the year, and manually or electronically controlled sprinkler systems are seldom adjusted properly, so that over and underwatering occur. Conversely, this valve 108 may be directly controlled by soil moisture, evaporation, and/or rainfall. Dry soil draws moisture through the wicking material 306 like a straw, while damp soil slows the draw. As the soil becomes more saturated, water may move through the wicking material 306 in the other direction, into the container 106. Thus, in some embodiments, the valve 108 may activate more quickly in dry soil, activate less quickly in damp soil, and not activate at all in saturated soil (e.g., until the soil moisture has been reduced, or the like). By using such a valve 108 to control irrigation water flow based on a liquid level that is affected by evaporation, rainfall, and/or soil moisture, a user can avoid thinking about detailed irrigation settings (as with an electronic system) or whether those settings match the soil conditions.

In some embodiments, wicking material 306 in the container may be coupled to the opaque foam or spongy material 202 that covers the top and/or lid 802 of the container 106, so that a liquid from the container travels up the wick 306 and into the foam 202 and evaporates from there. For example, the wick material 306 may be connected to the underside of the foam 202 at the top and/or lid 802 of the container 106. This configuration may allow the sponge 202 to stay saturated, and to dry with the outdoor conditions. As the sponge 202 dries, water or another liquid is lifted out of the container 106 through the wick material 306, until enough has left the container to cause the float 110 to drop to the desired level and the valve 108 opens (e.g., a watering cycle begins). The sponge 202 at the top 802 of the container 106 may also allow water to pass through it into the container 106 when raining, or in other situations where water is introduced. The outside water such as rain can pass through the sponge 202 and then through ports in the container 106 and/or down the wicking material 306 into the container 106. With wicking material 306 coupled to the sponge or foam material 202 instead of or in addition to extending into the soil, the valve 108 and the container 106 may be used underground with soil covering the sponge or foam 202, so that the wicking material 306 and the foam 202 contact the soil and allow the soil to draw water from the container 106 through the wicking material 306 and the sponge 202. Underground use of the valve 108 may also allow water to filter through the soil and sponge 202 before entering the container 106. Alternatively, the valve 108 may be used above ground so that the container 106 empties by a combination of wicking and evaporation but is not directly in contact and/or communication with moisture in the soil, or the like.

The valve 108 turns off the liquid flow as the container 106 refills. A container fill line 1204, in some embodiments, branches off from the outlet line 114 to refill the container 106. In further embodiments, a bleed-off outlet 1906 refills the container directly from the valve 108 instead of or in addition to a container fill line 1204 from the outlet line 114. An adjustment knob may allow the end user to adjust the flow rate back into the main holding container 106 (e.g., adjusting a flow rate of a container fill line 1204 and/or a bleed-off outlet 1906). By adjusting the refill rate up to a fast flow or down to a slow drip, the valve can run (e.g., provide a liquid output cycle) for minutes, hours, days, and/or months respectively.

Although the use of the valve 108 has been described above primarily for irrigation, it can similarly be used for other applications, such as for keeping foundations adequately damp to reduce foundation shifting. For example, containers 106 and valves 108 may be placed at each corner of a slab foundation to monitor and apply water as needed. Various embodiments of the valve 108 may be used to control fluid flow in other applications or industries, including in soil, out of soil, with wicking material, with the fluid leaving the container 106 in another way, or the like. An apparatus for controlling fluid flow based on a liquid level in a container 106 may monitor a liquid level in a container 106, to then control flow of the same liquid, and/or another fluid. The liquid level in the container 106 may be affected by evaporation, wicking, or the like, or may enter or exit the container in another way. The flow of fluid controlled by the valve 108 may be delivered to a location outside the container 106 where the liquid level is being monitored.

Such an apparatus may be used in various industrial situations such as within the oil industry. For example, in a situation where a fluid such as oil is circulated through a machine, if that oil was routed to this container 106, the container 106 may remain full and the valve 108 may remain closed, however if the oil flow was interrupted (oil pump fails) the container 106 may begin to lose liquid causing the float 110 to drop which in turn may supply the same liquid or an alternative fluid to key locations. As further examples, in some applications where if a particular liquid flow is interrupted it could create a hazardous situation, this apparatus could be used to release a fluid which might neutralize a hazard (e.g., releasing water and/or another fire extinguishing agent in response to a fire causing evaporation of a liquid from the container 106, the container 106 melting and/or deteriorating to release a liquid, or the like).

Where an apparatus monitors the level of a liquid in a container 106 but directs fluid flow to a location outside the container 106, two completely different liquids/fluids can be used inside and outside the container 106 in some embodiments. For example, in one situation, the fluid flow may be of a toxic fluid, but the liquid monitored in the container 106 may be water.

In some embodiments, a wick 306 pulling liquid out of the container 106, or even a supply line 1204 back into the container 106 may be omitted. For example, as a safety device, a valve 108 may open if the liquid level drops, to release a fluid, and not turn off until the valve 108 is manually turned off. Although some examples are disclosed herein, an apparatus for fluid control may be useful in many other or further industries or applications.

Although the lines 1204, 1906 to refill the container 106 or to relieve pressure in the piston 1102 compartment 1904 are routed outside the main holding container 106 in the depicted embodiments, these lines may be routed through or inside the holding container 106 (e.g., while still isolated from the liquid level inside the container 106) in another embodiment. Further variations of the depicted design may include a liquid level indicator. Some variations may include a way to limit the rate at which liquid exits the container 106, such as an adjustable choke point, a way to adjust the exposed surface area of the wick 202, 306 where it contacts the soil, variations of wick 306 diameters or materials, or the like.

Figure 13A:
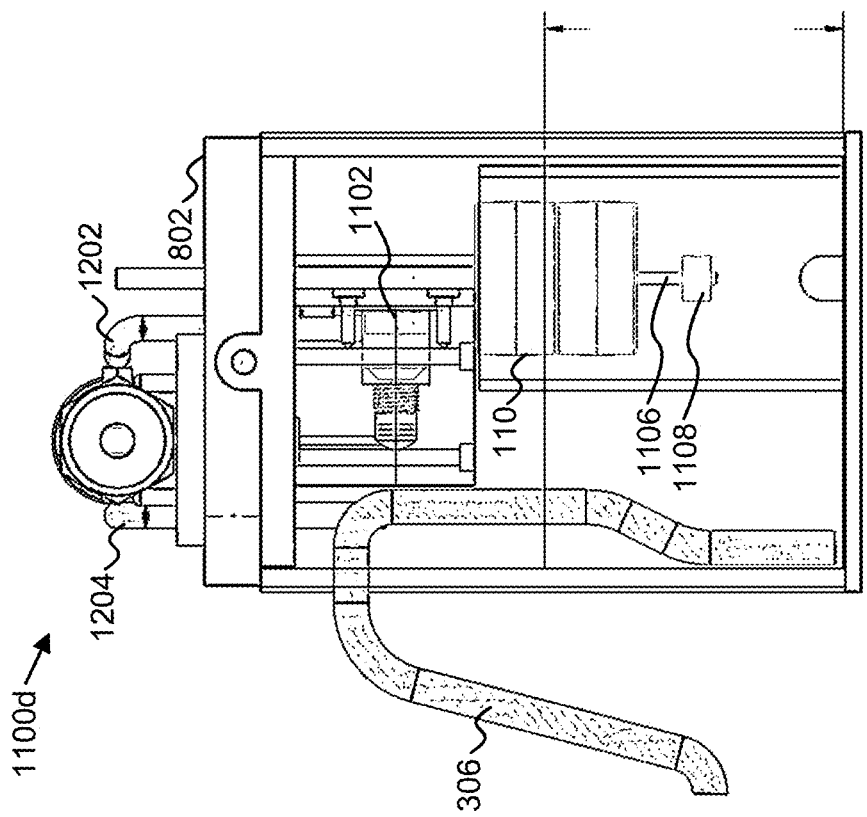
FIG. 13A is a side view illustrating another embodiment of an apparatus for fluid flow control.
Figure 13B:
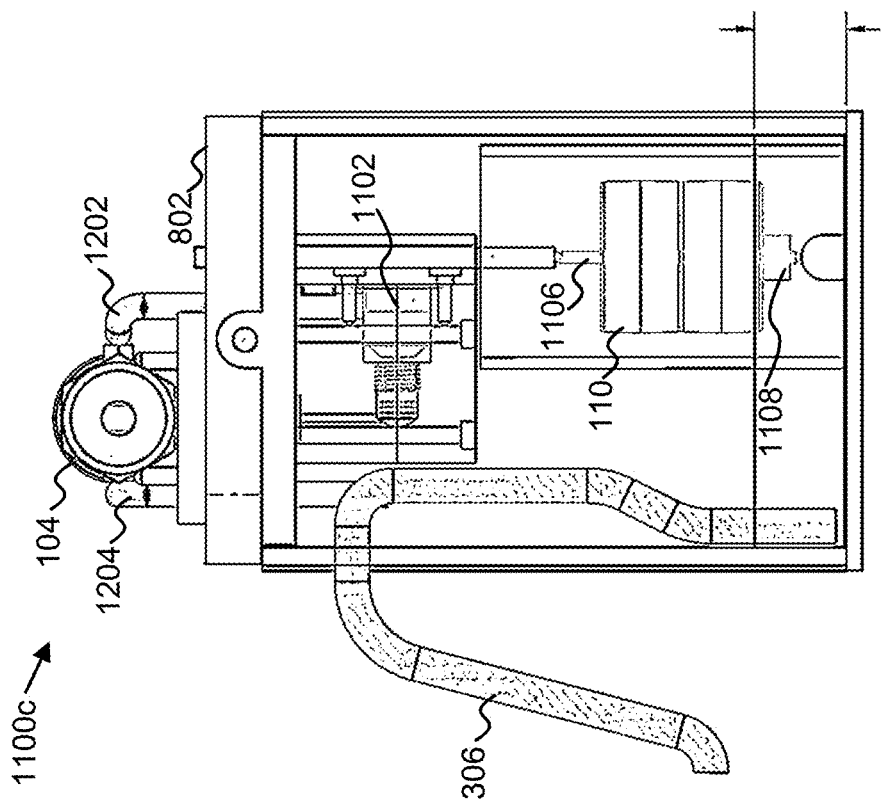
FIG. 13B is a side view illustrating another embodiment of an apparatus for fluid flow control.

In FIGS. 13A and 13B, the piston 1102 is horizontally oriented. It may still be actuated with one or more magnets 1104a-d repelling the piston 1102 to close the small valve 108 port, creating backpressure which closes the main diaphragm 1902. With the piston 1102 oriented horizontally, the magnet 1104b to repel the magnet 1104a coupled to the piston 1102 and close the valve 108 can be slid into position, requiring less upward force from the floats 110 than in some of the previously discussed embodiments.

The floats 110 are coupled to a vertical rod 1106, which may extend out of the container 106. Magnets 1104b may be disposed in and/or otherwise coupled to this rod 1106. For example, one magnet 1104b may be coupled to the rod 1106, two magnets 1104b may be coupled to the rod, or more. When the liquid level is high, in some embodiments, a lower magnet 1104b in the rod 1106 repels a magnet 1104a in the piston 1102 to keep the valve 108 closed. An upper magnet 1104b in the rod 1106 is attracted to a magnet 1104d above the piston 1102, keeping the rod 1106 from falling (comparable to the magnets 1104d at the side of the disc in the previously discussed embodiment). When the floats 110 reach the stop 1108 at the bottom of the rod 1106, their weight breaks this attraction, causing the rod 1106 to fall, so that the upper magnet 1104b in the rod 1106 attracts the magnet 1104a in the piston 1102, thus opening the valve 108 port to turn the valve 108 on.

In some embodiments, the upper magnet 1104b in the rod 1106 and the corresponding magnet 1104d above the piston 1102 may be omitted, so that one magnet 1104b in the rod 1106 repels the piston 1102 to keep the valve 108 closed, when the rod 1106 is in the up position, but no magnet is used to attract the piston 1102 and open the valve 108. When the rod 1106 falls, the pressure from the small valve port may be sufficient to move the piston 1102 and open the port as soon as the magnet 1104b in the rod 1106 that repels the piston 1102 is sufficiently far away from the magnet 1104a in the piston 1102. Instead of using an upper magnet 1104d to keep the rod 1106 from falling until the liquid level falls sufficiently, the rod 1106 may be held in place in another way. For example, the magnet 1104b in the rod 1106 that repels the piston 1102 may be positioned so that when the rod 1106 is in the "up" position, the center of the magnet 1104b in the rod 1106 is above the center of the magnet 1104a in the piston 1102. In this configuration, the repulsive force from the magnets 1104a, b prevents the rod 1106 from falling until this force is overcome by the weight of the floats 110, when they reach the stop 1108 at the bottom of the rod 1106. Alternatively, or in addition, with sufficiently strong magnets 1104a, b, the force of the magnets 1104 a, b may bias the rod 1106 against its housing so that friction prevents the rod 1106 from falling until the floats 110 reach the stop 1108 at the bottom of the rod 1106.

FIGS. 13A and 13B depict low and high liquid levels in the container 106, for turning the valve 108 on and off in this embodiment. In FIG. 13A, the liquid level is low enough for the floats 110 to have moved down along the rod 1106 and reached the stop 1108 at the bottom, so that the weight of the floats 110 pulls the rod 1106 down and the magnets 1104a, b open the valve 108. As the container 106 refills, the floats 110 slide up along the rod 1106 before the rod 1106 moves, and the rod 1106 rises until a magnet 1104b coupled to the rod 1106 repels a corresponding magnet 1104a coupled to the piston 1102 to close the valve 108. In embodiments where the rod 1106 comprises multiple magnets 1104b-c (e.g., so an upper rod magnet 1104c is attracted to a corresponding magnet 1104d disposed somewhere above the piston 1102, or the like) and the upper rod magnet 1104c may initially attract the magnet 1104a coupled to the piston 1102 until the rising rod 1106 is pushed higher by the float 110 and the attractive force between the upper rod magnet 1104c and the piston magnet 1104a is broken and a lower rod magnet 1104b repels the piston magnet 1104a to close the valve 108. in either embodiment, the valve 108 remains open until the rod 1106 is raised to the position shown in FIG. 13B, where the piston 1102 is once again repelled by the magnet 1104b in the rod 1106 (e.g., a lower magnet 1104b, a single magnet 1104b, or the like).

In this embodiment, flow through the wicking material 306 may also be adjusted to increase or decrease the length of time that the valve 108 remains closed for. In some embodiments, the wicking material 306 may be routed past a knob with an eccentric lobe. With the knob in one position, a liquid flows freely though the wicking material 306. With the knob in another position, the lobe pinches the wick 306 to limit flow. Limiting flow through the wicking material 306 may be useful to change how rapidly the valve 108 responds to soil dryness. For example, limiting the flow through the wick 306 may cause the valve 108 to wait longer before turning on.

In various embodiments, flow through the wicking material 306 may be adjusted in various other or further ways. For example, to step the diameter of the external wick 306 up or down, the internal container wick 306 may be of a predetermined diameter with a connection point on the outside of the container 106 where the end user could attach a larger or small diameter wick to speed or restrict the flow out of the container 106 into the soil. As another example of how flow through the wicking material 306 may be adjusted, the exposure of the wicking material 306 to the soil may be adjusted. For example, wicking material 306 may be extended out from or retracted into the container 106, or an outer structure can be attached or removed to limit or expand the linear area which is exposed to the soil. The more area that is exposed the faster the evacuation rate will be of a liquid from the container 106.

Figure 14:
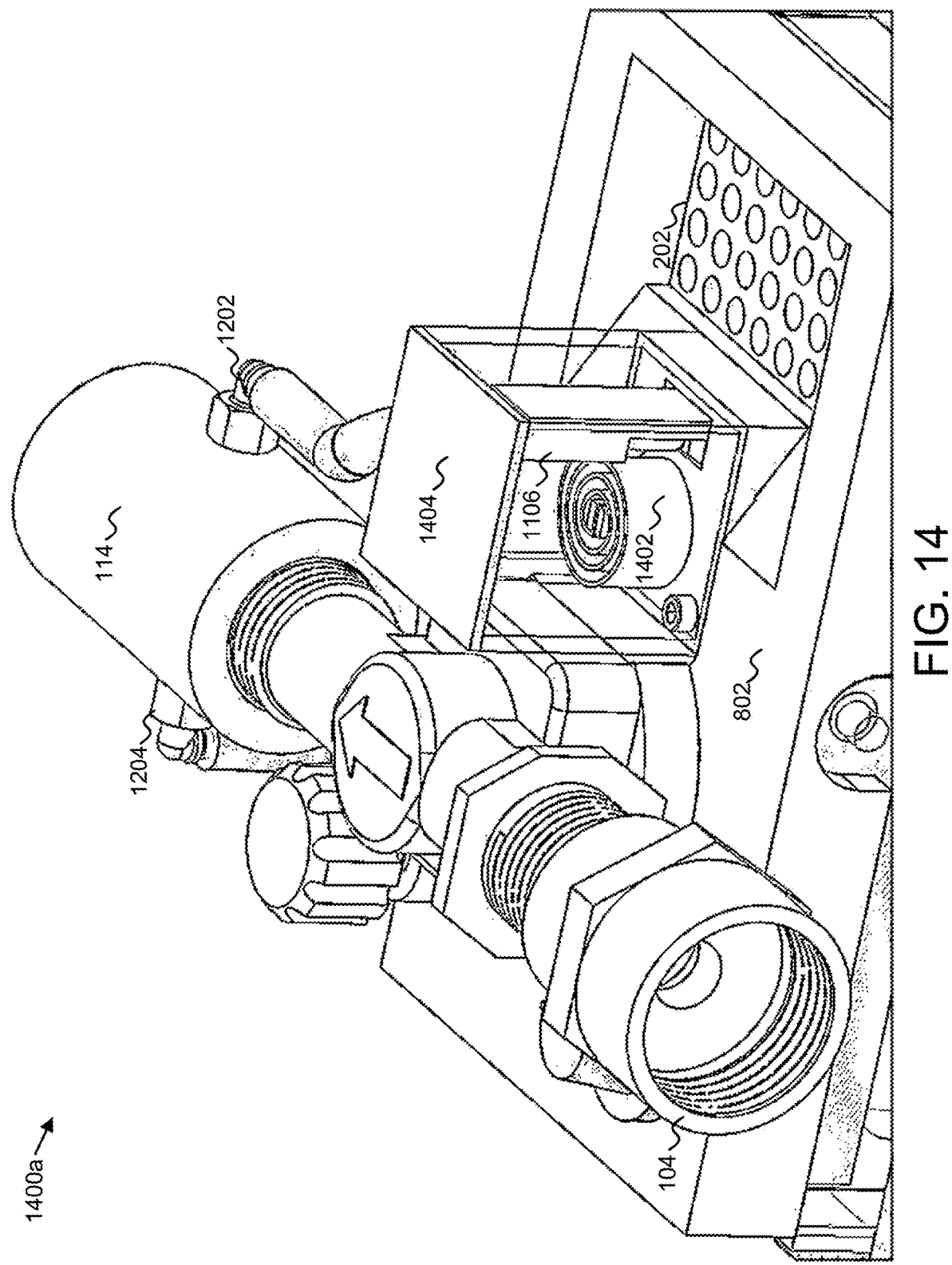
FIG. 14 is a perspective view illustrating one embodiment of an apparatus for fluid control comprising a delay latch.
Figure 15:
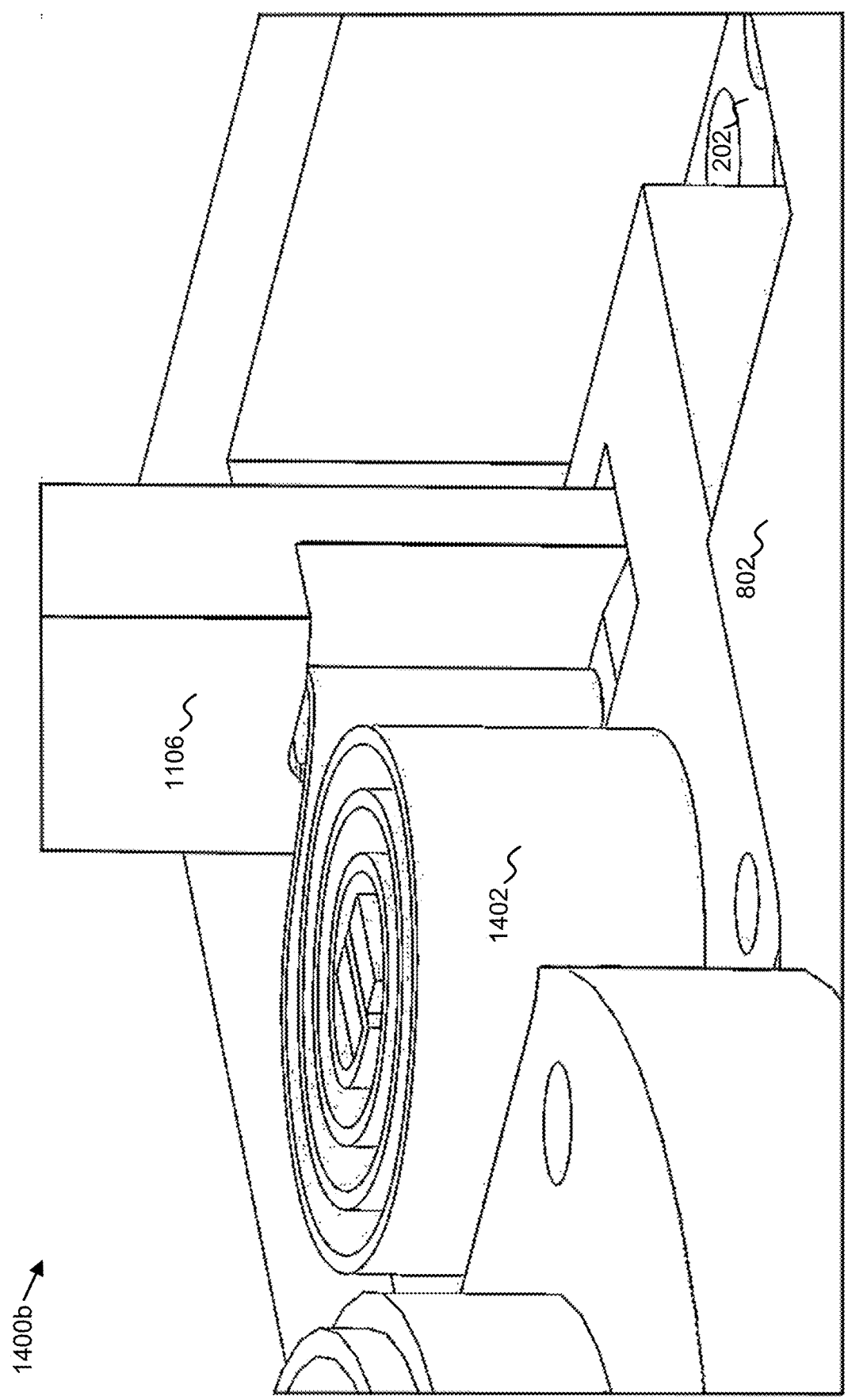
FIG. 15 is a perspective view illustrating another embodiment of an apparatus for fluid control comprising a delay latch.
Figure 16:
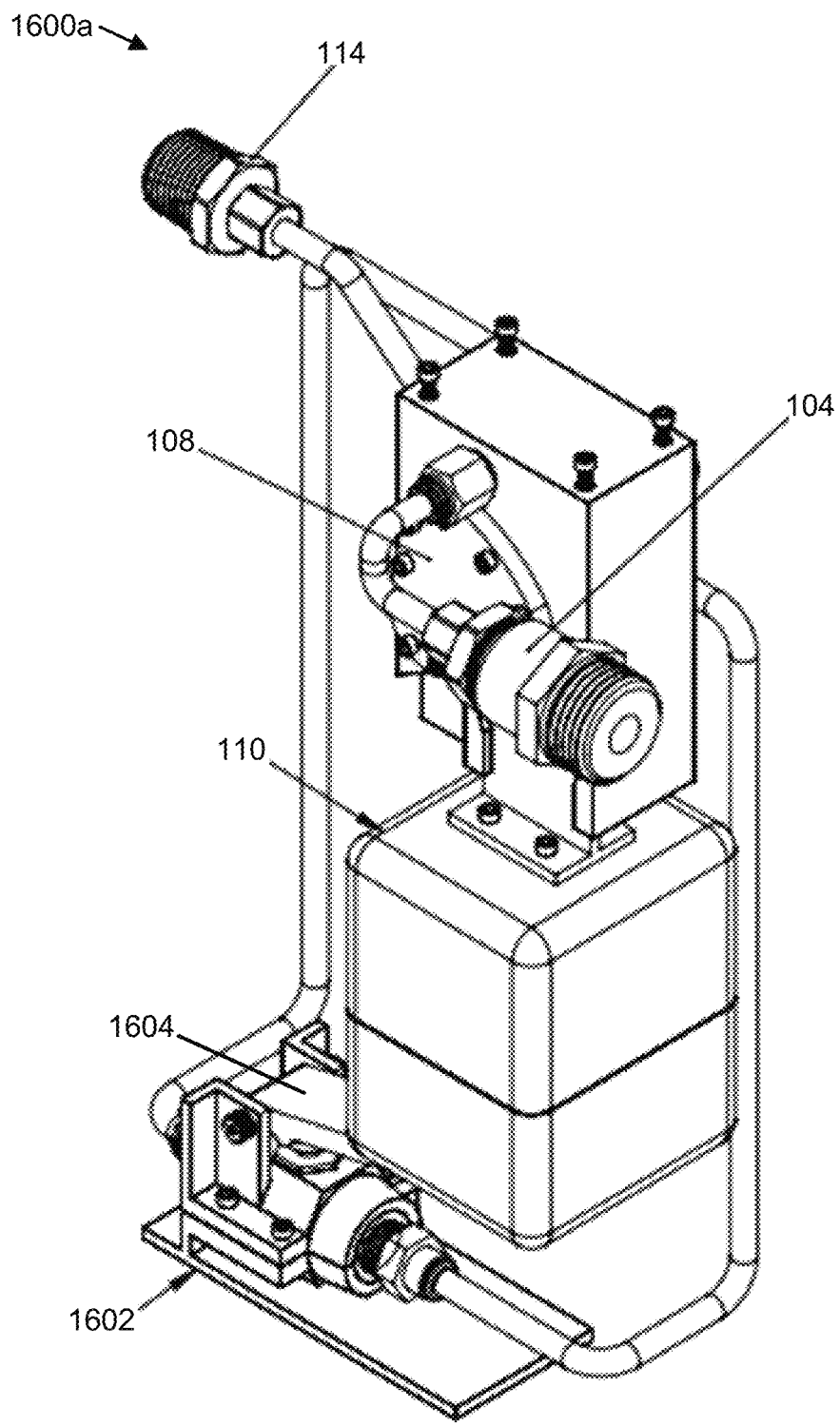
FIG. 16 is a perspective view illustrating another embodiment of an apparatus for fluid flow control.
Figure 17:
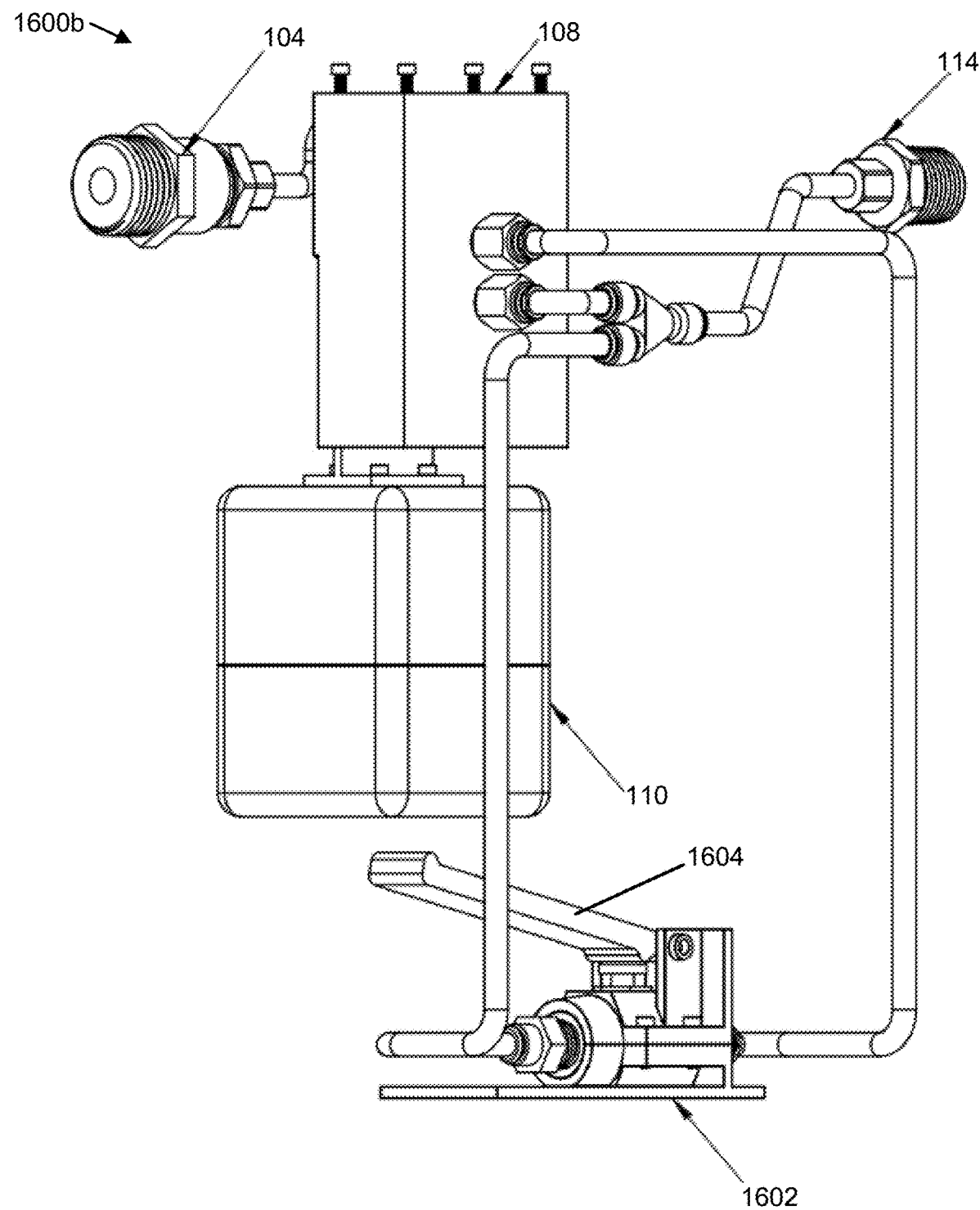
FIG. 17 is a perspective view illustrating another embodiment of an apparatus for fluid flow control.
Figure 19A:
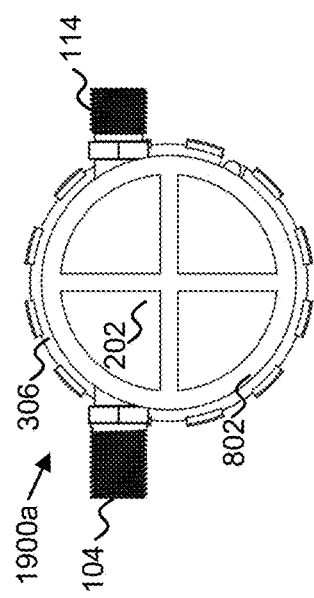
FIG. 19A is a top view illustrating another embodiment of an apparatus for fluid flow control.
Figure 19B:
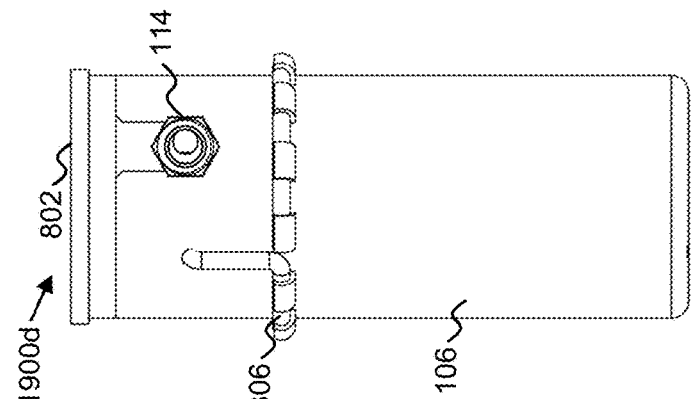
FIG. 19B is a side view illustrating another embodiment of an apparatus for fluid flow control.
Figure 19C:
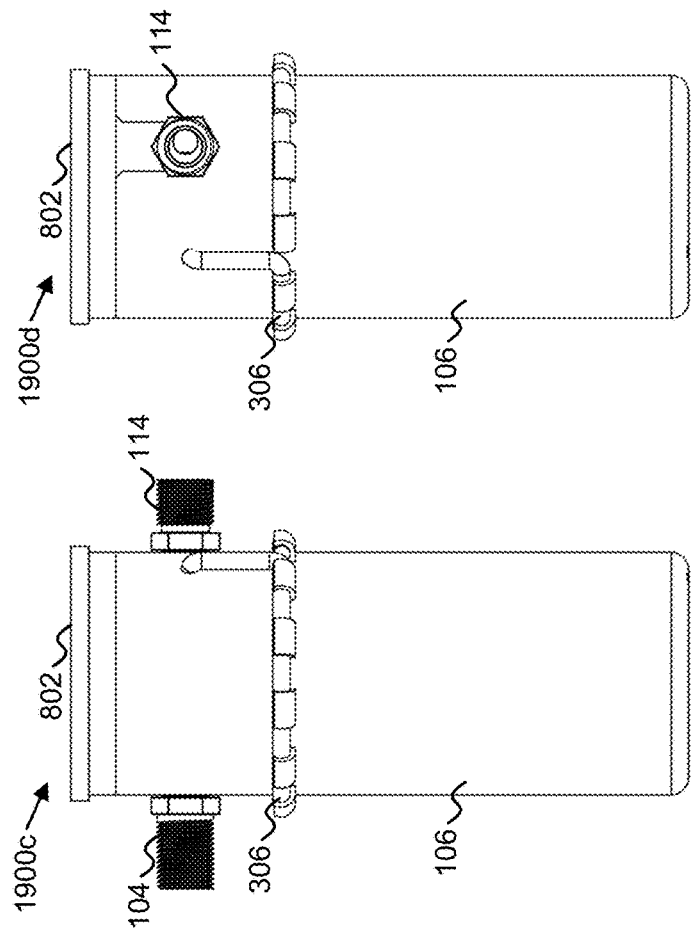
FIG. 19C is a side view illustrating another embodiment of an apparatus for fluid flow control.
Figure 19D:
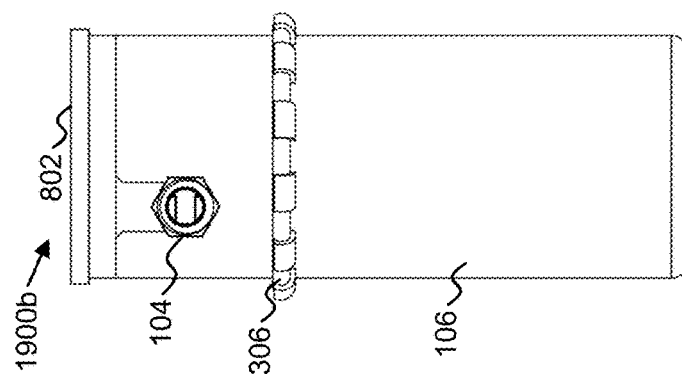
FIG. 19D is a side view illustrating another embodiment of an apparatus for fluid flow control.
Figure 20E:
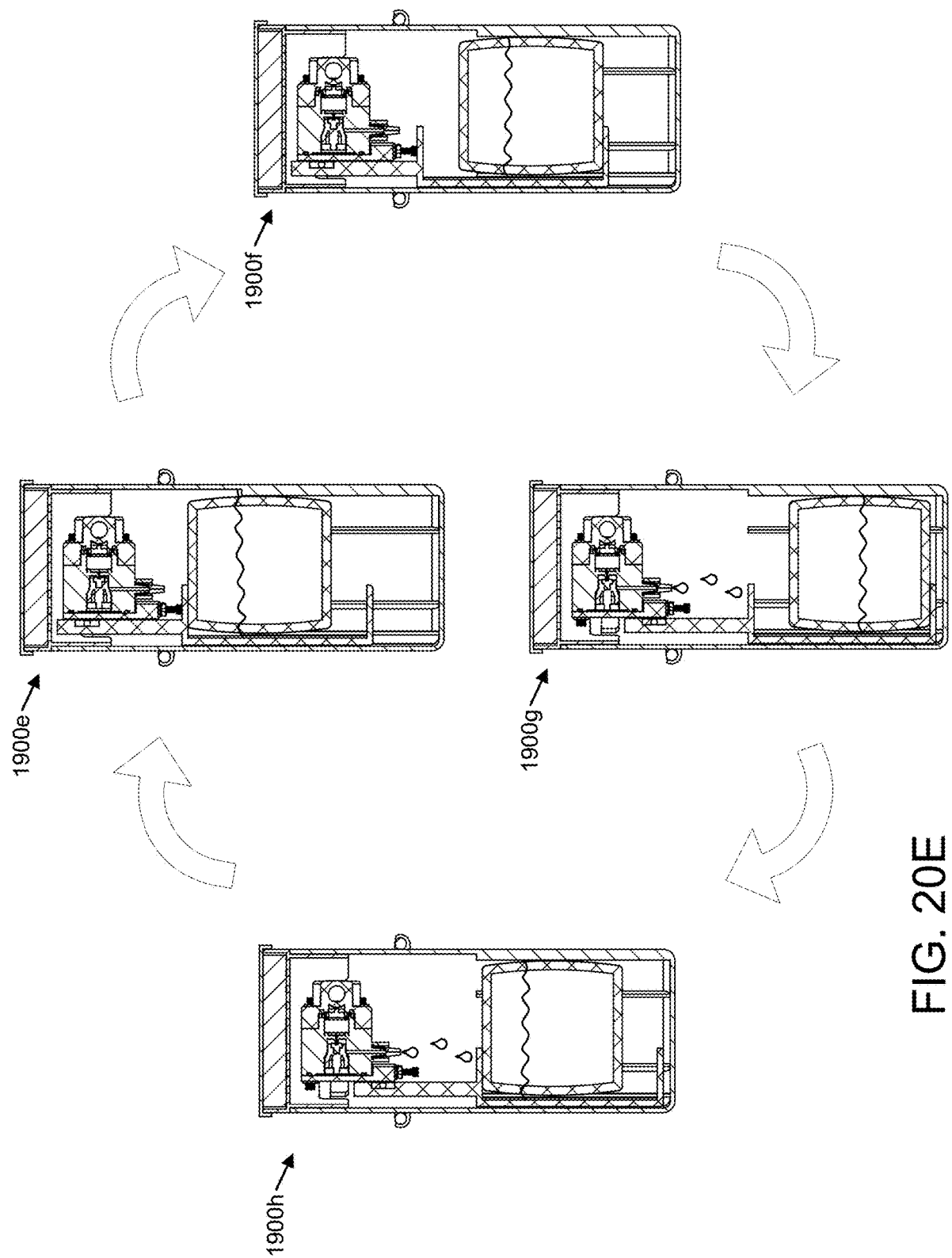
FIG. 20E is a side view illustrating another embodiment of an apparatus for fluid flow control.

FIGS. 14-15 depict one embodiment of an apparatus 1400a-b for fluid flow control comprising a delay latch 1402. In the depicted embodiments, the latch 1402 includes a bimetallic strip 1402 that engages a notch in the rod 1106. Thermal expansion of the strip 1402 may be used to prevent the valve 108 from watering during the day (e.g., the delay latch 1402 may mechanically hold the valve 108 closed in response to a temperature satisfying a threshold, or the like). To keep the valve 108 from watering, a bimetallic spring 1402 is heated by the sun to engage the notch in the rod 1106 (e.g., at a temperature threshold), thus preventing the float 110 from dropping, and keeping the valve 108 closed. To begin watering after the temperature falls (e.g., below a temperature threshold), the spring 1402 moves to disengage the notch, thus releasing the rod 1106 and float 110, and allowing the valve 108 to open. Although a bimetallic strip 1402 or spring 1402 is depicted, plastics and other materials that expand with heated can similarly be used to latch the valve 108 closed in high-temperature conditions. Also, although this latch 1402 is described to prevent watering in the heat of the day, if the valve 108 is used for other applications, any source or heat (or lack of heat) could be similarly used to prevent the valve from opening or trigger it to open. While a bimetallic strip 1402 may operate without electricity based on temperature, in other embodiments, a delay latch 1402 may be electrically powered (e.g., a solenoid, a switch, or the like) and may override or otherwise control a state of the valve 108 in response to a selected delay factor satisfying a threshold (e.g., a time of day satisfying a threshold, a temperature satisfying a threshold, a sensed moisture satisfying a threshold, a weather forecast satisfying a threshold, user input through a mobile application a mechanical button or switch or the like satisfying a threshold, or the like).

Although the delay latch 1402 is described above for irrigation, it may be similarly useful for industrial applications. In various scenarios where temperature is a factor for opening or closing a valve 108, the delay latch 1402 may hold the fluid flow on or off until a desired temperature is achieved, or the like.

FIGS. 16, 17, and 18A-D depict another embodiment of an apparatus 1600*a-g* for fluid flow control. As described above with reference to other embodiments, this design controls fluid flow based on the liquid level in a container 106, in a way such that the valve 108 opens at one liquid level and closes at a different (e.g., higher) liquid level. As described above, the liquid level in the container 106 may be affected by factors such as rainfall, evaporation, and soil moisture, and the valve 108 may control fluid flow from an inlet 104 to an outlet 114, for irrigation or other applications.

In this design, the valve 108 is controlled by a flap 1606 that pivots in the valve body 108, shown in the closed position with the flap down in FIGS. 18A and 18B, and in the open position with the flap up in FIGS. 18C and 18D. In this embodiment, the flap 1606 is magnetic, or includes magnets. The float 110 is coupled to a yoke that rotates a rotary magnet, to attract or repel the magnetic flap 1606. With the float 110 in the top position, as shown in FIG. 18A, the rotary magnet attracts the flap 1606 to hold the valve 108 closed. Additionally, backpressure from the inlet side of the valve 108 impinges on the flap 1606 to hold it closed. As the float 110 falls, as shown in FIG. 18B, the yoke continues to rotate the rotary magnet until it is a position to repel the magnetic flap 1606 within the valve assembly 108. However, the magnetic repelling force is not sufficient to overcome the backpressure from the inlet side, and the valve 108 remains closed. However, at the bottom of the stroke, as shown in FIG. 18C, the float 110 activates a momentary valve which temporarily diverts the liquid pressure from the inlet side, allowing the valve flap 1606 to open to turn the valve 108 on. As the container 106 refills and the float 110 moves upward (as seen in FIG. 18D), the yoke rotates the magnet into a position to pull the valve flap 1606 back down, closing the valve 108 again.

FIGS. 19A-D, 20A-E, 21A-B, 22A-B, 23, and 24 depict other embodiments of an apparatus 1900*a-n* for fluid flow control. As described above with reference to other embodiments, this design controls fluid flow based on the liquid level in a container 106, in a way such that the valve 108 opens at one liquid level and closes at a different (e.g., higher) liquid level. As described above, the liquid level in the container 106 may be affected by factors such as rainfall, evaporation, and/or soil moisture, and the valve may control fluid flow from an inlet 104 to an outlet 114, for irrigation or other applications.

Figure 21A:
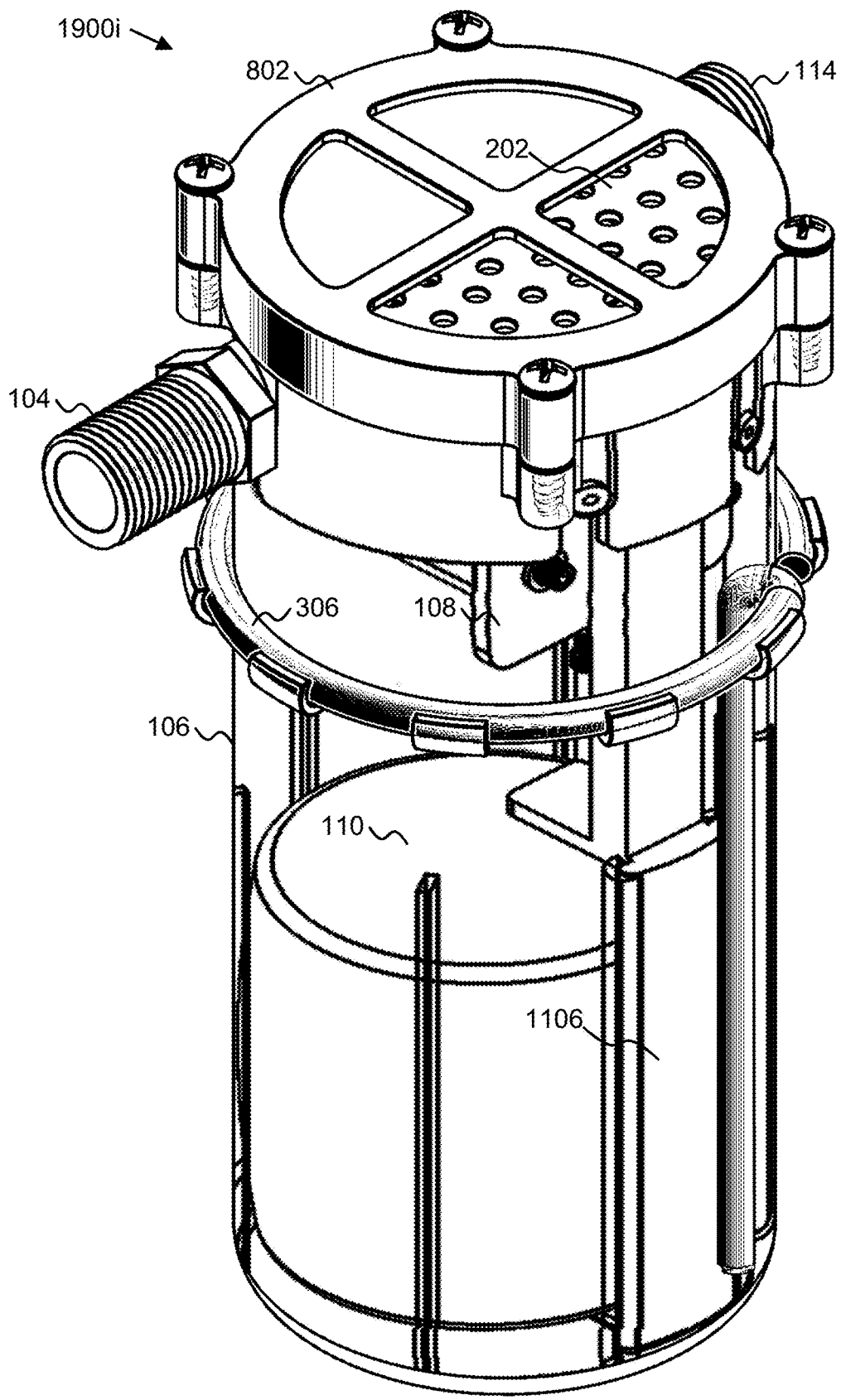
FIG. 21A is a perspective view illustrating another embodiment of an apparatus for fluid flow control.
Figure 21B:
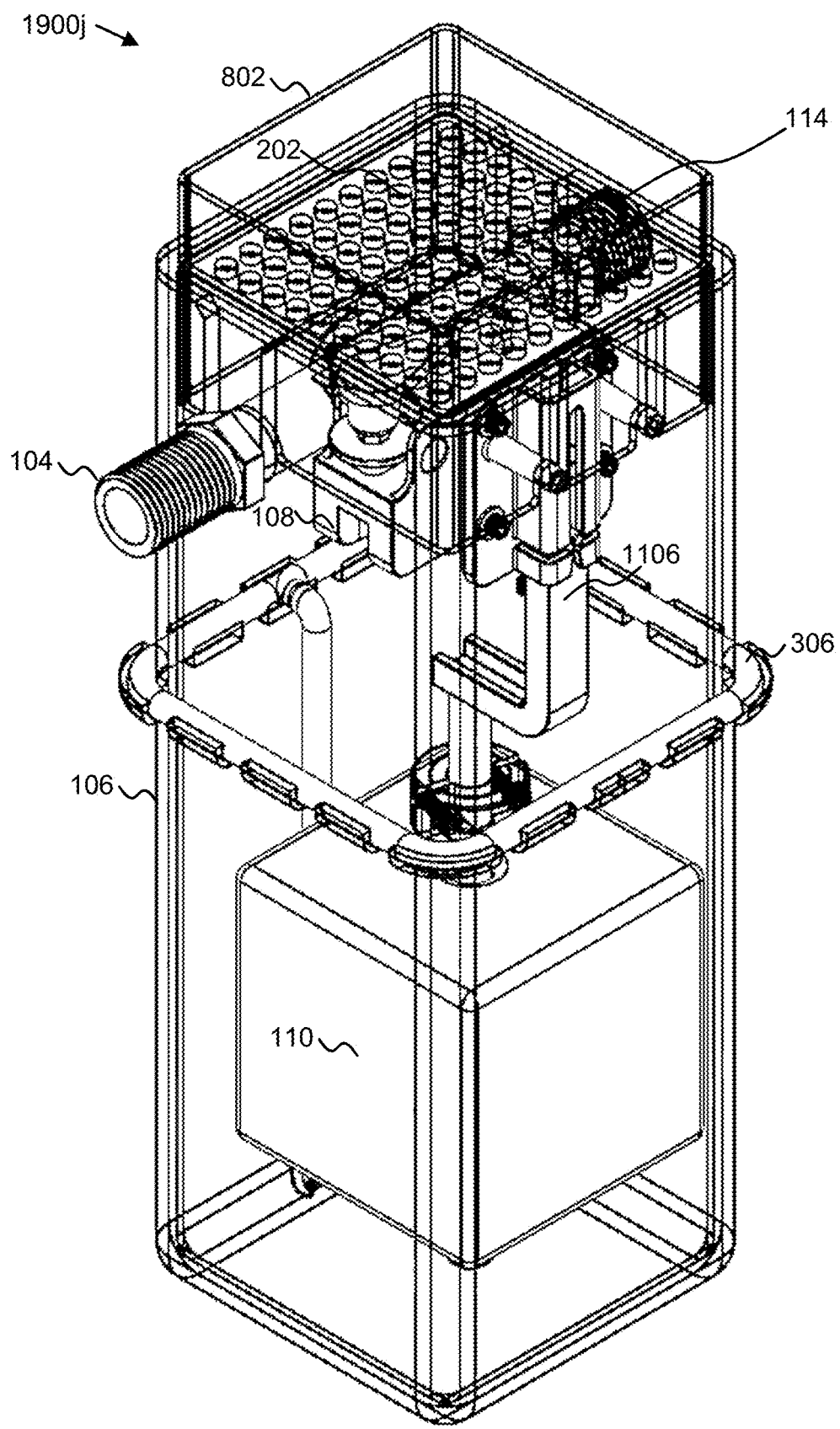
FIG. 21B is a perspective view illustrating another embodiment of an apparatus for fluid flow control.
Figure 22A:
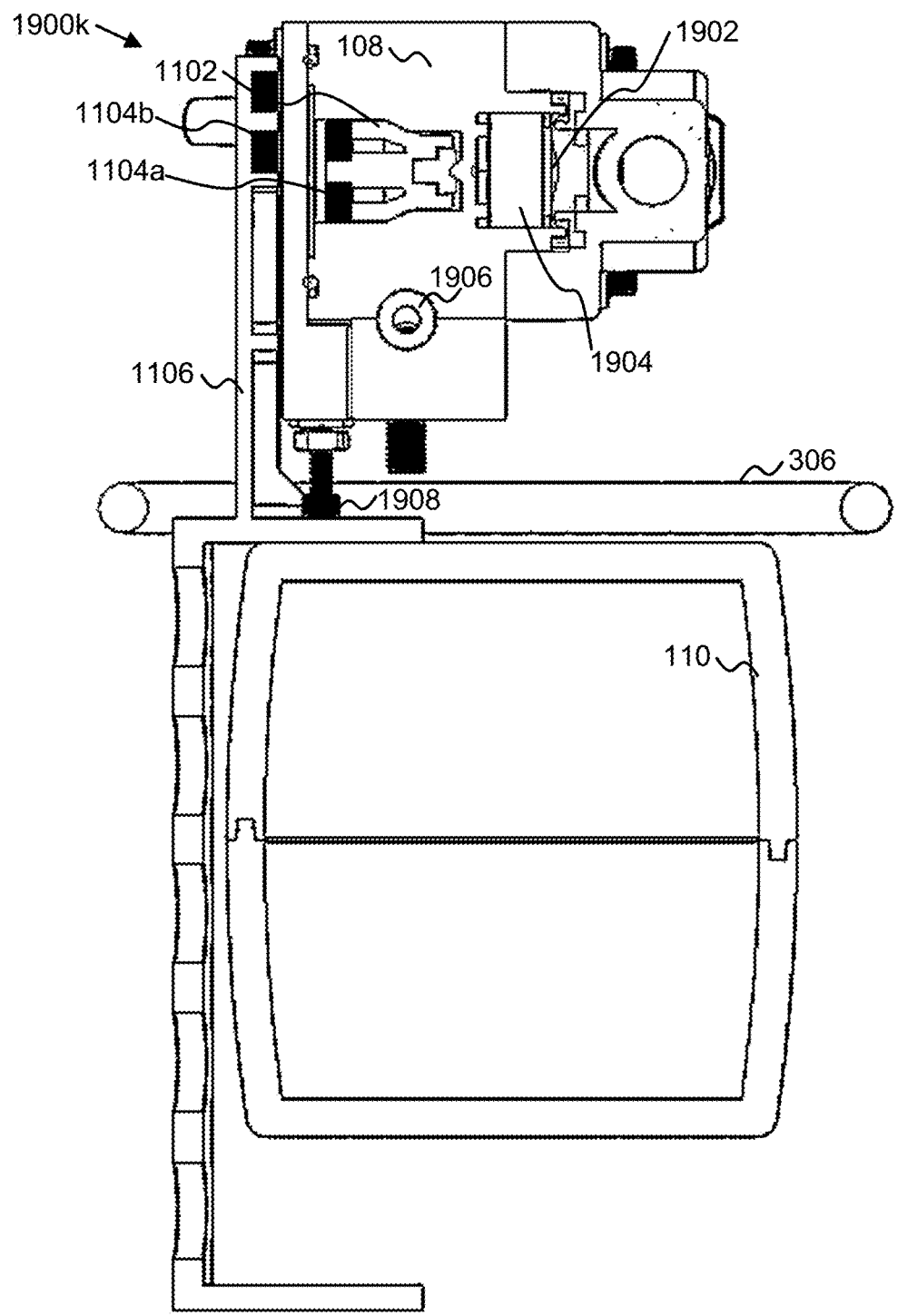
FIG. 22A is a side view illustrating another embodiment of an apparatus for fluid flow control.
Figure 22B:
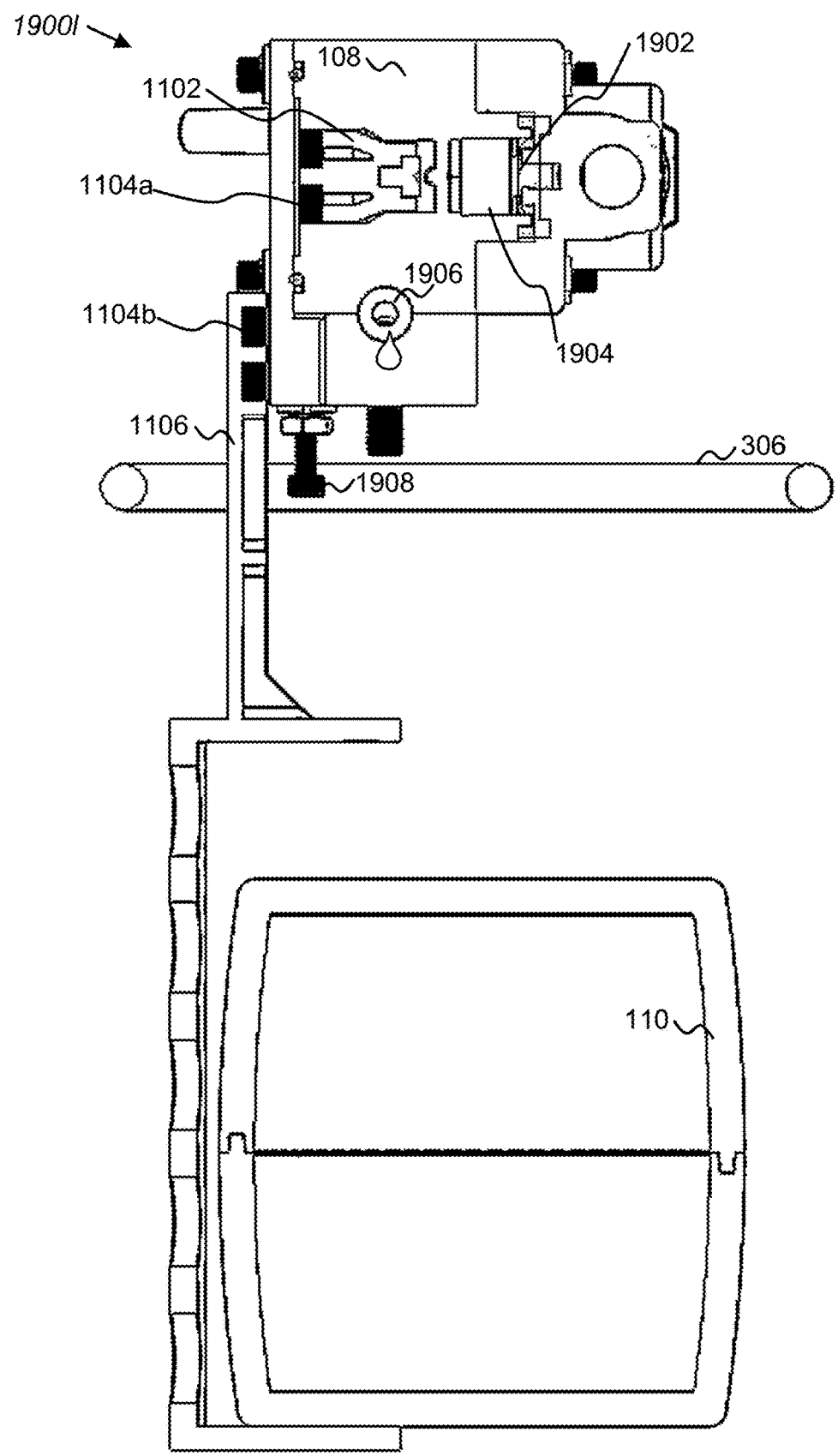
FIG. 22B is a side view illustrating another embodiment of an apparatus for fluid flow control.
Figure 23:
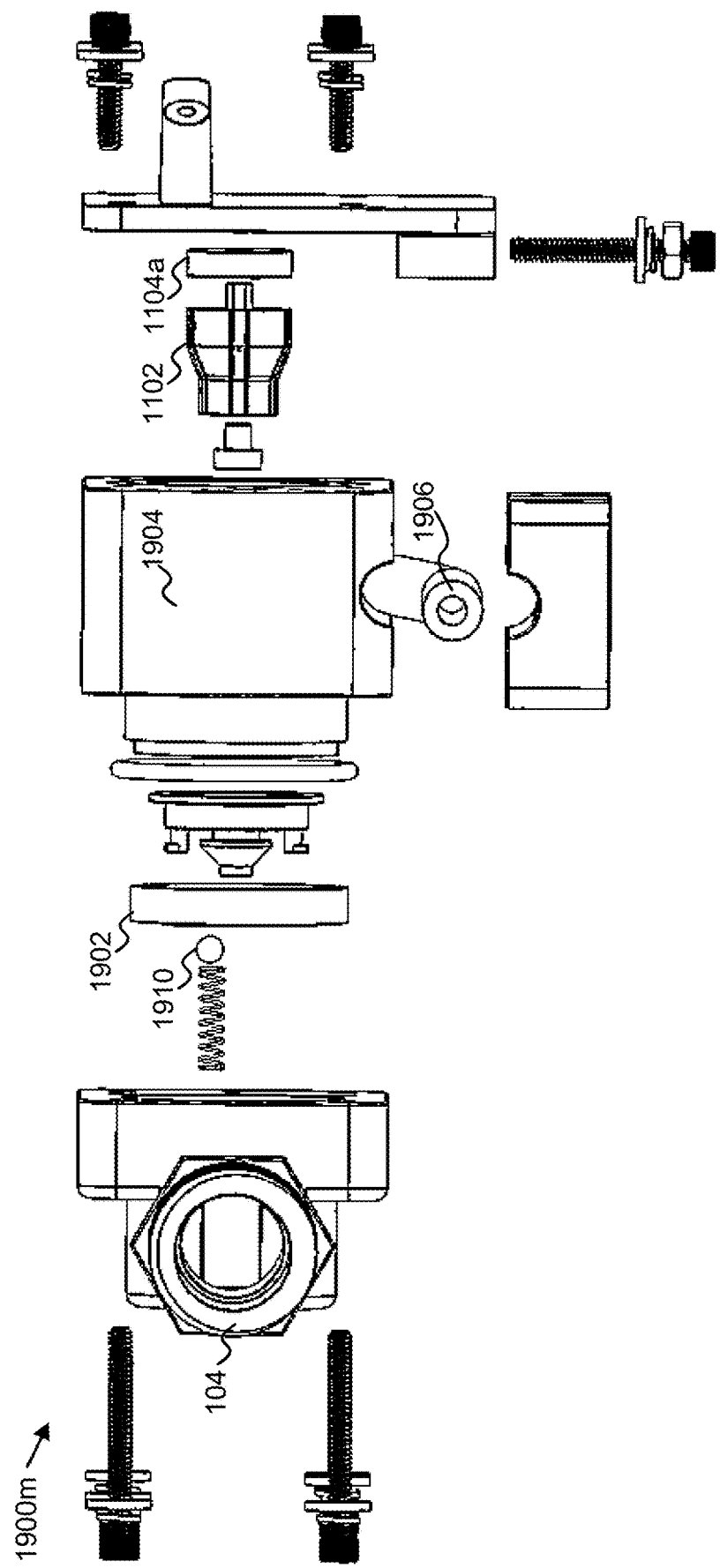
FIG. 23 is an exploded side view illustrating another embodiment of an apparatus for fluid flow control.
Figure 24:
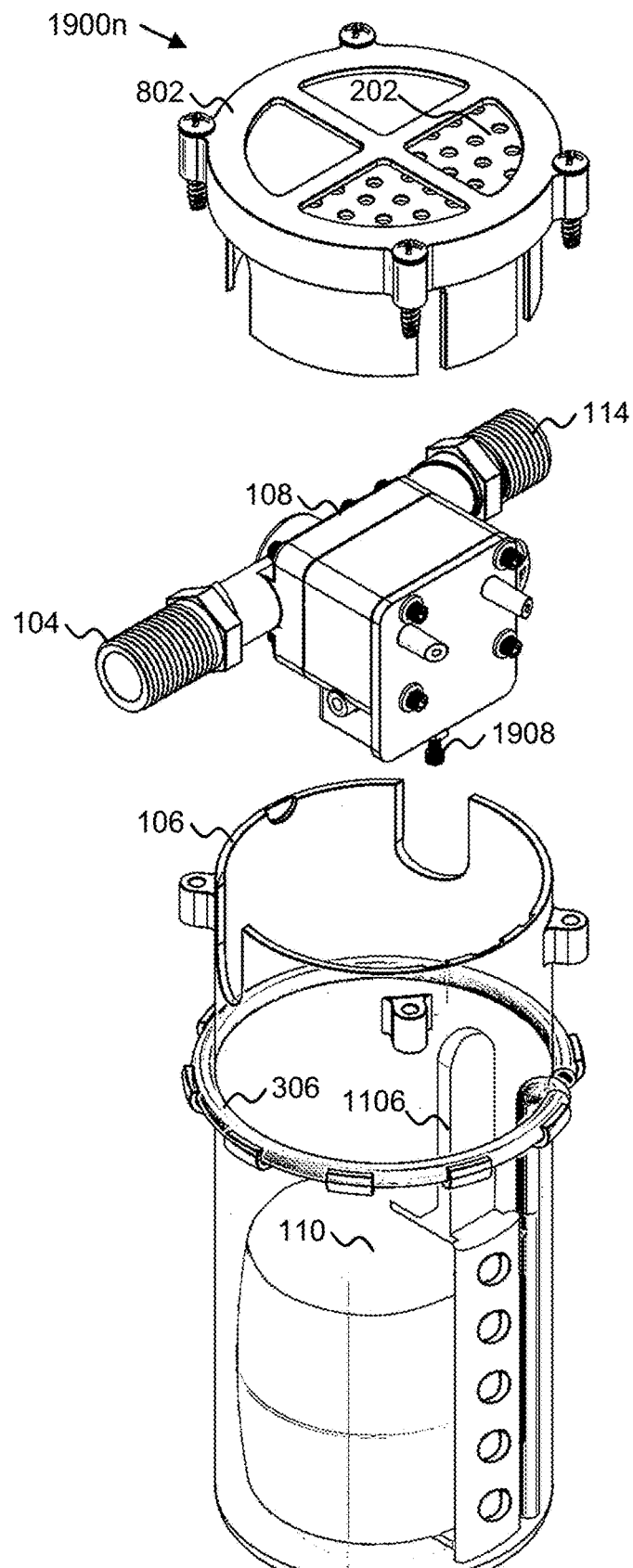
FIG. 24 is an exploded perspective view illustrating another embodiment of an apparatus for fluid flow control.

In this design, the valve 108 is enclosed within a valve unit 108, which may be sealed, substantially sealed, or the like. The valve unit 108 may be selectively installable within the container 106 and/or selectively removable from the container 106 (e.g., as a separate unit). For example, the valve unit 108 may be removed for winterization, maintenance, service, adjustment, replacement, and/or other purposes. In some of the depicted embodiments, the valve unit 108 may be removed separately from the float assembly 110, while the rod 1106 and float assembly 110 remain in the container 106 or the like (e.g., because the valve unit 108 and float assembly 110 only interact magnetically and are not otherwise physically or mechanically connected). In FIG. 21B, the valve 108 includes a guide shaped to receive the rod 1106 to direct a magnet 1104*b* coupled to the rod 1106 to and/or past a magnet 1104*a* coupled to the piston 1102, or the like as the float 110 rises and falls with the liquid level in the container 106, actuating the piston 1102 with a magnetic field of the magnet 1104*b* (e.g., repelling a magnet 1104*a* of the piston 1102) opening the valve 108 at a first liquid level and closing the valve 108 at a different liquid level.

In some embodiments, a rod 1106 (e.g., the depicted vertical rod 1106), with one or more magnets 1104*b* disposed therein, substantially as described above, may be external to the valve unit 110. The container 106 may comprise one or more guides (e.g., disposed on a sidewall of the container, or the like) configured to position the rod 1106 relative to the container 106 and/or the valve unit 108, to guide the rod 1106 as it rises and/or falls based on the liquid level in the container 106. The one or more guides may align the rod 1106 so that when the liquid level is high, the lower magnet 1104*b* in the rod 1106 repels a magnet 1104*a* in the piston 1102 to keep the valve 108 closed, the upper magnet 1104*b* in the rod 1106 is attracted to a magnet 1104*d* above the piston 1102, keeping the rod 1106 from falling, when the float 110 reaches the stop 1108 at the bottom of the rod 1106 its weight breaks this attraction causing the rod 1106 to fall so that the upper magnet 1104*b* in the rod 1106 attracts the magnet 1104*a* in the piston 1102, thus opening the valve 108 port to turn the valve 108 on, or the like, as described above. In other embodiments, the rod 1106 may comprise a single magnet 1104*b* which repels a single magnet 1104*a* coupled to the piston 1102, without any additional magnets 1104*c-d* to separately support the rod 1106 and/or float 110.

In certain embodiments, when the float 110 is in the upmost position, a magnet 1104*b* in the rod 1106 (e.g., an upper and/or top magnet 1104*b*, a single magnet 1104*b*, or the like) is not directly aligned with (e.g., is past and/or above) a magnet 1104*a* in the piston 1102. For example, when the magnet 1104*b* in the rod 1106 is past and/or above the magnet 1104*a* in the piston 1102, a repelling magnetic force between the magnet 1104*b* in the rod 1106 and the magnet 1104*a* in the piston 1102 may push the magnet 1104*b* upward and hold the piston 1102 and/or the valve 108 in a closed position 1102 (e.g., exerting enough force to hold the piston 1102 in the closed position) until the liquid level falls enough for the weight of the rod 1106 and/or the float 110 to overcome the magnetic force pulling the magnet 1104*b* in the rod 1106 below past the magnet 1104*a* of the piston 1102 to release the magnet 1104*a* in the piston 1102 from the repelling magnetic force and to open the piston 1102 and/or the valve 108.

In some of the depicted embodiments, the rod 1106 comprises upper and lower extensions extending from the rod 1106, with the float 110 movably coupled to and disposed between (e.g., capable of floating and/or otherwise moving) the upper and lower extensions (e.g., instead of or in addition to sliding along the rod 1106). A distance between the upper and lower extensions, in some embodiments, may at least partially define the liquid thresholds at which the valve 108 turns on or off, together with a fill rate for the container 106 affecting an amount of time that the valve 108 is on or off between cycles as the liquid level moves the float between the extensions, or the like.

The valve unit 108, in some embodiments, includes a set screw 1908, extending from the valve unit 108 toward an interface point of the rod 1106 (e.g., a surface, an extension, a wall, a bar, a ledge, or the like). The set screw 1908 may allow adjustment (e.g., fine tuning) of the valve unit 108 and/or the rod 1106, by defining a minimum distance between the valve unit 108 and the float 110 (e.g., the interface point of the rod 1106 coupled to the float 110), defining an upmost position for the rod 1106, or the like. In embodiments where the valve unit 108 is removable, a user may turn the set screw 1908 (e.g., tighten or loosen) while the valve unit 108 is removed from the container 106 (e.g., for ease of adjustment).

In one embodiment, the valve unit 108 includes a bleed-off outlet 1906 (e.g., a port, a cone, and/or another shaped outlet) configured to allow a liquid to enter the container 106 from the valve unit 108 at a predefined rate (e.g., to refill the container 106, to act as a timer for the valve unit 108, or the like). As described above, in certain embodiments, a flow rate for the bleed-off outlet 1906 (e.g., a fill rate for the container 106) may be user adjustable (e.g., using a knob, a clamp, a needle valve assembly, a pinch valve, interchangeable nozzles, and/or another mechanism that sets and/or alters a flow rate of a liquid). For example, the bleed-off outlet 1906 may comprise one of multiple interchangeable nozzles or other inserts, with different orifice sizes, selected to set and/or adjust a fill rate for the container 106 and/or a timing for the valve 108, which a user may selectively swap and/or replace to change the timing. In some embodiments, the different nozzles and/or other inserts may be color coded, indicating to a user by different colors an orifice size, a time period, or the like associated with the colored nozzle, or the like. In this manner, in certain embodiments, an interchangeable and/or otherwise adjustable bleed-off outlet 1906 may act as a quick-change access point for adjusting a fill rate of the container 106 and a corresponding timing for cycling of the valve 108. In other embodiments, a flow rate for the bleed-off outlet 1906 may be fixed and/or predefined (e.g., based on an aperture size of the bleed-off outlet 1906, using a clamp, using a needle valve assembly, using a pinch valve, or the like). In either embodiment, (e.g., either based on a user setting or as a fixed setting) the bleed-off outlet 1906 may comprise a soft tube or other soft channel pinched by a knob, clamp, and/or another pinching mechanism.

The valve unit 108, in some embodiments, may include a check valve 1910 (e.g., in the outlet line 114 or the like) to prevent pressure from coming back into the container 106 once the float 110 has reached a stop 1108 and a liquid is no longer entering the container 106. For example, in one embodiment, without a check valve 1910, a liquid from the outlet line 114 may overfill the container 106 until pressure in the outlet line 114 was relieved, instead of the container 106 operating with a predefined shutoff volume of liquid. In other embodiments, the container 106 and valve unit 108 may operate without a check valve 1910. The check valve 1910 depicted in FIG. 23, in one embodiment, is in communication with the piston compartment 1904 or other chamber 1904, to allow liquid to exit the chamber 1904 so that the chamber 1904 does not build up backpressure, causing the piston 1102 to cease functioning due to the restricted flow rate through the bleed-off outlet 1906. The check valve 1910, in some embodiments, may reduce and/or eliminate backpressure against the diaphragm 1902, clearing excess pressure to allow an open position of the diaphragm 1902 and the valve 108.

A lid 802 of the container 106, in some embodiments, may comprise one or more cutouts, ports, and/or other openings, which may be aligned with corresponding cutouts, ports, and/or other openings in the container 106, each sized to accept an inlet 104, an outlet 114, a hose, a tube, and/or another interface of the valve unit 108. The lid 802, in a further embodiment, may be rotatable when the valve unit 108 is removed from the container 106, to block and/or seal the one or more cutouts, ports, and/or other openings in the container 106 (e.g., to prevent unwanted liquid, debris, or the like from entering the container 106). In certain embodiments, the container 106 may comprise a catch area beneath the float assembly 110, allowing dirt, debris, insects, or the like to settle below the float 110, such that they do not impede movement of the float assembly 110.

Figure 25A:
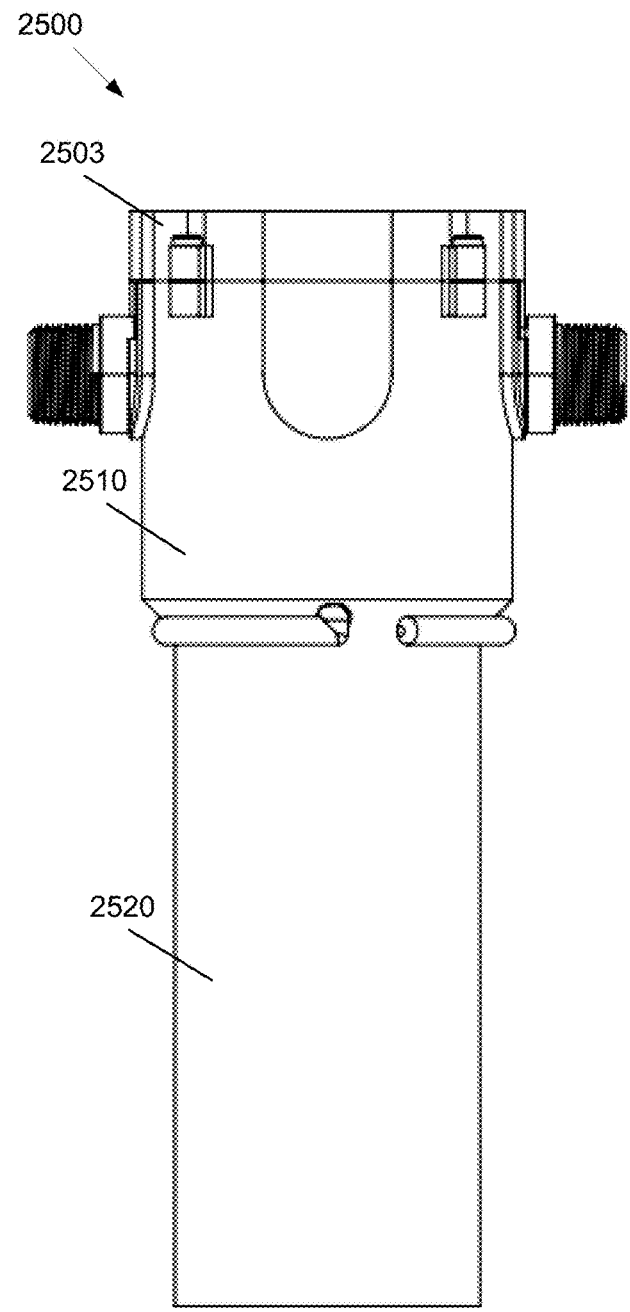
FIG. 25A depicts a side view illustrating another embodiment of an apparatus for fluid flow control.
Figure 25B:
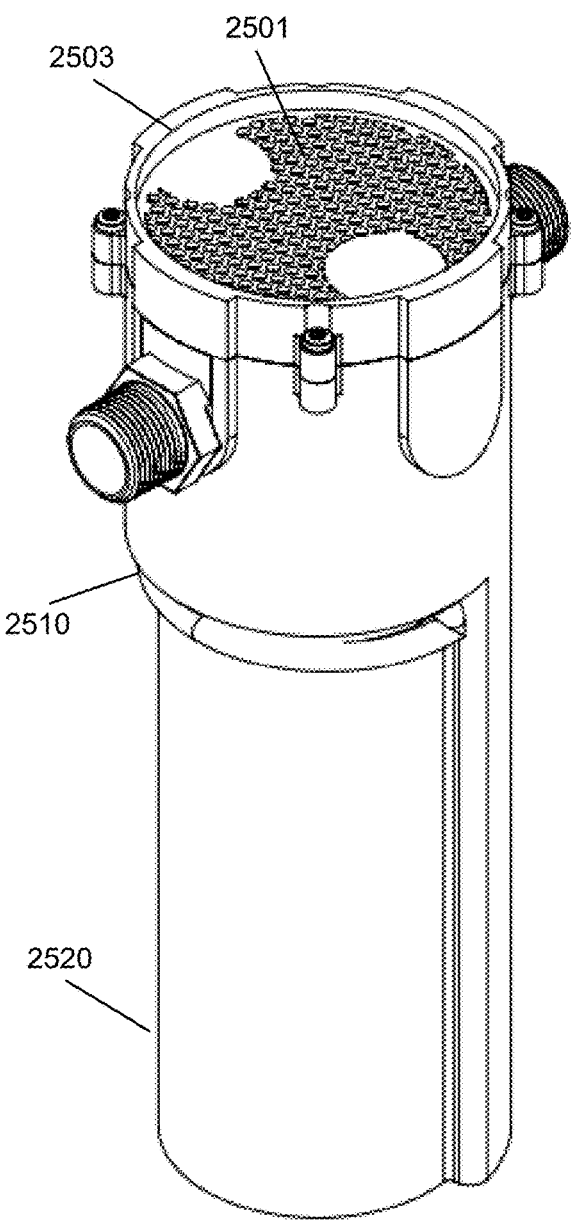
FIG. 25B depicts a perspective/isometric view illustrating another embodiment of an apparatus for fluid flow control.

FIGS. 25A-25F depict another embodiment of a valve device 2500 for fluid flow control. The valve device 2500 includes a valve assembly 2530 (within a housing 2510) and a tank or container 2520. FIG. 25A depicts a side view of the valve device 2500, and FIG. 25B depicts a perspective/isometric view of the valve device 2500. In one embodiment, the valve device 2500 depicted in FIGS. 25A-25F may be utilized in automatic watering systems (e.g., irrigation systems) and may prevent over-watering when using in conjunction with irrigation/sprinkler systems. Moreover, the valve device 2500 may provide leak prevention, described in more detail below.

Figure 25C:
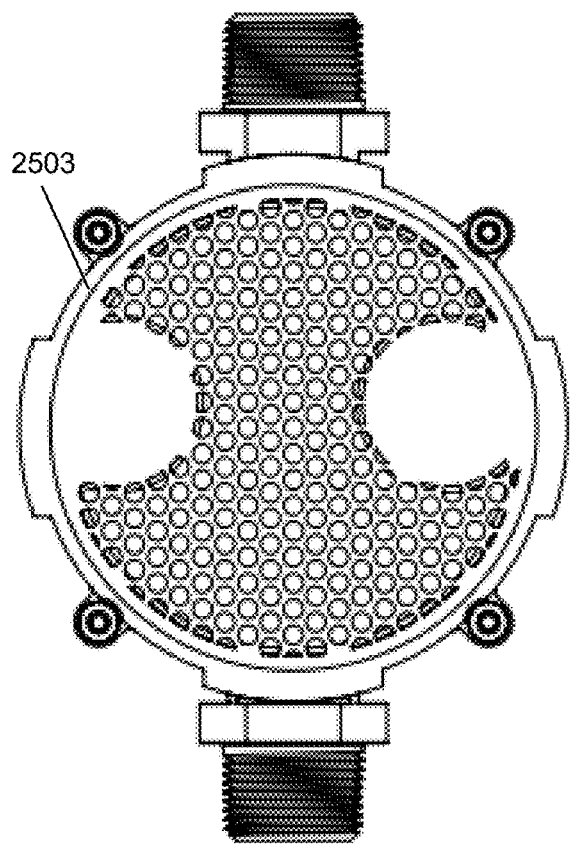
FIG. 25C depicts a top view illustrating another embodiment of an apparatus for fluid flow control.

In one embodiment, as shown in more detail in FIG. 25C, the valve device 2500 includes a lid 2503, cover, top, or the like, that is removable from the valve assembly housing 2510. For instance, the lid 2503 may be screwed on, snapped on, installed with a friction fit, and/or the like. In one embodiment, the lid 2503 includes one or more openings 2501, perforations, holes, or the like that correspond to one or more fill ports 2507 that allow fluid to enter and/or exit the valve device 2500, e.g., to enter the valve device 2500 to fill the container 2520. In one embodiment, the fill ports 2507 allow fluid to enter and not exit. In certain embodiments, the valve device 2500 includes a housing for a filter, e.g., a mesh filter, to keep dirt and other debris out of the tank/container 2520, which allows the tank/container 2520 to fill, e.g., during rainstorms, irrigation, or the like.

Figure 25D:
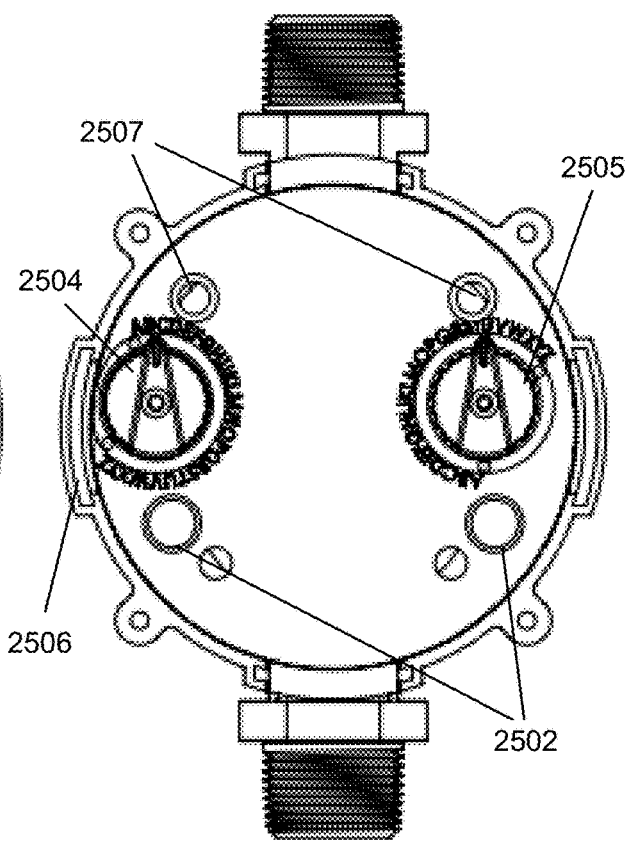
FIG. 25D depicts a top view illustrating another embodiment of an apparatus for fluid flow control.

FIG. 25D depicts one embodiment of the valve device 2500 with the lid 2503 removed. In one embodiment, under the lid 2503, the valve device 2500 includes one or more ports 2502 that lead to at least one chamber 2620 within the tank 2520, shown in FIGS. 26A-26B. In one embodiment, described in more detail below, the tank/container 2520 includes at least one chamber 2620 that contains air for adjusting the volume within the tank/container 2520, e.g., the volume of the at least one chamber 2620 can be adjusted, by removing or applying a plug 2622, e.g., a rubber plug, to one or more of the ports 2502, which may relieve pressure within the chambers to allow fluid into the chambers 2620. In one embodiment, this adjusts how much fluid needs to leave the tank/container 2520 before the float assembly 110 moves to the bottom of the tank/container 2520, allowing the valve assembly 2530 to open.

In one embodiment, the valve assembly 2530 includes a manual on/off control 2504 that can be turned or otherwise actuated to open or close the valve assembly 2530, e.g., to relieve pressure from under the diaphragm, regardless the position of the float assembly 110 in the tank/container 2520. In such an embodiment, in addition to opening and closing the valve assembly 2530, the manual on/off control 2504 may be actuated to a predetermined setting between open and close to set a flow rate of the fluid flow through the valve assembly 2530, e.g., to allow more or less fluid to flow through the valve assembly 2530. In one embodiment, the valve assembly 2530 includes an adjustable tank fill control 2505 for configuring, adjusting, setting, or otherwise controlling a fill rate of the tank/container 2520 by turning or otherwise actuating the adjustable tank fill control 2505. In one embodiment, the adjustable tank fill control 2505 can be actuated to allow full flow into the tank/container 2520, to shut off any flow into the container 2520, or to set the fill rate at one of a plurality of fill rate settings between open and closed.

Figure 25E:
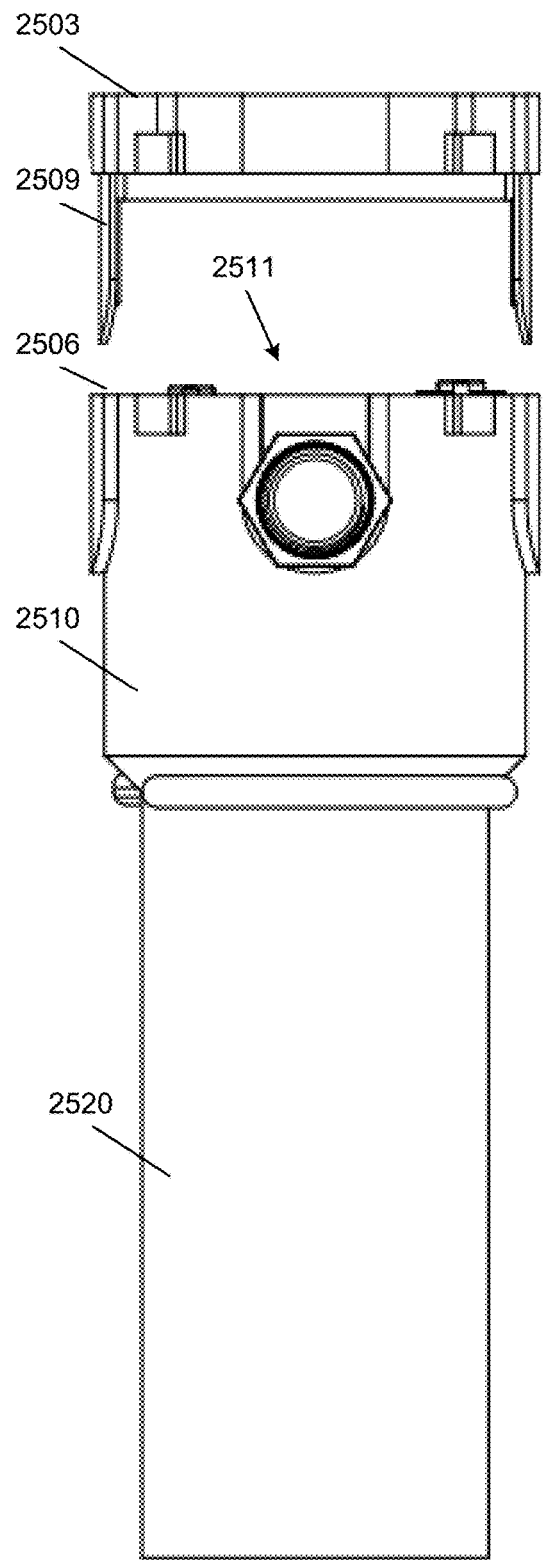
FIG. 25E depicts a side view illustrating another embodiment of an apparatus for fluid flow control.
Figure 25F:
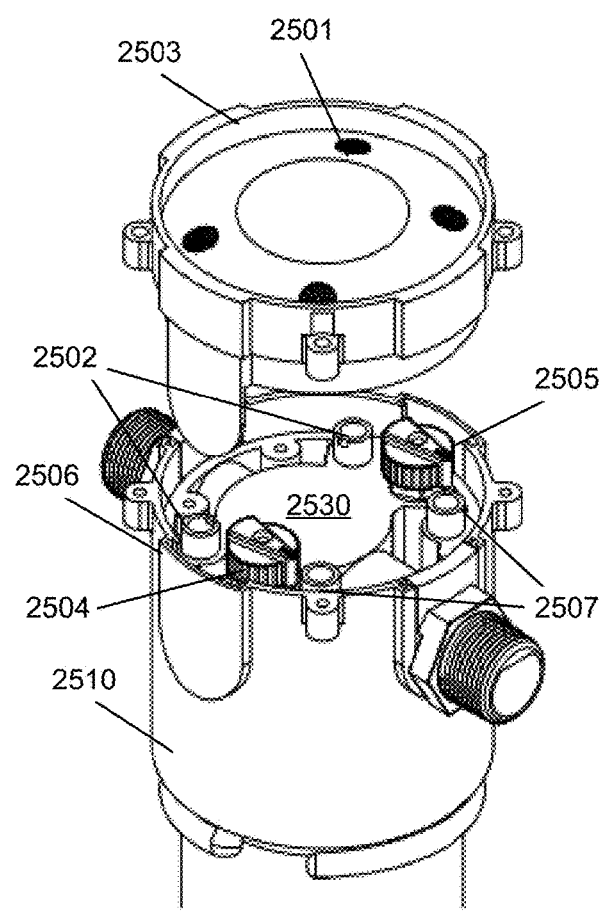
FIG. 25F depicts a perspective/isometric view illustrating another embodiment of an apparatus for fluid flow control.

FIG. 25E depicts a side view of the valve device 2500 with the lid 2503 removed and FIG. 25F depicts a perspective view of a valve device 2500 with the lid 2503 removed. FIG. 25F depicts another embodiment of the lid 2503 that includes less perforations or openings 2501 than the lid shown in previous figures. In such an embodiment, the openings 2501 align with the chamber ports 2502 and/or the fill ports 2507 through the valve assembly 2530. Further, FIG. 25F shows that the lid 2503 is removeable to provide access to the valve assembly 2530, which can be removed from the valve housing 2510, e.g., for seasonal storage or routine maintenance.

In one embodiment, the valve device 2500 includes pockets 2506, slots, slits, openings, or the like, on a plurality of sides of the tank 2520 that are configured to receive tabs 2509 or other protrusions on the lid 2503, for securing and selectively removing the lid 2503 to/from the valve device 2500. In one embodiment, the lid 2503 can be rotated 90 degrees when the valve assembly 2530 is removed to block the inlet and outlet tank cuts 2511 using the tabs 2509 on the lid 2503. During winter, for example, the user may remove the lid 2503, pull the valve assembly 2530 out, and return the lid 2503 rotated 90 degrees to block the open ports 2501 where the inlet and outlet of the valve assembly 2530 would otherwise be located.

Figure 26A:
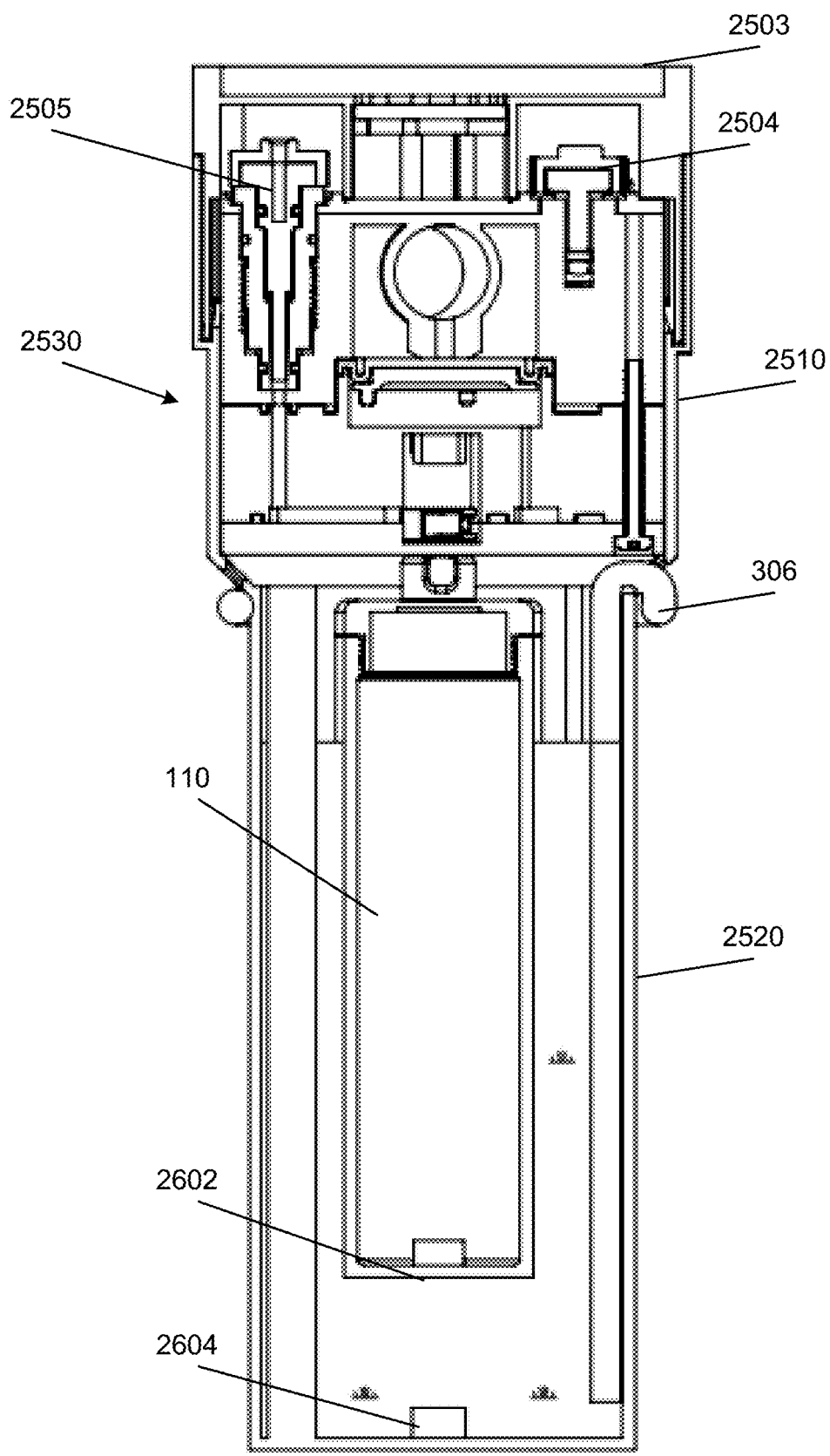
FIG. 26A depicts a sectional view illustrating another embodiment of an apparatus for fluid flow control.

FIG. 26A depicts a sectional view of one embodiment of a valve device 2500. In one embodiment, the valve device 2500 shown in FIG. 26A includes a lid 2503, a valve assembly 2530 within the valve housing 2510 that includes a manual of/off control 2504 and an adjustable tank fill control 2505, and a tank/container 2520 that includes a float assembly 110 and a wicking material 306. The float assembly 110 may include magnetic material 2602, such as a magnet or a magnetic object, near or on the bottom of the float assembly 110 that magnetically interacts, e.g., attracts or retracts, with magnetic material 2604 on the bottom of the tank/container 110, e.g., a magnet or a magnetic object.

As described above, the float assembly 110 is configured to move within the tank/container 2520, e.g., up and down in a vertical direction, based on a fluid level within the tank/container 2520, e.g., from a bleed-off outlet or valve 1906 described above to control opening and closing of the valve assembly 2530 (to allow or prevent a fluid flow through the valve assembly 2530). In one embodiment, the magnetic material 2602 near the bottom of the float assembly 2602 may be configured to interact with the magnetic material 2604 at the bottom of the tank/container 2520 such that the float assembly 110 is held in place until the fluid level in the tank/container 2520 reaches a threshold level, e.g., a level that breaks the magnetic force or attraction between the magnetic material 2602 near the bottom of the float assembly 2602 and the magnetic material 2604 at the bottom of the tank/container 2520.

In one embodiment, the float assembly 110 may include a plurality of magnets/magnetic material along its length, around a bottom of the float assembly 110, and/or the like, that are configured to interact with corresponding magnets/magnetic material along the inside of the tank/container 2520. In one embodiment, the magnets/magnetic material may be arranged in a spiral configuration along at least a portion of the length of the float assembly 110, along an inner surface of the tank/container 2520, or a combination thereof, to cause the float assembly 110 to move up and down within the tank/container 2520 in a rotating, stepwise manner. Further, as described above, the wicking material 306 may be used as an outlet for fluid to enter and/or exit the container tank/container 2520.

Figure 26B:
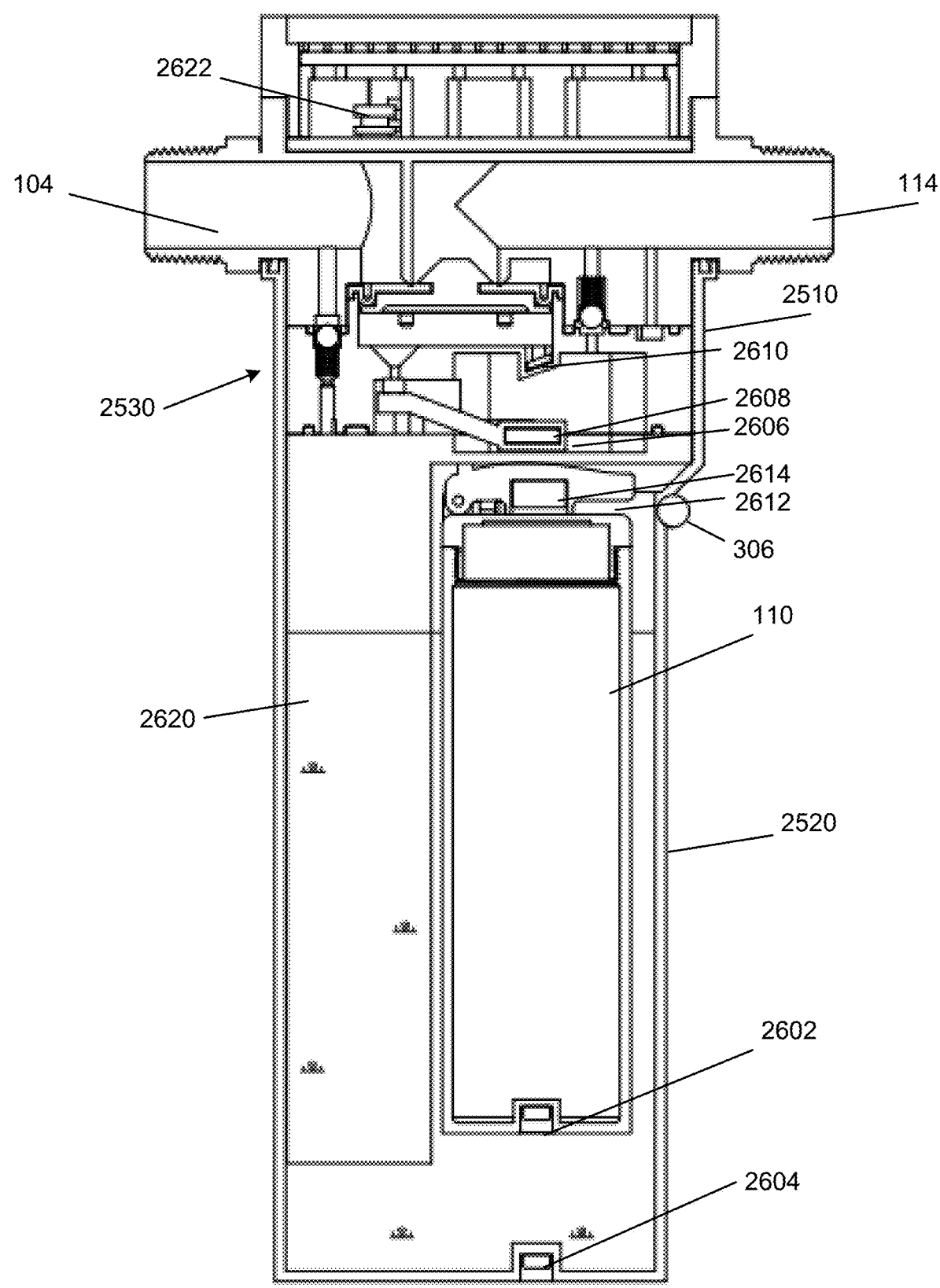
FIG. 26B depicts a sectional view illustrating another embodiment of an apparatus for fluid flow control.

FIG. 26B depicts another sectional view of one embodiment of a valve device 2500. In one embodiment, the valve device 2500 shown in FIG. 26B is a sectional view of the valve device 2500 shown in FIG. 26A rotated 90 degrees. In one embodiment, the valve assembly 2530 includes an actuator 2606, here a lever assembly, that includes a magnetic material 2608. The actuator 2606, in one embodiment, controls the flow of fluid through the valve assembly 2530, e.g., from the inlet 104 to the outlet 114 when in a first position, e.g., when the portion of the actuator comprising the magnetic material 2608 is in a up position. In such an embodiment, the magnetic material 2608 in the actuator 2606 may magnetically interact with a second magnetic material 2610 in the valve assembly 2530 and/or a magnetic material 2614 in the float assembly 110 to open and close the valve assembly 2530, as shown in more detail in FIGS. 27A-B.

Figure 27A:
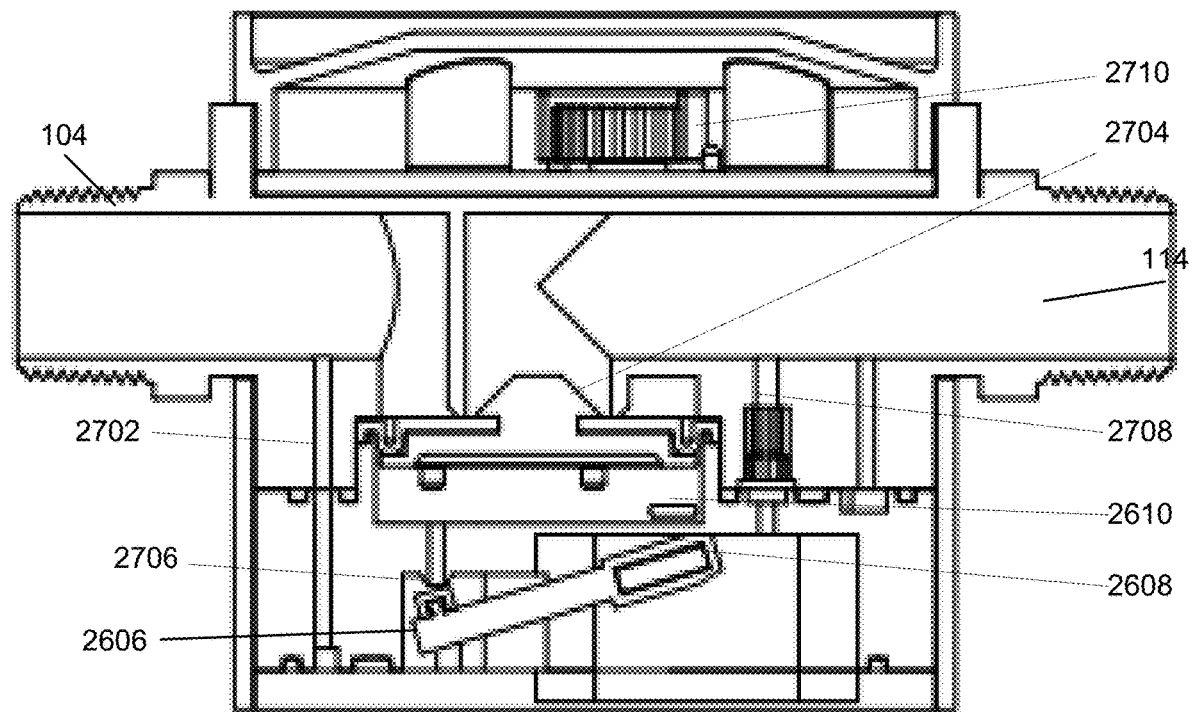
FIG. 27A depicts a sectional view illustrating another embodiment of an apparatus for fluid flow control.

FIG. 27A depicts one embodiment of a valve assembly 2530. In one embodiment, the valve assembly 2530 includes an inlet port 2702, which may route a fluid under a diaphragm 2704. An exit port 2706, in certain embodiments, releases pressure under the diaphragm 2704 thereby opening the valve assembly 2530.

A valve assembly 2530, in the depicted embodiment, includes a magnetic material 2608 within an actuator 2606, here a lever assembly, and a corresponding magnetic material 2610 positioned in the valve assembly 2530 relative to the magnetic material 2608 within the lever assembly (e.g., to bias and/or hold the lever assembly in a predetermined position, such as a closed position or an open position, until a larger magnet (e.g., disposed in and/or coupled to a float, a slider, or the like) biases the magnetic material 2608 within the lever assembly to a different (e.g., opposite) predefined position.

While the lever assembly, in the depicted embodiment, is biased in an open (e.g., on) position, in other embodiments, the lever assembly may be biased in an closed (e.g., off) position, with the magnetic material 2610 mounted below the lever assembly, or the like. While the magnetic materials 2608, 2610 are described with regard to the depicted embodiment, in other embodiments, a spring, a rubber and/or silicone band, or the like may bias a lever assembly in a predefined position.

In some embodiments, a port 2708 may allow a fluid flow from the diaphragm release/exit port 2706 to exit the valve assembly 2530 from an outflow outlet, or the like. Since the lever assembly, in certain embodiments, may be fully sealed, the port 2708 may give the fluid a path out of the valve assembly 2530 or the diaphragm 2704. The port 2708, in one embodiment, may provide a variable flow (e.g., flow rates between on and off, or the like), which may be user adjustable with a knob 2710, or the like. A variable flow may allow a user to control how open or how closed the diaphragm 2704 may become (e.g., to control a flow rate for a water hose valve, or the like).

Figure 27B:
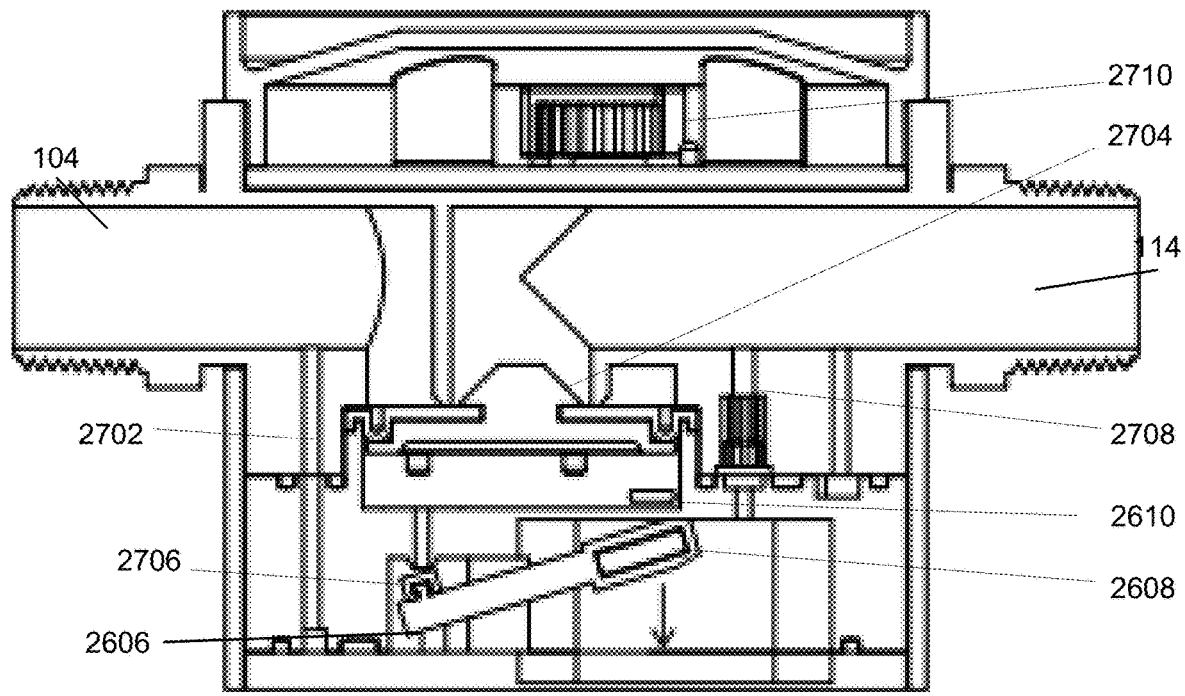
FIG. 27B depicts a sectional view illustrating another embodiment of an apparatus for fluid flow control.

In the embodiment depicted in FIG. 27B, the valve assembly 2530 is open when the lever mechanism is not activated. For example, when a magnet is introduced under the magnetic material 2608 in the lever assembly (e.g., via a magnetic material 2614 on the float assembly 110), the lever assembly may be biased downward, allowing an opposite end of the lever assembly to block the exit port 2706 under the diaphragm 2704, which may build pressure under the diaphragm 2704 closing the valve assembly 2530. In certain embodiments, the valve assembly 2530 may be open if no magnetic force is present under the magnetic material 2608 in the lever assembly. In some embodiments, the opposite magnetic material presented under the magnetic material 2608 in the lever assembly may be disposed outside of the lever chamber so that the lever chamber may be fully sealed, or the like.

In other embodiments, the valve assembly 2530 may be constructed in reverse of the depicted valve assembly 2530, where the valve assembly 2530 is closed if no magnetic force is present. In one embodiment, the lever assembly is attracted to the magnetic material 2610 above until a larger force is introduced on the outside of the chamber below the magnetic material 2608 in the lever assembly. The lever assembly, in other embodiments, may be forced upward into an open position with the use of a spring until a magnet is introduced below to compress the spring and close the exit port 2706 under the diaphragm 2704.

Figure 27C:
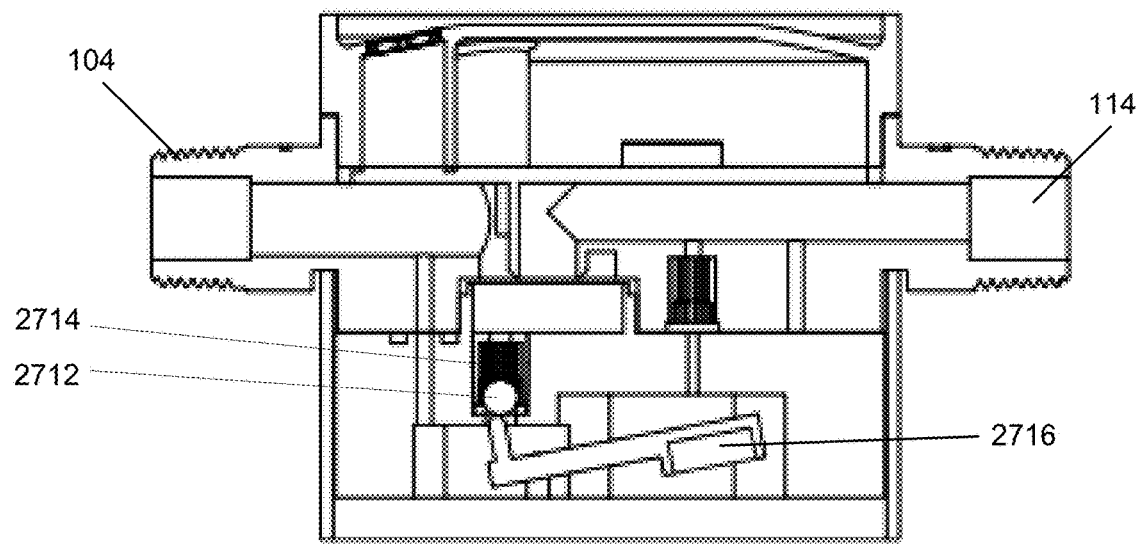
FIG. 27C depicts a sectional view illustrating another embodiment of an apparatus for fluid flow control.

In the embodiment depicted in FIG. 27C, the valve assembly 2530 is closed when the lever mechanism is not activated (e.g., in reverse with an alternative sealing method for the diaphragm, or the like). In this configuration, an end 2712 of the lever mechanism may be forced downward by a spring 2714, which closes a port to a bottom of the diaphragm housing. In response to a first end 2712 of the lever mechanism being magnetically forced downward, an opposite end 2716 of the lever mechanism applies pressure upward on the diaphragm port, thereby opening the port and relieving pressure under the diaphragm opening the valve assembly 2530.

Figure 28:
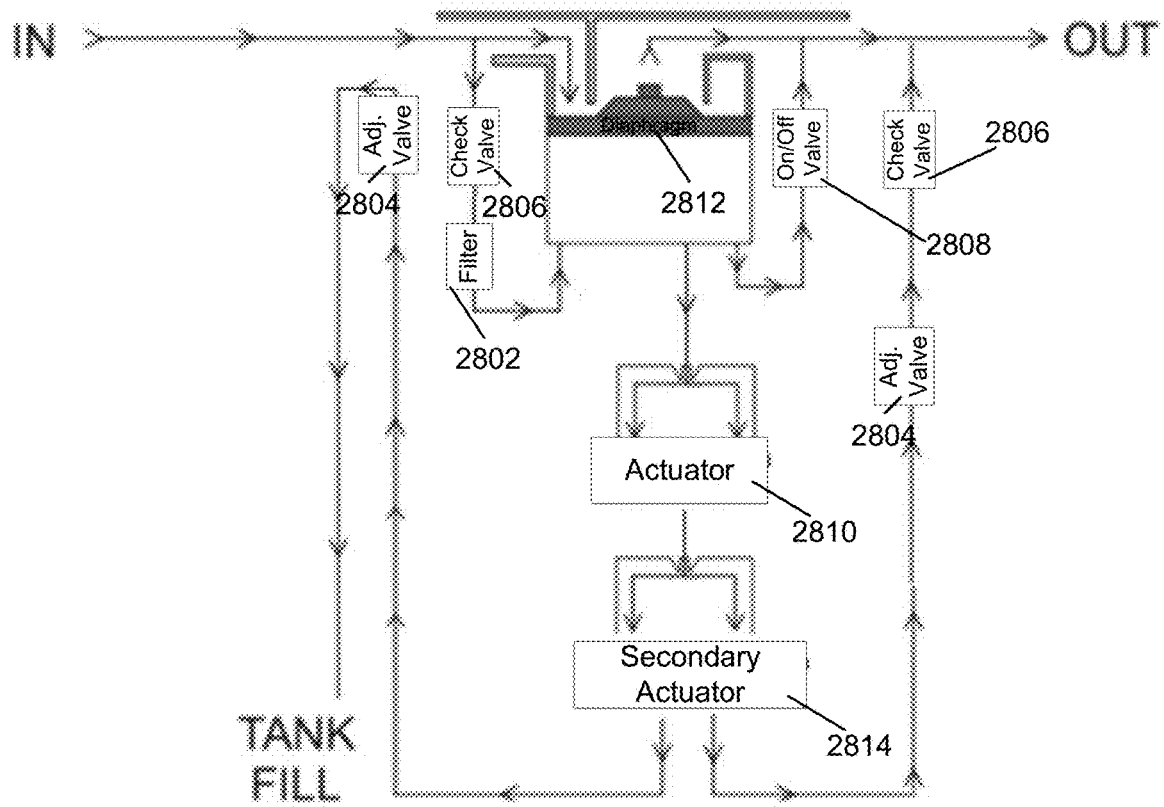
FIG. 28 depicts a schematic diagram of fluid flow through an apparatus for fluid flow control.

In the diagram depicted in FIG. 28, a method of opening and closing a diaphragm port 2812 may utilize an actuator 2810 that moves up and down to open and close the valve assembly. A secondary actuator may 2814 be used in conjunction with the actuator 2810. Magnets, in certain embodiments, may be disposed inside the actuator, which may be housed in a closed chamber and may be in communication with external magnets or metallic objects to actuate the actuator. The diagram depicts an inlet filter 2802 and a flow control mechanism 2804. The flow control mechanism 2804 (the adjustment valve) may be used to regulate the rate at which the tank fills and another one may be used to regulate the flow rate out of the valve. In other embodiments, the valve assembly may function without an inlet filter 2802 and/or a flow control mechanism 2804 and is not limited to designs with filters 2802 and/or flow controls 2804. The depicted valve assembly may function with many different types of pistons, actuators, or alternative designs, to apply pressure to the diaphragm port. In one embodiment, the diagram includes an on/off control 2808 that is used to manually turn the valve on and off. Also, check valves 2806 may be used to prevent backflow.

Figure 29:
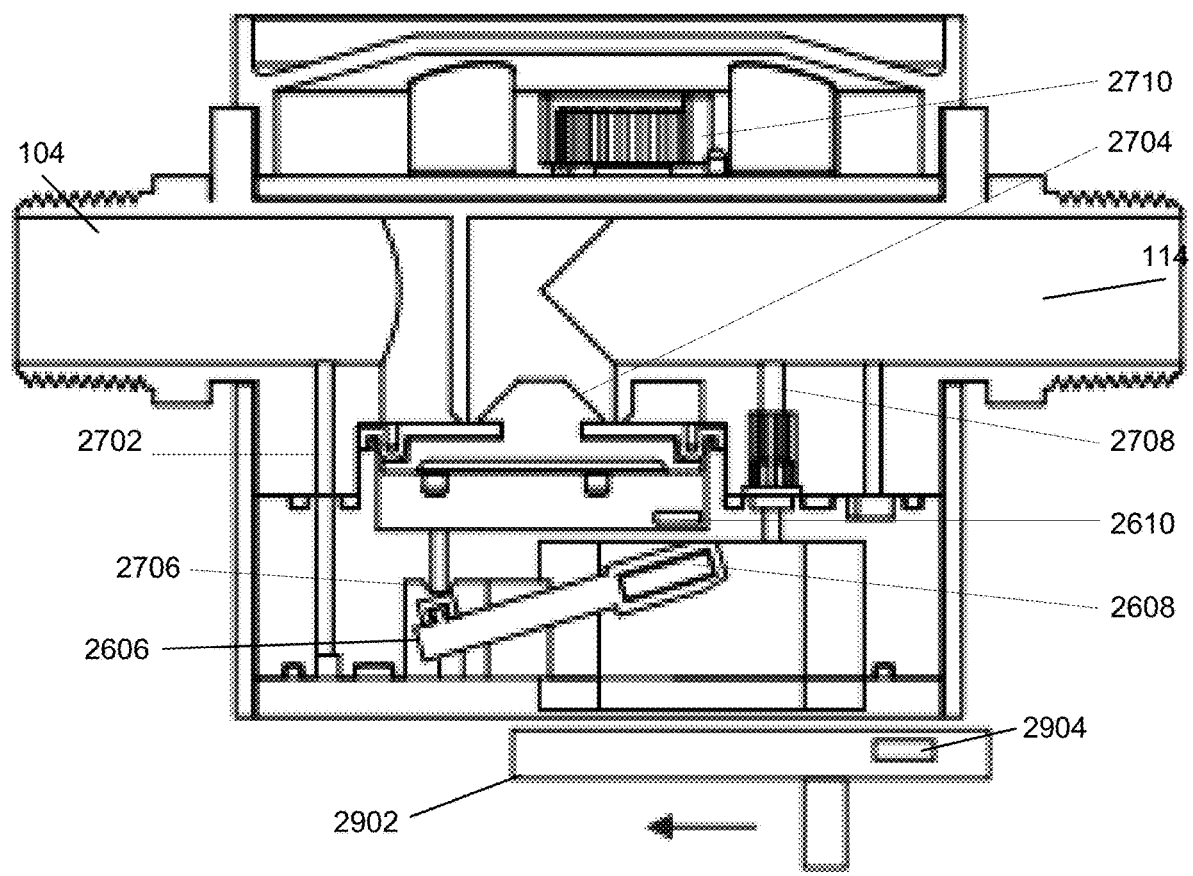
FIG. 29 depicts a sectional view illustrating another embodiment of an apparatus for fluid flow control.

In the embodiment depicted in FIG. 29, an external magnet 2904 is housed in a slider 2902, allowing a user to manually slide the magnet 2904 into and out of position. When in position under the magnet 2608 in the lever mechanism, in some embodiments, the lever mechanism is biased downward applying pressure against the orifice closing the diaphragm port. When the magnet 2904 and 2902 slider is slid out of position, in some embodiments, the lever mechanism is biased against the top magnet 2610, thereby opening the diaphragm port allowing the valve assembly 2530 to open and a fluid to flow.

In this embodiment, the external slider 2902 has a magnet 2904 disposed within it, but in other embodiments, the slider 2902 may comprise a metallic material to which the magnet 2608 in the lever mechanism is attracted. In other embodiments, a magnet, a metallic material, or the like may be disposed above the magnet 2608 of the lever mechanism instead of or in addition to in a slider 2902. The valve design is not limited to working only with an on/off slider 2902 and may be configured with many different types of activation configurations. One such configuration may include a knob where a magnet or metal piece is rotated in and out of position under the actuation magnet 2608 in the lever mechanism. In the depicted embodiment, a lever is used to close the port, but in other embodiments, a piston or other configuration may be used to open and/or close the port.

In a further embodiment, an electromagnet may selectively bias a magnet 2608 in the lever mechanism in and out of position based on an electrical charge. Control of an electromagnet may be directly wired, remotely activated, activated by solar power, or the like. In another embodiment, a valve assembly 2530 may turn off after a preset amount of a fluid has passed through the valve assembly 2530. For example, an impeller system may be attached to the inflow and/or outflow side of the valve assembly 2530, and the outflowing fluid may move a magnet into place after a preset amount of fluid has passed across the impeller, or the like. In an alternate embodiment, an impeller may send a signal to an electromagnet once a preset amount of fluid has crossed the impeller, or the like.

In another embodiment, the valve assembly 2530 may be configured to be utilized in response to a key being inserted into the device 2500. For example, a key may be used in commercial buildings where water access needs to be limited to authorized personnel such as a maintenance technician, or the like. In this example, if the key is not present, an unauthorized user may not turn the water on. In other embodiments, a key may be used for indoor plumbing to lock water or other liquid dispensing devices. A key, in other embodiments, may be used to restrict other types of fluids, including gases.

In further embodiments, a valve assembly 2530 may have a magnet that is rotated in and out of position with a key. In such an embodiment, the key may be magnetic or may be comprised of magnetic material, e.g., metal. If a magnet in the valve is rotated to a position to close the diaphragm port responsive to turning the key, it may render the valve assembly 2530 shut no matter what position the flow control knob is in. In response to rotating the magnet into an open position, the valve assembly 2530 may become active, and a flow control knob may be usable to dispense a fluid. In a further embodiment, a bucket or other container with one or more embedded magnets may activate a valve assembly 2530 in response to the bucket or other container being placed at a predefined location and/or position relative to the valve assembly 2530 (e.g., to open the valve assembly 2530 to fill the bucket or other container, or the like).

Figure 30A:
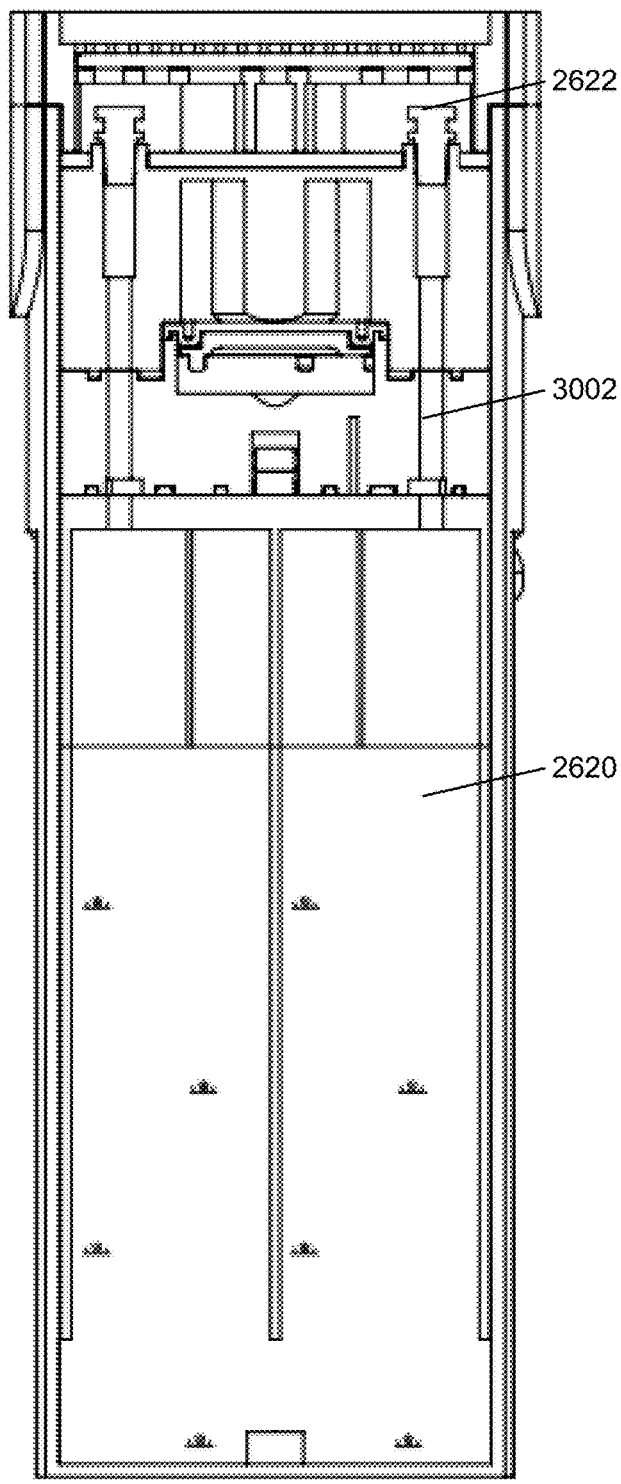
FIG. 30A depicts a sectional view illustrating another embodiment of an apparatus for fluid flow control.

FIG. 30A depicts a sectional view of one embodiment of a valve device 2500 that includes chambers 2620, here two chambers 2620, that are configurable or adjustable to set a volume of the tank/container 2520, e.g. to configure how much fluid the tank/container 2520 can hold. In one embodiment, the volume is configurable by removing or installing a plug 2622. For example, when the plug 2622 is removed, air within the chambers 2620 leaves the chamber 2620 out the top of the valve device 2500 through a port 3002. In one embodiment, by placing an obstruction such as a rubber plug 2622 in the way of the air path, closing off the path of the air trapped in the chambers 2622, water is prevented from entering the chamber cavity, which reduces the overall tank volume.

Figure 30B:
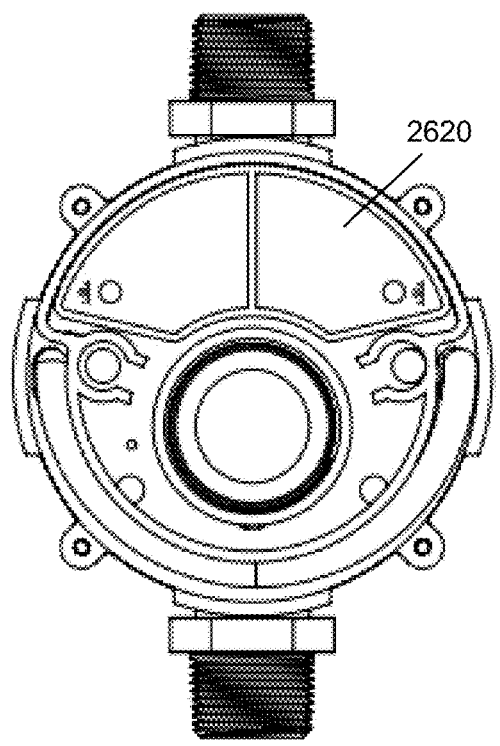
FIG. 30B depicts a top sectional view illustrating another embodiment of an apparatus for fluid flow control.

FIG. 30B depicts a top sectional view of one embodiment of a valve device 2500 that includes chambers 2620 for adjusting the volume of the tank/container 2520.

Figure 31:
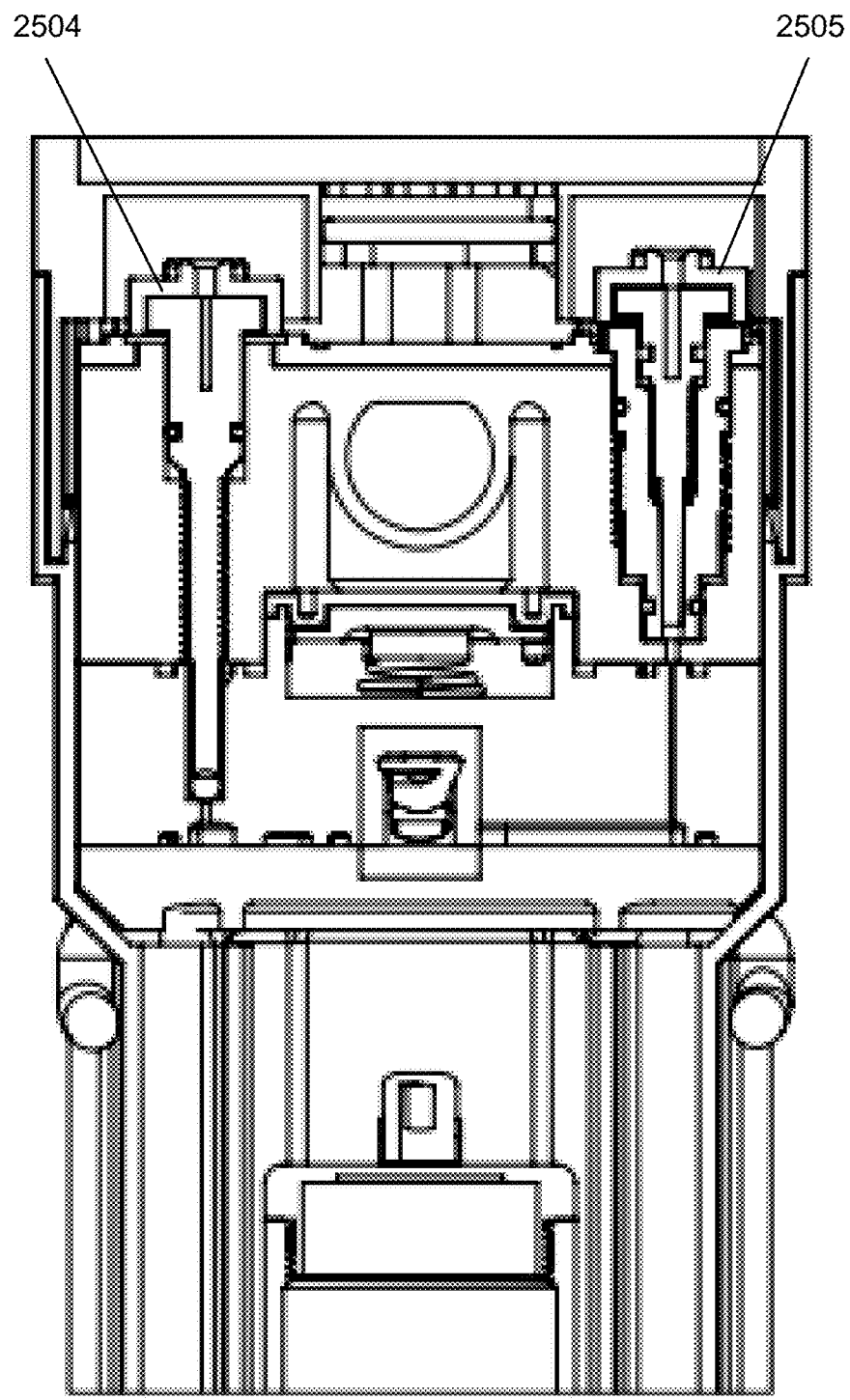
FIG. 31 depicts a sectional view illustrating another embodiment of an apparatus for fluid flow control.

FIG. 31 shows a sectional view of the valve assembly 2530 including the manual on/off valve 2504 and the adjustable tank fill control 2505. In one embodiment, the manual on/off valve 2504 is configured to manually turn on and off the valve. When actuated (e.g., rotated), the manual on/off valve 2504 relieves pressure on a diaphragm, rubber ball, or other object, which opens a passage allowing pressure under the diaphragm to escape. The release of the pressure, in one embodiment, opens the main valve regardless of the float position.

In one embodiment, the adjustable tank fill control 2505 sets the flow rate for the tank/container 2520 when the valve is actuated, engaged, running, open, or the like. In one embodiment, the adjustable tank fill control assembly is removable for cleaning calcium or other mineral buildups. In one embodiment, when the manual on/off control 2504 is activated, water does not pass through the adjustable tank fill control 2505 and the tank/container 2520 does not capture, store, receive, or the like any fluid during manual operations. In one embodiment, when the float is in the down position, the adjustable tank control 2505 receives water and in turn, fills the tank/container 2520.

In one embodiment, because water may be metered down slowly, it requires a very small port. Small ports, however, are susceptible to blockages such as calcium buildup. In the event of a failure due to a blockage, the adjustable tank fill control 2505 can be removed and cleaned, such as being soaked in a solution to break down the calcium buildup. In certain embodiments, the valve assembly 2530 can be removed from the valve assembly housing 2510 when not in use, e.g., for maintenance or to prevent damage due to freezing temperatures, and reinstalled in the valve assembly housing 2510, as needed.

Figure 32:
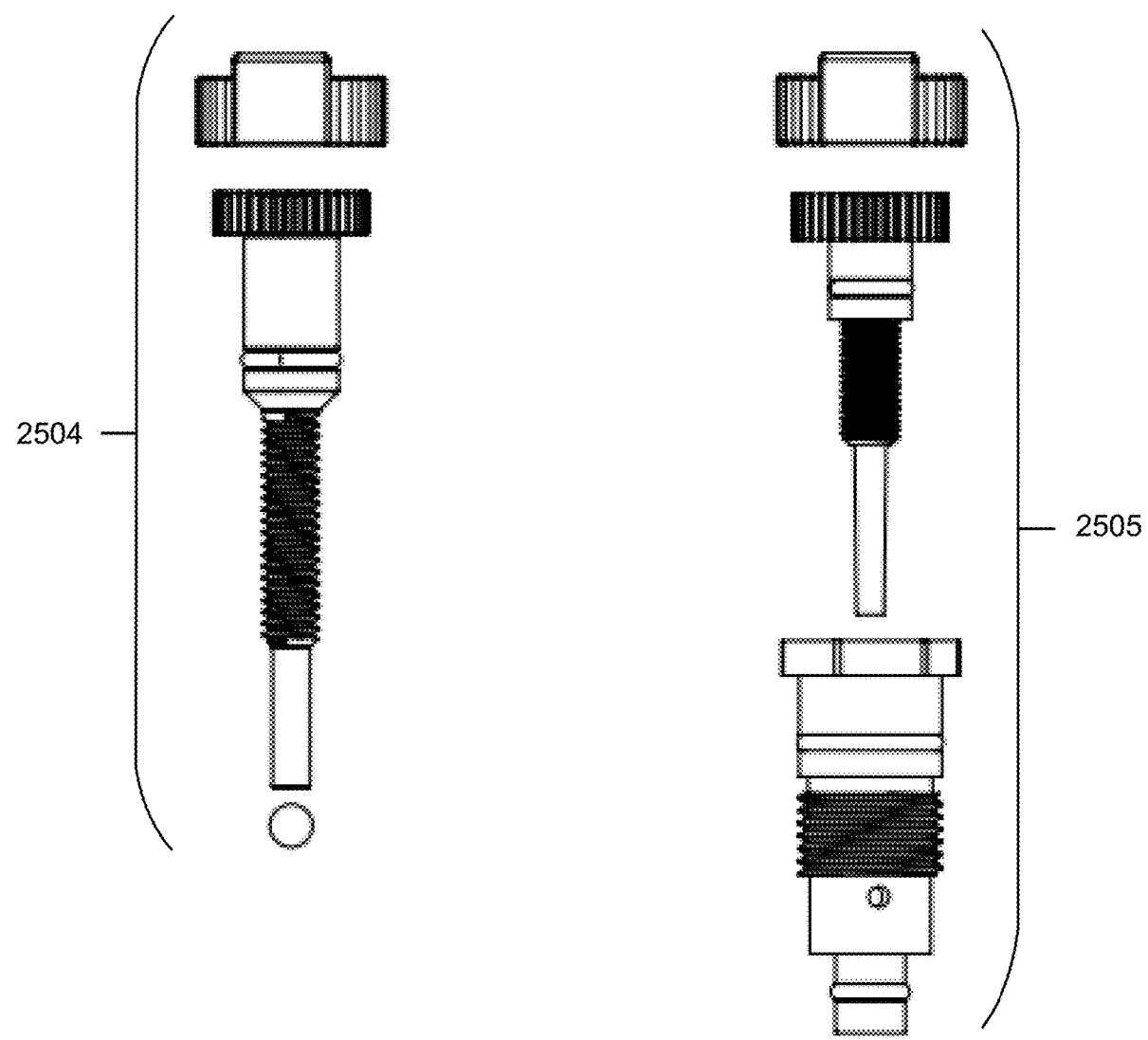
FIG. 32 depicts different perspective views of components of an apparatus for fluid flow control.

FIG. 32 shows an exploded view of the manual on-off control 2504 and the removable adjustable tank fill control 2505. In one embodiment, the controls 2504, 2505 are removeable for maintenance, cleaning, or the like. In certain embodiments, the controls 2504, 2505 can be actuated by turning the top knobs of the controls 2504, 2505 to tighten or loosen controls 2504, 2505 within the valve assembly 2530.

Figures 33A, 33B:
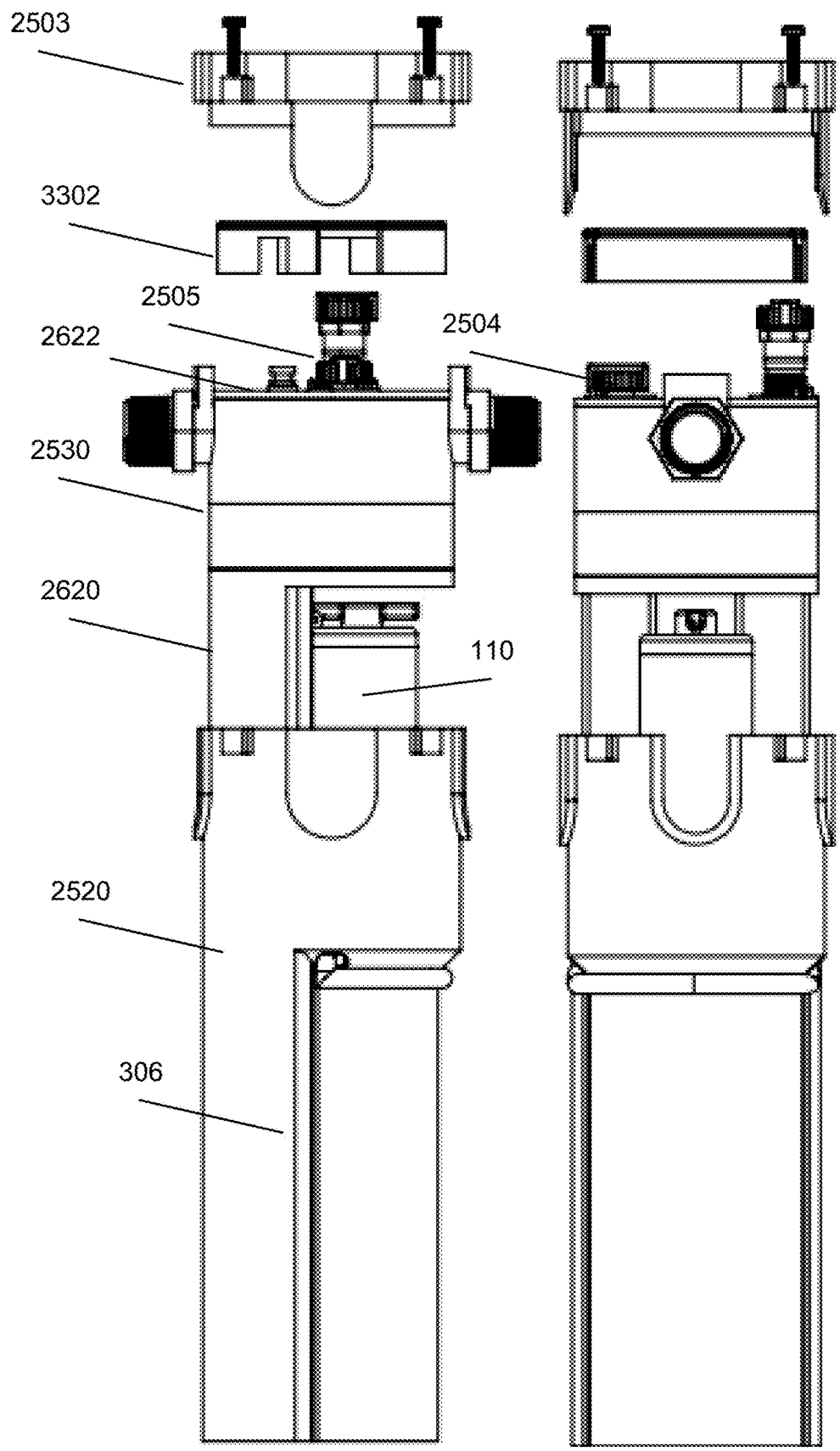
FIG. 33A depicts an exploded view illustrating another embodiment of an apparatus for fluid flow control.
FIG. 33B depicts an exploded view illustrating another embodiment of an apparatus for fluid flow control.

FIGS. 33A-33B depict exploded views of a valve device 2500 showing the lid 2503, a mesh/foam filter 3302 (for preventing debris from entering the container/tank 2520), the fill rate control 2505 and on/off control 2504, the valve assembly 2530, the float 110, the chambers 2620, the chamber plug, the tank/container 2520, and the wicking material 306.

FIGS. 34A-E depict an example of various views of the operating sequence of the valve device 2500. In one embodiment, shown in FIG. 34A, the tank 2520 is in the full position with the float 110 in the top position based on the water level 3402. In such an embodiment, the magnet 2614 in the top of the float lever arm 2612 is attracting the magnet 2680 of an actuator, here a lever arm 2606, in the chamber closing off the diaphragm port.

Figures 34A, 34B:
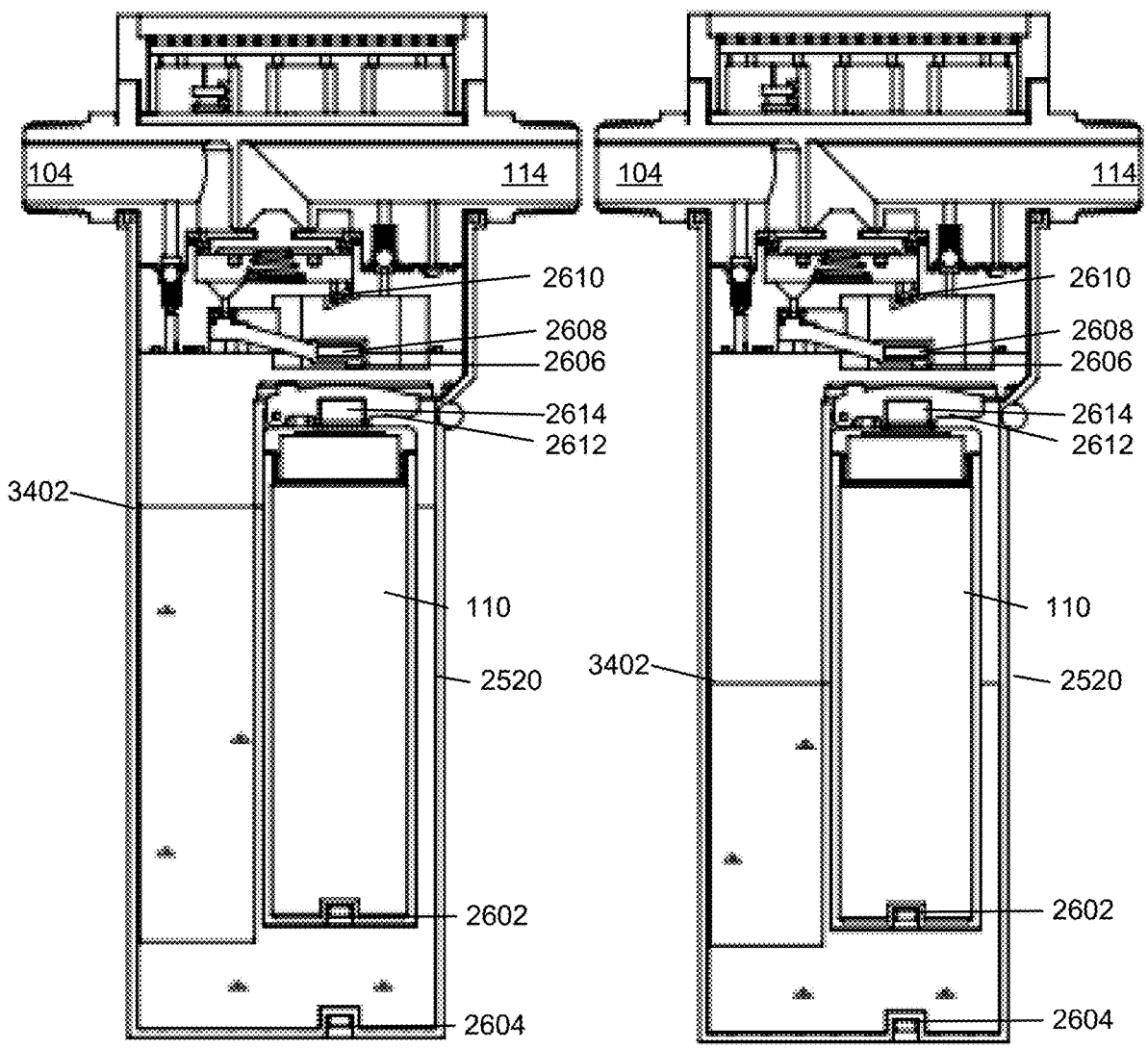
FIG. 34A depicts a sectional view illustrating another embodiment of an apparatus for fluid flow control.
FIG. 34B depicts a sectional view illustrating another embodiment of an apparatus for fluid flow control.

In FIG. 34B, the water level 3402 in the tank 2520 has dropped and at this point, the float 110 is suspended by the magnetic attraction between the float lever arm magnet 2614 and the magnet 2608 in the lever arm 2606 in the chamber.

Figure 34C:
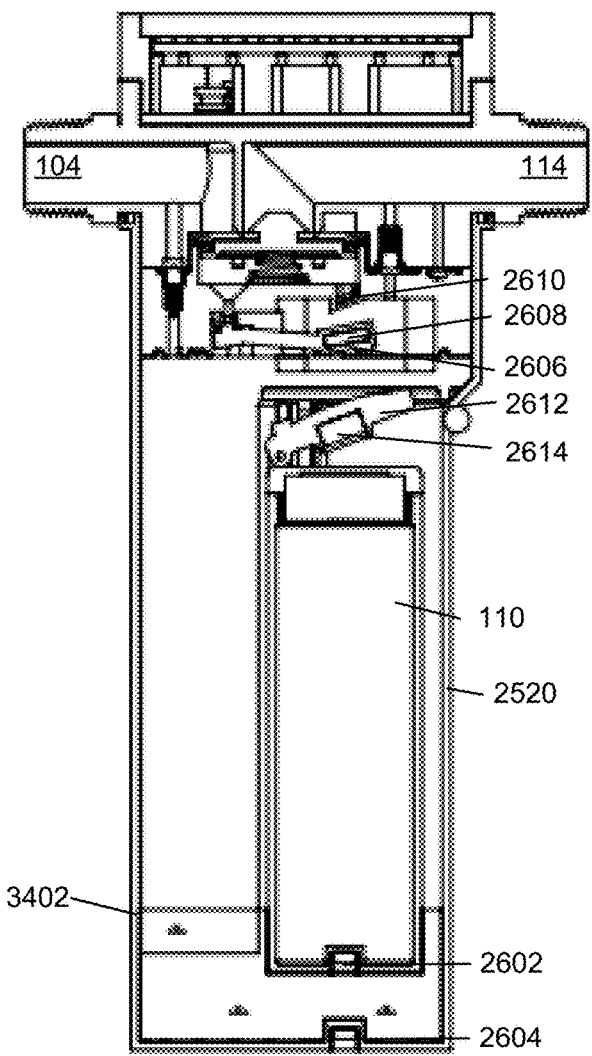
FIG. 34C depicts a sectional view illustrating another embodiment of an apparatus for fluid flow control.

In FIG. 34C, the water level 3402 in the tank 2520 has dropped even more and now the weight of the float assembly 110 is amplified by the lever 2612 on top of the float 110 to create enough downward force to overcome the magnetic attraction. As the float 110 falls to the bottom of the tank 2520, the magnet 2608 in the lever arm 2606 in the chamber is attracted to a magnet 2610 above it, causing the arm 2606 to move upward opening the diaphragm port.

Figure 34D:
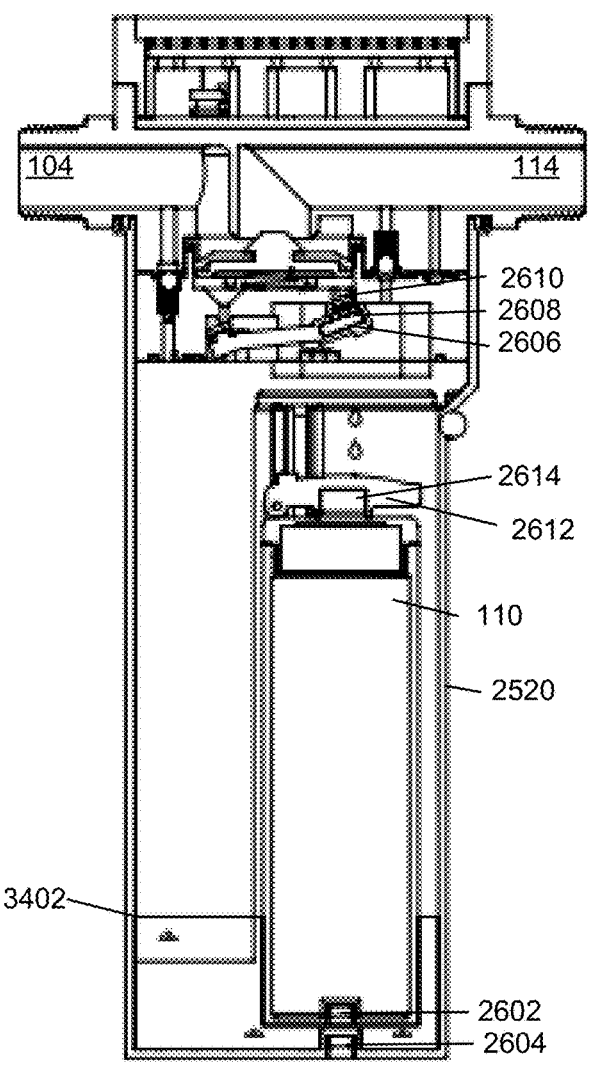
FIG. 34D depicts a sectional view illustrating another embodiment of an apparatus for fluid flow control.

In FIG. 34D, the float 110 has fallen to the bottom of the tank 2520 and the magnet 2602 in the bottom of the float 110 and the magnet 2604 in the bottom of the tank 2520 has made a magnetic connection. In such an embodiment, the lever 2606 in the chamber has moved completely upward towards the attracting magnet 2610 above it opening the diaphragm port fully. At this point, the valve begins to allow fluid through its main ports and flow back into its tank 2520.

Figure 34E:
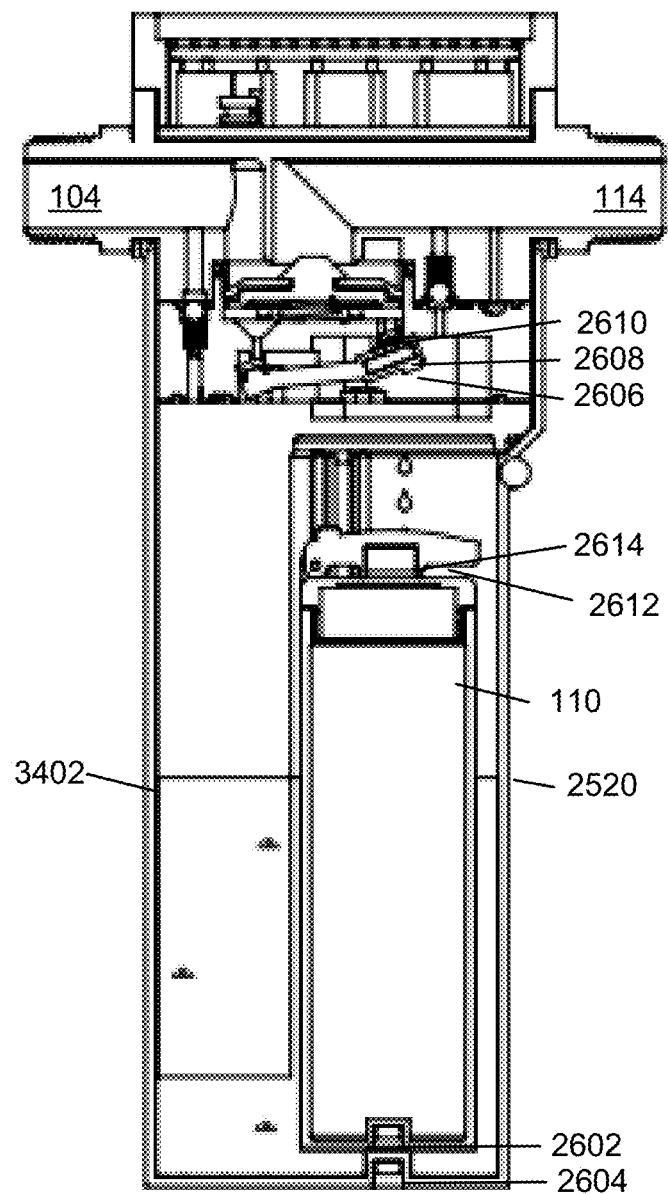
FIG. 34E depicts a sectional view illustrating another embodiment of an apparatus for fluid flow control.

In FIG. 34E, the water level 3402 in the tank 2520 is rising and the float 110 is still held at the bottom of the tank 2520 until the buoyancy of the float 110 with enough water present overcomes the magnetic attraction at the base of the float 110 and the tank 2520 to send the float 110 upwards. From this step, the float 110 returns to the top of the tank 2520 as seen in FIG. 34A.

Figure 35A:
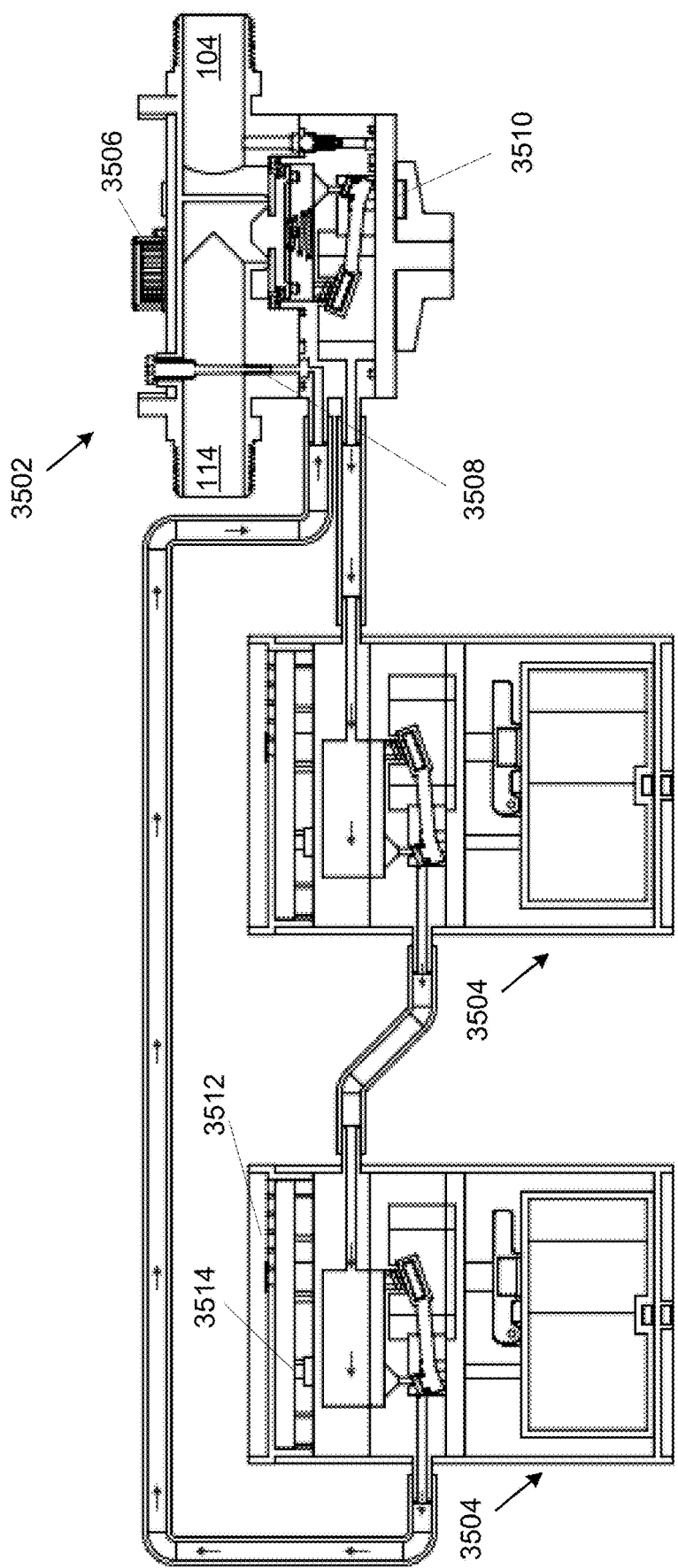
FIG. 35A depicts a sectional view illustrating another embodiment of an apparatus for fluid flow control.

FIG. 35A depicts one embodiment of a system of valve devices 2500 that are used for leak protection. In certain embodiments, the valve device 2500 may be used to provide a leak protection system that does not require electricity and can turn a valve off if liquid accumulates in a remote tank. This system could be used, for example, in homes, RVs, or industrial applications where a fluid leak detection is required.

As shown in FIG. 35A, the system includes a main valve assembly 3502 and one or more remote or secondary valve devices 3504 connected in series. In the depicted embodiment, a main fluid flow enters the main valve assembly 3502, proceeds through each of the remote valve devices 3504, and back through the main valve assembly 3502. If one of the tanks/containers 2520 of the remote valve devices 3504 fills to the point where the float raises and actuates the actuator to shut of the valve of the remote valve device 3504, the series is broken such that fluid is not allowed to flow through the series, e.g., in response to a leak where the remote valve devices 3504 are installed. For instance, the remote valve devices 3540 may be installed in a subfloor where water is located such as in a laundry room, a utility room, under a kitchen sink, in a bathroom, or the like. In this manner, the series of valves allows for relief of pressure under the diaphragm and sends that fluid back to the main outlet. At any point, a remote valve device 3504 that is filled will block the relief of the pressure from under the diaphragm, closing the valve.

In one embodiment, the main valve assembly 3502 includes a manual activation control 3506 that can activate the valve 3502 regardless of the status of the remote valve devices 3504. The control 3506 may relieve pressure under the diaphragm allowing it to open regardless of any chamber levers or float positions of the remote valve devices 3504. For instance, if a leak were detected in a two-story home, the valve 3502 would turn itself off once a tank filled; however, this control 3506 may allow a user, e.g., a plumber, to reactivate the valve 3502 even if a remote valve device 2504 has broken the series due to a full tank/container 2520, e.g., to identify where the leak is coming from.

The main valve assembly 3502 may also include a flow control 3508 that allows the main fluid flow to be regulated when the valve 3502 is open. In one embodiment, the main valve assembly 3502 includes an override control 3510, here a knob that can be actuated (rotated) to position a magnetic material under the magnetic material in the actuator to close the valve 3502. In one embodiment, even if the override control 3520 is in an override position, the manual activation control can override the override control 3520.

In one embodiment, a remote valve device 3504 includes an outlet 3512 for drawing liquid from the tank/container 2520, e.g., using a syringe, a pump, a vacuum, or the like. In one embodiment, a remote valve device 3504 includes a physical indicator 3514 that indicates the tank/container 2520 is full. In certain embodiments, the indicator 3514 pops up when the tank is full and pushing down on the indicator may turn the system back on as it pushes the float down in the tank allowing the valve to open. Upon releasing the indicator 3514, the float will rise back to the top shutting the valve off.

Figure 35B:
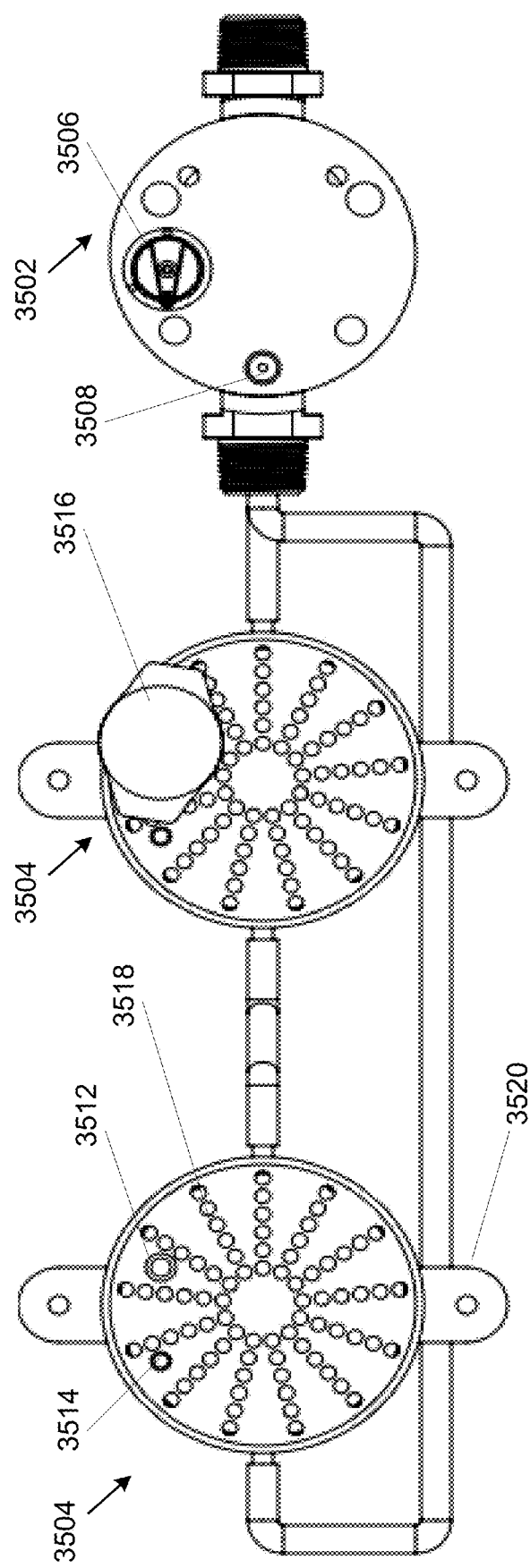
FIG. 35B depicts a sectional view illustrating another embodiment of an apparatus for fluid flow control.

FIG. 35B depicts a top view of the leak prevention system. In one embodiment, a fluid extraction device, e.g., a syringe 3516 is shown for extracting fluid from a full tank/container 2520. The lids of the remote valve devices 2504 may include one or more openings or perforations 3518 for allowing fluid into the tank/container, e.g., from a leak. Further, the lids may include mounting tabs 3520 for mounting the remote valve devices 3504, e.g., under a floor substrate.

Figure 35C:
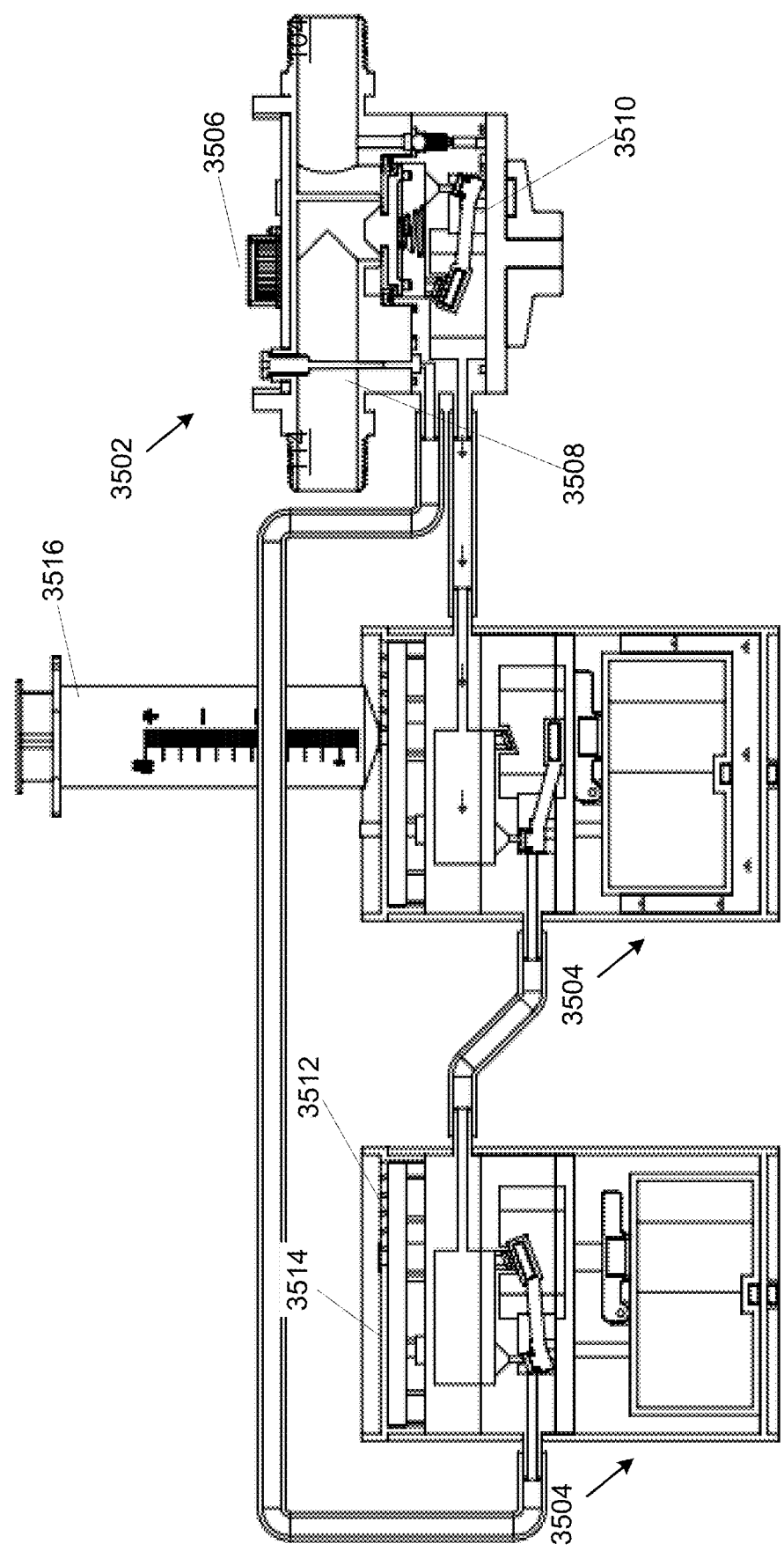
FIG. 35C depicts a sectional view illustrating another embodiment of an apparatus for fluid flow control.

FIG. 35C depicts one embodiment of the leak prevention system where the fluid circuit is broken, due to a leak where one of the remote valve devices 3504 is installed, shutting off the valve.

Figure 35D:
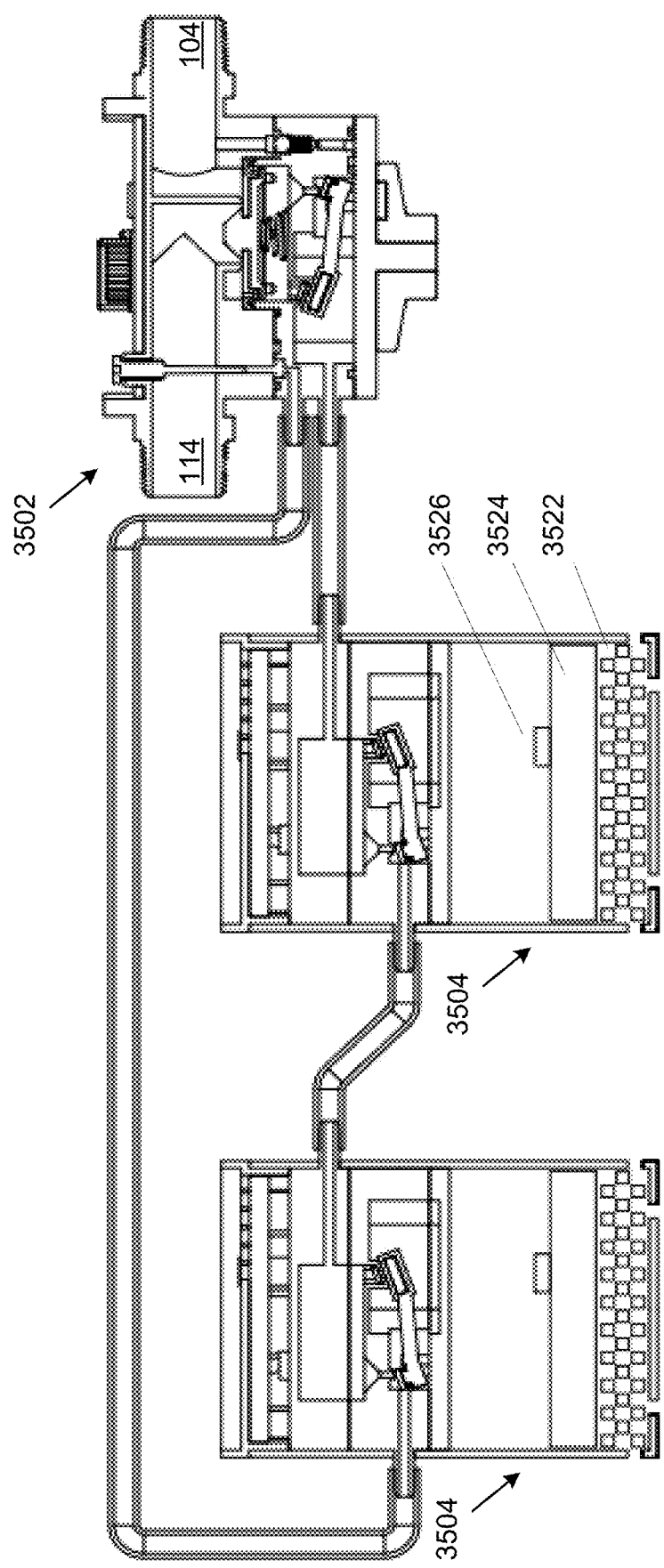
FIG. 35D depicts a sectional view illustrating another embodiment of an apparatus for fluid flow control.

FIG. 35D depicts an alternative embodiment of the remote valve devices 3504 where the tank/container 2520 is perforated at the base so that fluid on the ground can enter the tank without the tank having to be installed under the affected area. In other words, the remote valve devices 3504 may be set on the ground instead of installed under a subfloor.

In such an embodiment, the remote valve devices 3504 include an absorbent material 3522 in a base of the tank/container 2520, such as sodium polyacrylate, which expands when it comes into contact with fluid such as water. The material 3522 could then push a plate 3524 upward, carrying magnetic material 3526 into contact with the actuator in the valve. For example, the remote valve assembly 3504 could be connected to a washing machine, and a tank such as this could be placed on the ground behind the washing machine. In the event, the washing machine leaked, the absorbent material would soak up water expanding to push the magnet upward, which would turn the remote valve device 3504 off, cutting the fluid flow through the series.

In another embodiment, a material that dissolves when contacted with a fluid may be used in the container to prevent a magnet from being positioned upward to close valve (e.g., via a float, plate, latch, flap, or the like). When enough water enters the container to dissolve the material, the magnet may be propelled upward to turn off the valve.

In one embodiment, a remote valve assembly 3504 may be connected to an emergency drain, overflow pipe, or the like at the container such that if there is an emergency, the container will fill up and turn off the valve when the float is in an up position to kill the water source and prevent further leaking. In this application the fluid flow would be allowed to continue through the tank to its ultimate location in a (T connection style) until the water flow came to a stop. In a further embodiment, the container may include a flap or latch mechanism that propels a magnet or other magnetic material upward to shut of the valve, and ultimately the water supply.

Figure 36:
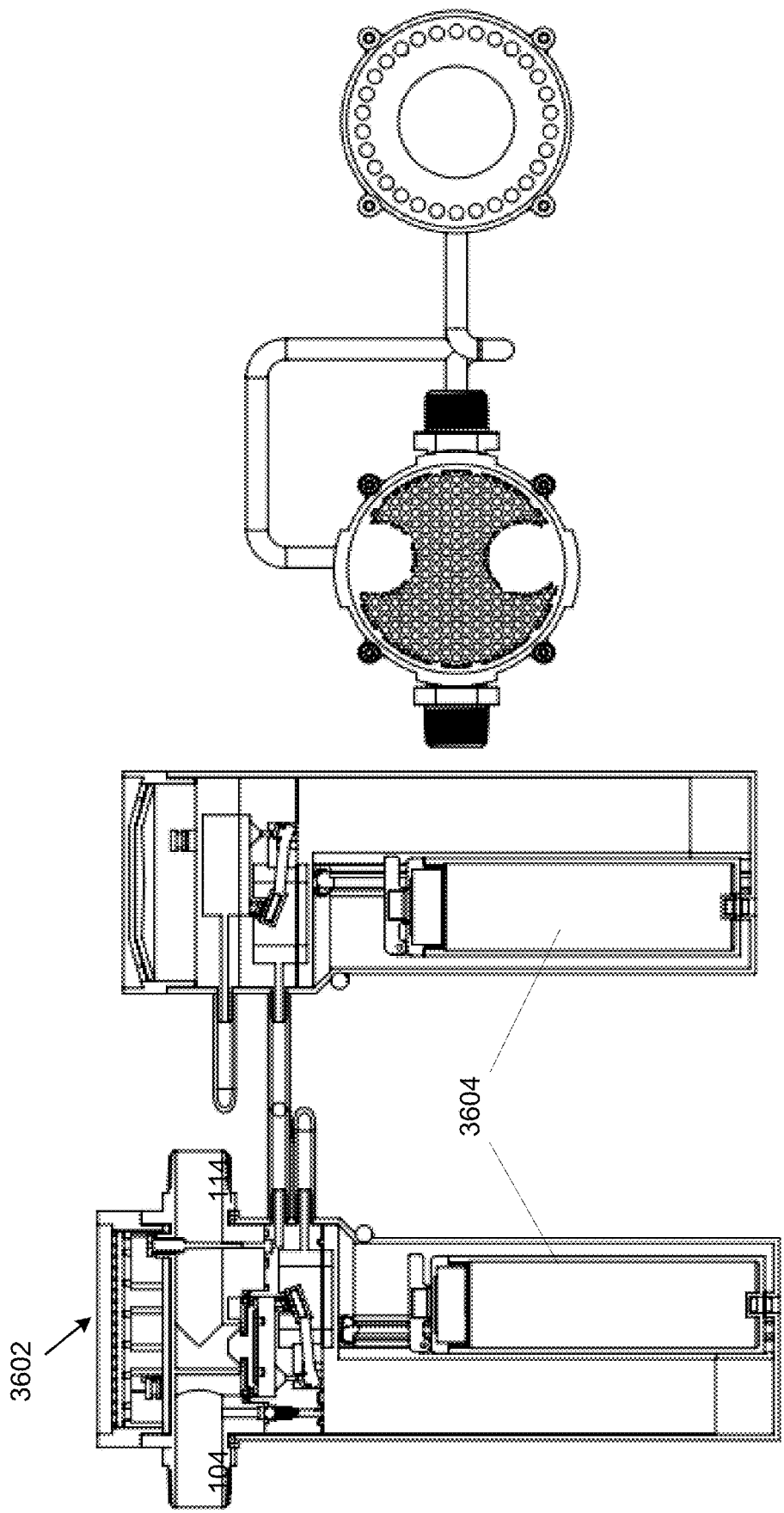
FIG. 36 depicts a sectional view illustrating another embodiment of an apparatus for fluid flow control.

In one embodiment, the valve design in FIGS. 35A-36 could be used in reverse to shut off a water supply to an appliance or section of a home or building if a leak were present. For example, if the valve device was placed in the floor of a second-story building, or under a hot water heater in an attic and the main supply is plumbed through the valve, the valve would shut off once its tank is filled. In an application where the device was used for leak prevention, there would not be a tank fill, or wick material. The same could be true in industrial applications where a fluid needs to stop flowing if a leak is present.

In another embodiment, a valve may be used as an emergency shutoff, or the like. For example, the valve may be positioned in a hot water heater overflow tank and the valve may remain open, supplying water unless the tank begins to leak, allowing water to access the float which sends the float upward to shut off the supply, or the like.

A valve, in some embodiments, may be disposed in a floor of an upstairs home or other building between the floor joist and used to shut off water to a problem area if the tank should fill, triggering the float to rise. Such a leak detection valve may be used without electricity, without single use parts, or the like. Instead, the reservoir may be emptied, and the device may restore water to the floor and/or device. For example, a sealed tank may have a syringe allowing a user to empty the tank once a leak is fixed, or the like.

FIG. 36 depicts one embodiment of a sectional view and a top view of a remote tank system where the valve 3602 is dependent on both floats 3604 being in the downward position to allow the valve 3602 to be open. If one of the floats 3604 is in an upward position, the valve 3602 will not open.

Figures 37A, 37B:
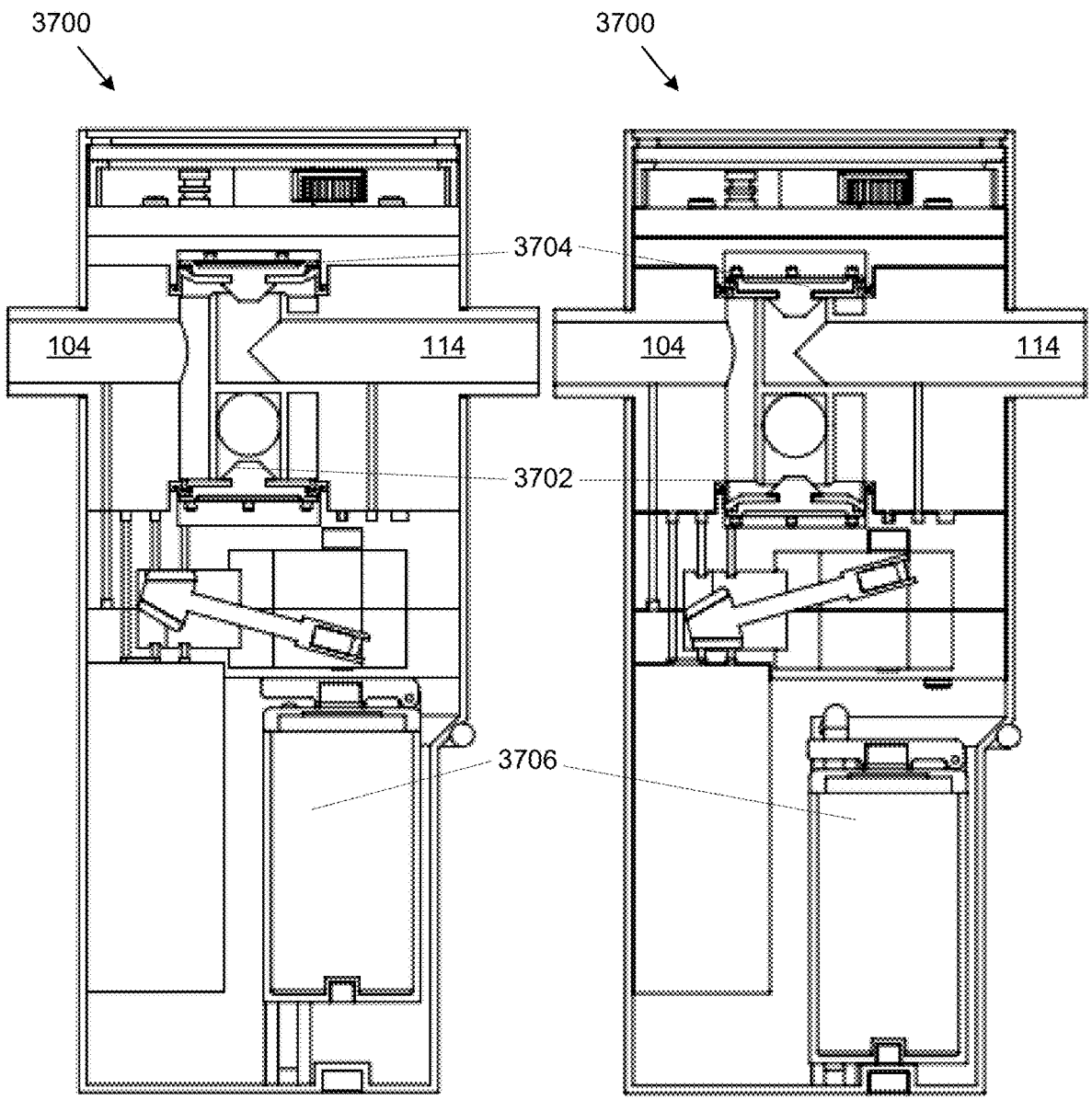
FIG. 37A depicts a sectional view illustrating another embodiment of an apparatus for fluid flow control.
FIG. 37B depicts a sectional view illustrating another embodiment of an apparatus for fluid flow control.

FIGS. 37A-B depict one embodiment of a dual valve device 3700. In one embodiment, the dual valve device 3700 includes at least two diaphragms 3702, 3704, where one diaphragm 3702, 3704 is open when the float 3706 is in the down position (shown in FIG. 37B) and the other diaphragm 3702, 3704 is open when the float 3706 is in the up position (shown in FIG. 37A), allowing full flow to the next valve. In this manner, fluid can flow from a single valve to different locations, destinations, directions, or the like, e.g., when one diaphragm 3702, 3704 is open, water may go to a next valve device (e.g., the next valve in an irrigation system), and when the other diaphragm 3702, 3704 is open, water may go to the sprinklers in the irrigation zone. In one embodiment, this prevents multiple valves from opening at the same time and reducing water pressure. Further, in one embodiment, this allows multiple valves to be connected one after another and the main water supply can move between each zone, satisfying zones that need water, and then moving flow to the next valve.

Figure 37C:
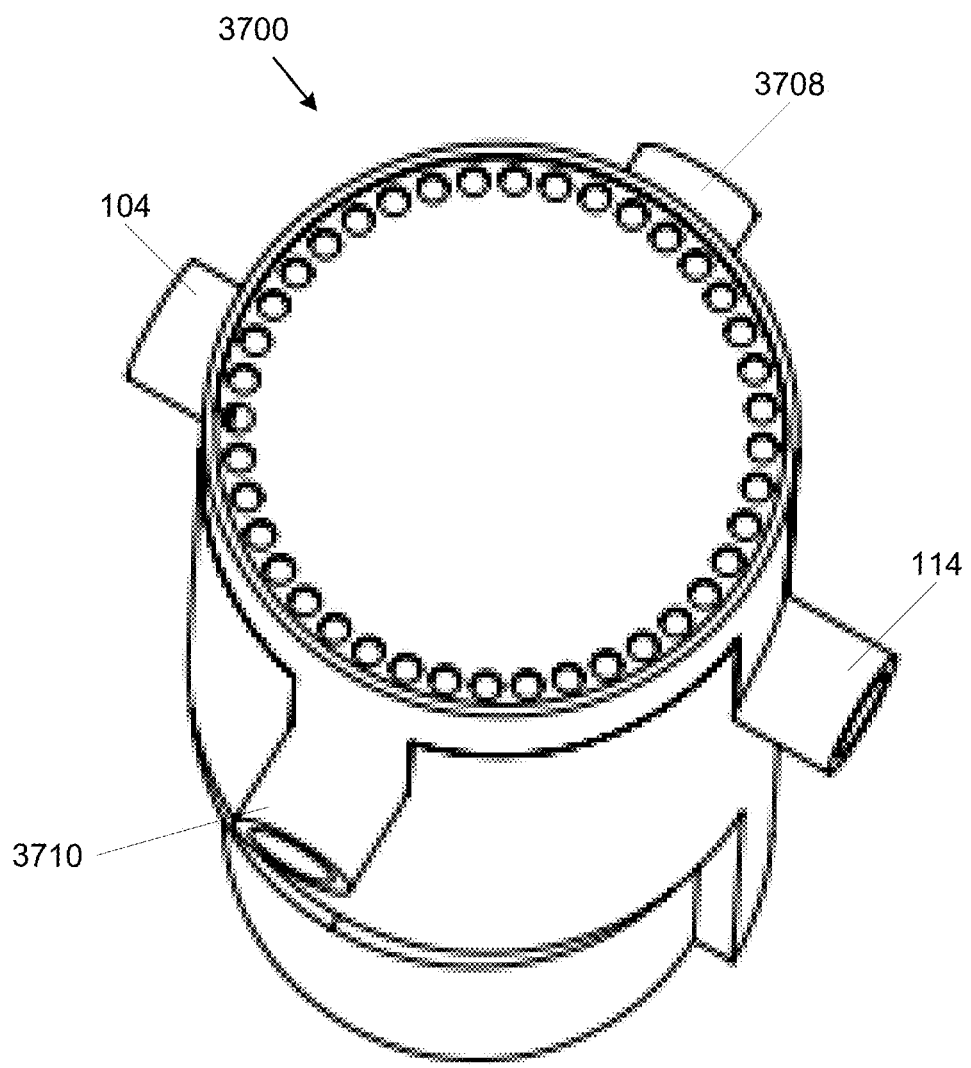
FIG. 37C depicts a top view illustrating another embodiment of an apparatus for fluid flow control.

FIG. 37C depicts a top view of a dual valve device 3700. As shown in FIG. 37C, a main fluid flow is provided to an inlet 104 and flows through the valve and to an outlet 114 based on a position of one of the two diaphragms within the dual valve device 3700. In one embodiment, the fluid flow is diverted to a different location or direction 3708, 3710, e.g., such as an irrigation zone, based on the position of the other of the two diaphragms within the dual valve device 3700.

Figure 38A:
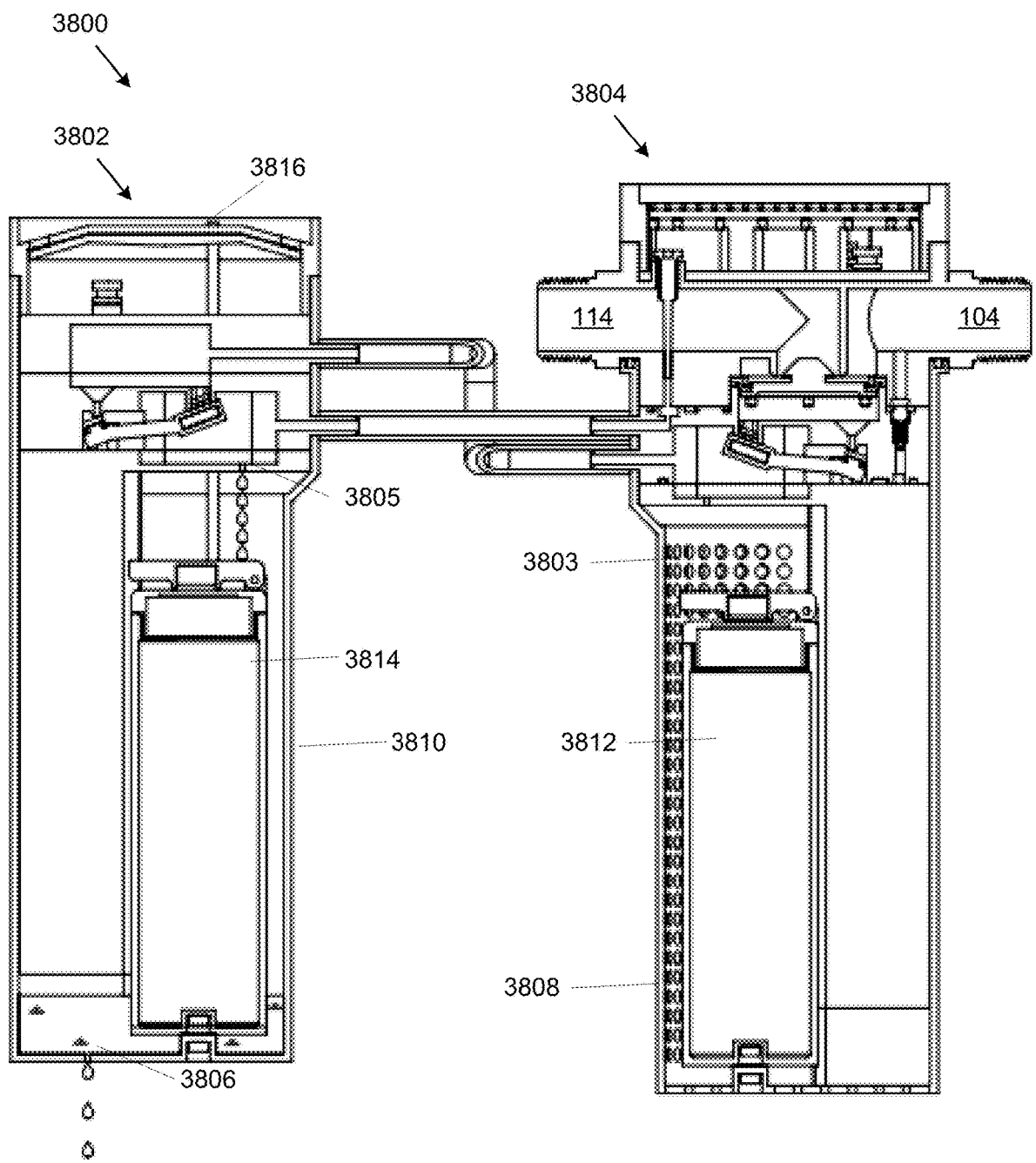
FIG. 38A depicts a sectional view illustrating another embodiment of an apparatus for fluid flow control.

FIG. 38A depicts a sectional view of a valve system 3800 that includes a remote valve device 3802 and a main valve device 3804. The main valve device 3804 may be connected to a main fluid flow, which is controllable by a float 3812 within the container 3808 of the main valve device 3804. In the depicted embodiment, the container 3808 includes a plurality of openings 3803, holes, perforations, or the like along a length of the container 3808 to allow fluid into the container 3808.

The remote valve device 3810 is configured to receive a fluid flow from the main valve device 3804 and provide or bleed-off at least a portion of the fluid flow into the container 3810 via an inlet port 3805. In one embodiment, the container 3810 also includes an outlet 3806 for releasing at least a portion of the fluid within the container 3810. In one embodiment, the rate at which the fluid enters the container 3810 via the inlet 3804 is higher than the rate at which fluid exits the container 3806 via the outlet 3806.

In one embodiment, when the container 3808 of the main valve device 3804 fills with fluid to a level where the float 3812 is in an up position, the valve closes and fluid ceases to flow through the valve. Similarly, when the container 3810 of the remote valve device 3802 fills with fluid to a level where the float 3814 is in an up position, the valve closes and causes the fluid flow through the main valve device 3804 to cease.

In practice, in one embodiment, the remote valve device 3802 and the main valve device 3804 are contained in a single housing or other container. In one application, the valve system 3800 may be installed in a tank such as a toilet tank to detect and prevent a leaking or running toilet. For example, when installed, under normal conditions, the container 3808 of the main valve device 3804 fills with fluid as the toilet tank fills until the float 3812 is in an up position, which acts on the valve and shuts off the water supply to the tank. However, if the toilet is running, e.g., due to the flap in the toilet plumbing not closing completely within the tank, the container 3808 of the main valve device 3804 will not fill up with water because the tank does not fill up with water. Accordingly, the container 3810 of the remote valve device 3802 slowly fills with water, due to the rate differential between the inlet 3804 and the outlet 3806 until the float 3814 raises to the up position and ultimately causes the main valve device 3804 to shut of water flow into the tank. In such an embodiment, the valve system 3800 replaces traditional float valve assemblies in toilet tanks or other water tanks.

In one embodiment, the float 3814 in the remote valve device 3802 is not heavy enough to reset itself when the water leaves the container 3810. Accordingly, the remote valve device 3802 may include a physical reset 3816 that may be a rod that is manually pressed to move the float 3814 back to a down position.

Figure 38B:
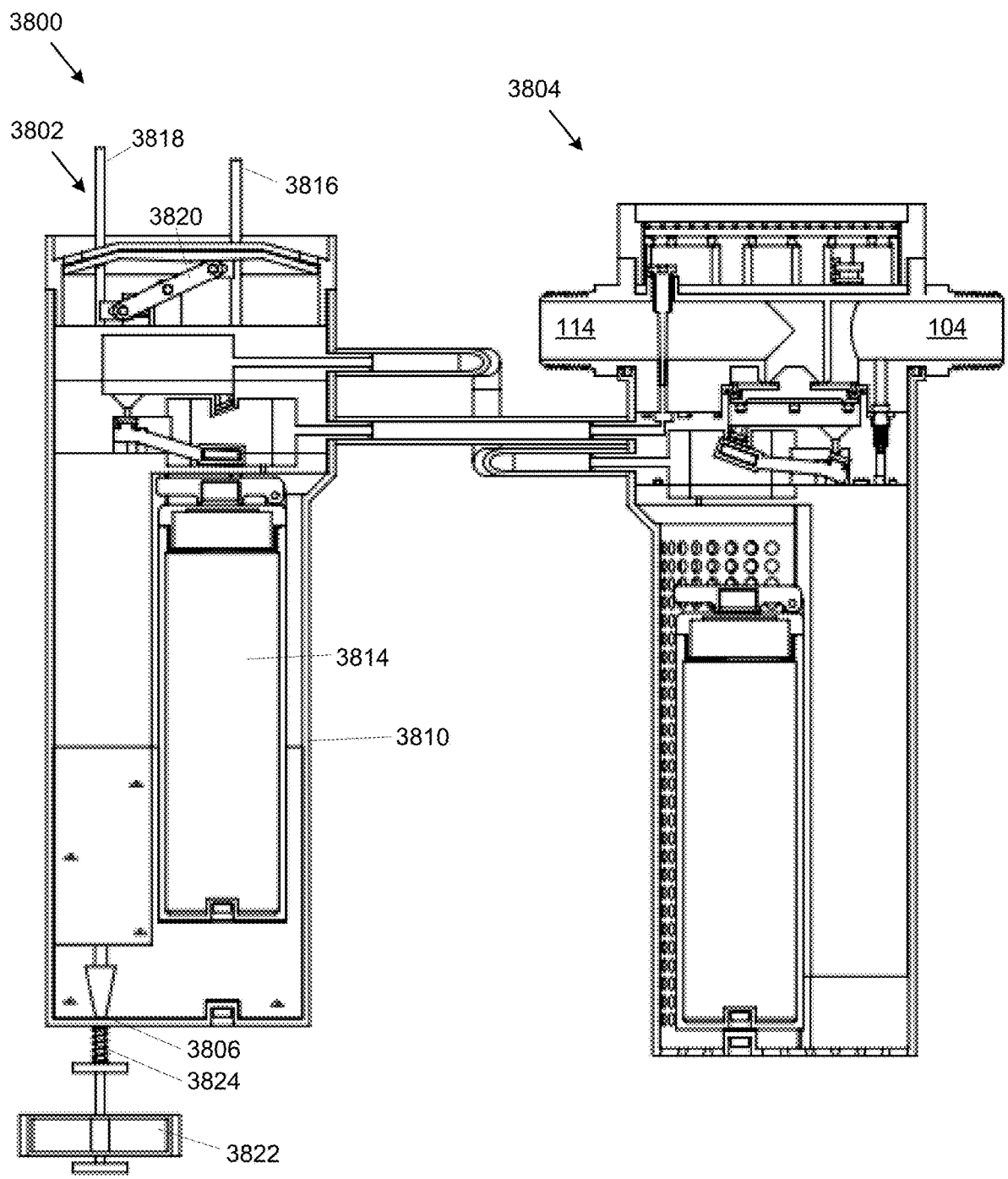
FIG. 38B depicts a sectional view illustrating another embodiment of an apparatus for fluid flow control.

FIG. 38B depicts another embodiment of a valve system 3800. In one embodiment, the remote valve device 3802 includes a secondary float 3822 external to the container 3810, which is coupled to the container 3810 via a spring assembly 3824. In one embodiment, when the secondary float 3822 is in a down position, e.g., there is no water in the water tank, the secondary float 3822 pulls a plug rod 3818 down to close the outlet 3806. The plug rod 3818 may be mechanically connected to the physical reset 3816 via an actuator such as a lever 3820 such that when the plug rod 3818 is pulled up, the physical reset 3816 is pushed down to position the float 3814 in the down position.

FIG. 38C depicts a further sectional view of the remote valve device 3802 shown in FIG. 38B.

FIG. 38D depicts an embodiment of a valve system 3800 that includes, in the main valve device 3804, a secondary float 3822 that is configured to act on a plug rod 3818 to prevent fluid flow through the outlet 3806. In one embodiment, the container 3808 includes openings 3803 or perforations for allowing fluid into the container 3808. Moreover, in one embodiment, the float 3812 includes a float chamber 3830 that captures fluid to assist the reset of the float 3812 in the down position (e.g., using the weight of the fluid in the chamber 3830). In one embodiment, the float chamber 3830 wraps around the float 3812 and also has an outlet to release an amount of fluid at a particular rate. In a fluid tank that has rapid depletion of fluid from the tank, the float 3812, with the weight of the fluid in the float chamber 3830 will be able to reset itself; however, if the fluid tank depletes slowly (e.g., responsive to a slow leak), the float 3812 will not be able to reset itself because the fluid from the float chamber 3830 will have been depleted as well, rending the float 3812 lacking in weight to reset.

In one embodiment, the interaction between the magnets within the float assembly and the magnets surrounding it create a unique method for controlling a float within a tank. Typically, a float moves with the water, up or down as it is added or subtracted. This design traps the float in the down position until its buoyancy overcomes the magnetic attractions propelling the float instantly upward with momentum. This design also traps the float in the up position until its weight overcomes the magnetic connection at the top. Note that the lever at the top of the float allows the float to break the magnetic connection with much less weight using leverage. The lever is merely for reducing float size if size were of no concern the lever would not be needed. Friction could be used as well in place of the magnets.

In one embodiment, ports have been introduced to allow rain to enter the device and fill the tank. In one embodiment, the ports allow water to enter the device quickly from the top of the device to fill the tank and deactivate or turn-off the valve, which may be beneficial, for example, in the event of heavy rain, flash storms, or the like. In certain embodiments, the ports include removable filters that can be cleaned and reused, as needed, to prevent debris from entering the tank.

In one embodiment, secondary chambers have been added to the tank, these allow the end user to alter the time between cycles. The chambers are open at the bottom and connected to the valve body leading to a port that can be opened and closed. When the port is closed the chamber becomes airtight and the areas remain filled with air and will not allow water to enter. Once the port at the top of the valve is opened the chamber can fill with water which increases the time between cycles. Between the adjustable fill rate valve, and the addition of these chambers the end user can decide how often they want the device to turn on, and when it does turn on how long they want it to run. Keep in mind that environmental conditions will vary the time between cycles ultimately, but this allows the user to set parameters for the operation. This wouldn't be limited to just using air but could also be done with physical material taking up the extra volume in the tank to alter the time between cycles. For example, mechanical devices could allow the user to introduce material by lowering it into the tank which could take up excess volume shortening the cycle time between activations.

In some embodiments, the valve may be used as an industrial automatic waterer for animals. In this case, the tank would not require a wick, nor would it require a fill rate adjustment knob. A tank may have a series of holes or other openings, making it a supporting structure to house the float and valve, and may be placed inside a watering tank or the like. In this embodiment, the valve may open at a preset water drop as opposed to starting to open immediately as a water level begins to drop.

In some embodiments, a valve may restrict watering with regard to conservation efforts (e.g., of a municipality, utility, or the like). For example, a valve may be used to limit an amount of watering a homeowner may do and/or the frequency. In this embodiment, the valve may not be adjustable by the homeowner, but instead a fill rate may be set per the state, city, or other municipality standard (e.g., how long may a user water, 30 minutes, an hour, or the like) and an exit rate required for the valve to cycle (e.g., water frequency once daily, every 2 days, once weekly, twice weekly, or the like). A valve unit may be placed in line with an existing sprinkler system to allow the regulation of watering no matter what the existing controller is set to, or the like. If the controller is set to water 7 days a week for hours at a time, the valve may block the water unless the set parameters have been met, and when met the valve may limit an amount of time the sprinkler system may run. Typically, a sprinkler system has a direct line to a meter, and in some embodiments, a master valve may be placed early in the line near the meter to limit watering to the whole system as opposed to one being placed at the beginning of each zone.

In one embodiment, a version of the valve could be constructed with a solenoid attached to it, taking the place of a traditional solenoid used in a sprinkler system. This would allow the homeowner to activate the solenoid 7 days a week, but the valve would ultimately be controlling water flow based on the parameters being met to allow water to pass through the valve.

In certain embodiments, such as flower beds, or the like, a user may desire to only water after the sun goes down (e.g., to limit an amount of water lost due to evaporation, or the like). A valve may comprise a solar panel (e.g., on top of the valve, or the like) that may activate an electromagnet which holds the float in the top position (e.g., an "off position") until the sun goes down, allowing the charge to the solar panel to end, shutting off the electromagnet and dropping the float thereby allowing the valve to start watering.

In an alternative embodiment, the valve could be designed so it releases fluid through the main inlet and outlet once the tank is filled. There could be an industrial application where a fluid is blocked by the valve until the tank placed in a strategic location is filled by the same or alternative fluid.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
a valve, comprising:
an actuator, the actuator actionable to control a flow of a fluid through the valve; and
a first magnetic material disposed on the actuator, the first magnetic material operable to control a position of the actuator; and
a container coupled to the valve and shaped to receive a fluid, the container comprising:
an inlet configured to allow fluid into the container; and
a float assembly positioned within the container according to a level of the fluid within the container, the float assembly comprising a second magnetic material,
wherein the actuator is actuated to one of open the valve at a first position and close the valve at a second position responsive to a magnetic force between the second magnetic material and the first magnetic material based on a position of the float assembly within the container, and
wherein the valve further comprises a third magnetic material disposed opposite the first magnetic material, the third magnetic material configured to actuate the actuator to a position opposite the first position or opposite the second position associated with the float assembly responsive to a magnetic force between the first magnetic material and the third magnetic material.

2. The apparatus of claim 1, wherein the float assembly is positioned to create a magnetic force between the first magnetic material and the second magnetic material at a first fluid level within the container and break the magnetic force between the first magnetic material and the second magnetic material at a second fluid level within the container.

3. The apparatus of claim 2, wherein the first fluid level is a higher fluid level within the container than the second fluid level.

4. The apparatus of claim 1, wherein the actuator comprises a lever assembly, the first magnetic material disposed within the lever assembly.

5. The apparatus of claim 1, wherein the float assembly further comprises a lever assembly comprising the second magnetic material.

6. The apparatus of claim 1, wherein the float assembly further comprises a fourth magnetic material on the float assembly that is configured to secure the float assembly at a position near a bottom of the container in response to a magnetic force between the fourth magnetic material and a fifth magnetic material on the bottom of the container.

7. The apparatus of claim 6, wherein the fifth magnetic material is configurable to adjust a strength of the magnetic force between the fourth and fifth magnetic materials.

8. The apparatus of claim 1, wherein the float assembly further comprises a fourth magnetic material comprising magnets that are positioned around the float, around an inner surface of the container, or a combination thereof, each magnet being positioned higher than a previous magnet and positioned further in a stepwise spiral configuration.

9. The apparatus of claim 1, wherein a buoyancy of the float is configurable by adding or removing weight to or from the float.

10. The apparatus of claim 9, wherein the float assembly further comprises a float chamber for holding fluid such that the float assembly comprises a variable weight float assembly based on a fluid level in the float chamber, the float chamber comprising one or more ports for allowing fluid to exit the float chamber.

11. The apparatus of claim 1, further comprising a flow adjustment control that is manually operable to control the flow of fluid out of the valve.

12. The apparatus of claim 1, further comprising an activation control for manually opening and closing the valve regardless of the position of the float.

13. The apparatus of claim 1, wherein the container comprises at least one chamber that is configurable to adjust a volume fluid that the container can hold.

14. The apparatus of claim 1, further comprising a fill rate control for adjusting a rate in which fluid enters the container.

15. The apparatus of claim 14, wherein the fill rate control is removable from the valve.

16. The apparatus of claim 1, further comprising a manually-operable control comprising a magnetic material, wherein the magnetic material is configured to provide magnetic force to the first magnetic material to actuate the actuator responsive to the magnetic material being positioned relative to the first magnetic material.

17. The apparatus of claim 1, wherein the actuator is actuated by activating an electromagnet that interacts with the first magnetic material.

18. The apparatus of claim 1, further comprising an impeller assembly disposed at an inlet or an outlet of the valve, the impeller assembly configured to magnetically actuate the actuator in response to a predetermined amount of fluid crossing through the impeller assembly.

19. The apparatus of claim 1, further comprising a wick material that allows fluid within the container to enter and exit the container.

20. An apparatus, comprising:
    a valve, comprising:
        an actuator, the actuator actionable to control a flow of a fluid through the valve; and
        a first magnetic material disposed on the actuator, the first magnetic material operable to control a position of the actuator;
        a first control configured to control fluid flow in a first direction through the valve; and
        a second control configured to control fluid flow in a second direction through the valve; and
    a container coupled to the valve and shaped to receive a fluid, the container comprising:
        an inlet configured to allow fluid into the container; and
        a float assembly positioned within the container according to a level of the fluid within the container, the float assembly comprising a second magnetic material,
wherein the actuator is actuated to open one of the first control and the second control according to positions of the first and second magnetic materials relative to one another based on a position of the float assembly within the container, and
wherein the valve further comprises a third magnetic material disposed opposite the first magnetic material, the third magnetic material configured to actuate the actuator to a position opposite the first position or opposite the second position associated with the float assembly responsive to a magnetic force between the first magnetic material and the third magnetic material.

* * * * *